US009950262B2

(12) United States Patent
Osako et al.

(10) Patent No.: US 9,950,262 B2
(45) Date of Patent: Apr. 24, 2018

(54) STORAGE MEDIUM STORING INFORMATION PROCESSING PROGRAM, INFORMATION PROCESSING DEVICE, INFORMATION PROCESSING SYSTEM, AND INFORMATION PROCESSING METHOD

(75) Inventors: Satoru Osako, Kyoto (JP); Toshiaki Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 793 days.

(21) Appl. No.: 13/484,522

(22) Filed: May 31, 2012

(65) Prior Publication Data
US 2012/0306933 A1 Dec. 6, 2012

(30) Foreign Application Priority Data

Jun. 3, 2011 (JP) ................................. 2011-125866
Apr. 27, 2012 (JP) ................................. 2012-102613

(51) Int. Cl.
*A63F 13/65* (2014.01)
*A63F 13/92* (2014.01)
(Continued)

(52) U.S. Cl.
CPC ............ *A63F 13/65* (2014.09); *A63F 13/211* (2014.09); *A63F 13/26* (2014.09); *A63F 13/428* (2014.09);
(Continued)

(58) Field of Classification Search
CPC .............. A63F 13/10; A63F 2300/8082; A63F 2300/6045; A63F 2300/301;
(Continued)

(56) References Cited

U.S. PATENT DOCUMENTS 6,009,190 A 12/1999 Szeliski et al.
6,327,020 B1 12/2001 Iwata
(Continued)

FOREIGN PATENT DOCUMENTS

GB 2 328 848 A 3/1999
JP 9-305788 11/1997
(Continued)

OTHER PUBLICATIONS

European Search Report issued in Application No. 12 16 8513 dated Jan. 20, 2015.
(Continued)

*Primary Examiner* — Zhengxi Liu
*Assistant Examiner* — Scott E Sonners
(74) *Attorney, Agent, or Firm* — Nixon & Vanderhye P.C.

(57) ABSTRACT

From a stored panorama moving image, panorama images are read and sequentially acquired every predetermined time for reproduction on a display device, each of the panorama images being a frame of the panorama moving image. A range to be displayed in a first display area is set in each of the acquired panorama images. A range to be displayed in a second display area is set in each of the acquired panorama images. The respective ranges of the acquired panorama images which are set to be displayed in the first display area are displayed in the first display area. The respective ranges of the acquired panorama images which are set to be displayed in the second display area are displayed in the second display area.

25 Claims, 22 Drawing Sheets

(51) Int. Cl.
*A63F 13/211* (2014.01)
*A63F 13/428* (2014.01)
*A63F 13/26* (2014.01)
*G06T 15/20* (2011.01)
*G06T 19/00* (2011.01)

(52) U.S. Cl.
CPC .............. *A63F 13/92* (2014.09); *G06T 15/20* (2013.01); *G06T 19/003* (2013.01); *A63F 2300/105* (2013.01); *A63F 2300/204* (2013.01); *A63F 2300/301* (2013.01); *A63F 2300/6045* (2013.01); *A63F 2300/8082* (2013.01)

(58) Field of Classification Search
CPC .. A63F 2300/204; A63F 13/211; A63F 13/26; A63F 13/06; A63F 13/323; A63F 2300/6669; A63F 13/525; G06T 15/20; G06T 19/003; H04N 5/23238; H04N 13/0278; G06F 3/04815; G06F 1/1647; G06F 1/1649; G06F 1/1654; G09G 2356/00; G09G 5/14
See application file for complete search history.

(56) References Cited

U.S. PATENT DOCUMENTS

| | | | | |
|---|---|---|---|---|
| 6,559,846 | B1* | 5/2003 | Uyttendaele | G06T 15/005 345/473 |
| 7,445,549 | B1 | 11/2008 | Best | |
| 2001/0056574 | A1 | 12/2001 | Richards | |
| 2002/0021353 | A1* | 2/2002 | DeNies | H04N 21/21805 348/36 |
| 2002/0165028 | A1 | 11/2002 | Miyamoto | |
| 2003/0063133 | A1 | 4/2003 | Foote et al. | |
| 2003/0231189 | A1 | 12/2003 | Williams | |
| 2004/0125044 | A1* | 7/2004 | Suzuki | G06F 3/011 345/1.1 |
| 2004/0198313 | A1 | 10/2004 | Chiu | |
| 2005/0088523 | A1 | 4/2005 | Wu et al. | |
| 2006/0074553 | A1 | 4/2006 | Foo et al. | |
| 2007/0270226 | A1 | 11/2007 | York et al. | |
| 2008/0144968 | A1 | 6/2008 | Cohen et al. | |
| 2009/0325607 | A1* | 12/2009 | Conway et al. | 455/456.3 |
| 2010/0045667 | A1 | 2/2010 | Kornmann et al. | |
| 2010/0053164 | A1* | 3/2010 | Imai | G06F 3/011 345/427 |
| 2010/0088639 | A1 | 4/2010 | Yach et al. | |
| 2010/0188503 | A1* | 7/2010 | Tsai | G01C 21/20 348/142 |
| 2012/0262492 | A1* | 10/2012 | Ohashi et al. | 345/660 |
| 2012/0324213 | A1 | 12/2012 | Ho et al. | |
| 2013/0121525 | A1 | 5/2013 | Chen et al. | |

FOREIGN PATENT DOCUMENTS

| | | |
|---|---|---|
| JP | 2000-076284 | 3/2000 |
| JP | 2001-034247 | 2/2001 |
| JP | 2003-143477 | 5/2003 |
| JP | 2003-219403 | 7/2003 |
| JP | 2003-227722 | 8/2003 |
| JP | 2005-234137 | 9/2005 |
| JP | 2009-536058 | 10/2009 |
| WO | WO 2007/128949 | 11/2007 |
| WO | WO 2011077859 A1 * | 6/2011 |

OTHER PUBLICATIONS

"Need for Speed III: Hot Pursuit—Controls," Allgame, Dec. 31, 1998, XP055147924; http://www.allgame.com/game.php?id=9357&tab=controls.

"iPhone 4 Guide: Preview, Pricing, Availability," Engadget, Jun. 8, 2010, XP055147925, http://www.engadget.com/2010/06/08/iphone-4-guide-preview-pricing-availability-and-more/.

"Pano2VR GIU," Garden Gnome Software, Mar. 5, 2010, XP055147912, https://web.archive.org/web/20100305070650/http://gardengnomesoftware.com/pano2yr_gui_popup.php.

"Flash Panorama Player and QTVR Converter-Pano2VR," Garden Gnome Software, Jun. 18, 2010, XP055147910, https://web.archive.org/web/20100618205423/http://gardengnomesoftware.com/pano2yr.php.

"WPanorama—Panoramic image viewer and screen saver", May 9, 2011 (May 9, 2011), XP055129603, Retrieved from the Internet: URL: https://web.archive.org/web/20110509045348/http://wpanorama.com/wpanorama.php?r=1304916828 [retrieved on Jul. 17, 2014].

"Hands-On: Intel Wireless Display". Jan. 9, 2010 (Jan. 9, 2010), XP055129607, Retrieved from the Internet: URL: http://www.heise.de/newsticker/meldung/Hands-On-Intel-Wirelss-Display-900035.html [retrieved on Jul. 17, 2014] with its English Translation.

"Augmented Reality Panoramas . . . in your browser!", Dec. 21, 2010 (Dec. 21, 2010), XP055128628, Retrieved from the Internet: URL: https://web.archive.org/web/20110523232640/http://blog.occipital.com/2010/12/21/augmented-reality-panoramas-in-your-browser/ [retrieved on Jul. 14, 2014].

"Flash Panorama Player Pano2VR by Garden Gnome Software", May 26, 2011 (May 26, 2011), XP055128978, Retrieved from the Internet: URL: https://web.archive.org/web/20110516092303/http://gardengnomesoftware.com/pano2vr.php [retrieved on Jul. 15, 2014].

Office Action issued in U.S. Appl. No. 13/469,690 dated Jul. 17, 2015.

Office Action issued in U.S. Appl. No. 13/469,690 dated Feb. 2, 2016.

Office Action issued in U.S. Appl. No. 13/469,690 dated Aug. 5, 2016.

Office Action issued in U.S. Appl. No. 13/469,690 dated Nov. 23, 2016.

Office Action issued in U.S. Appl. No. 13/469,690 dated Jul. 13, 2017.

* cited by examiner

F I G. 7
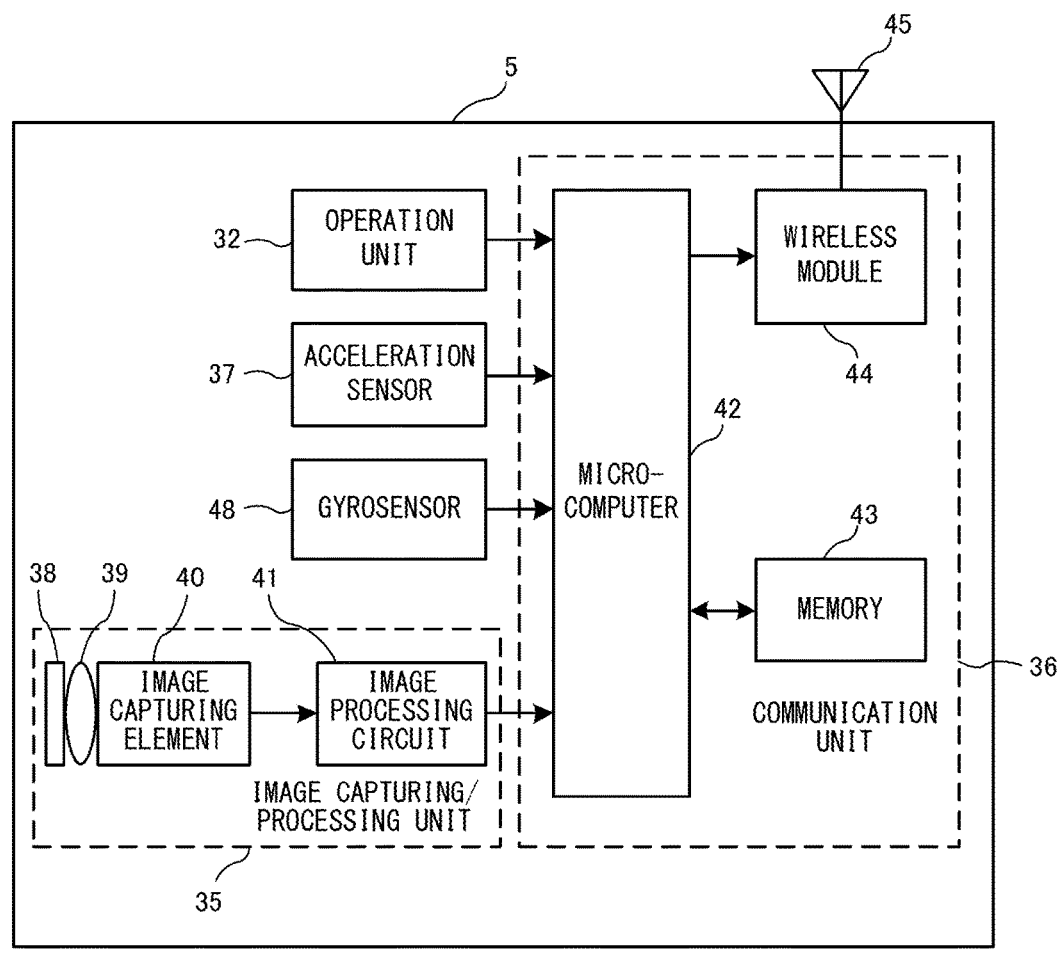

F I G. 8
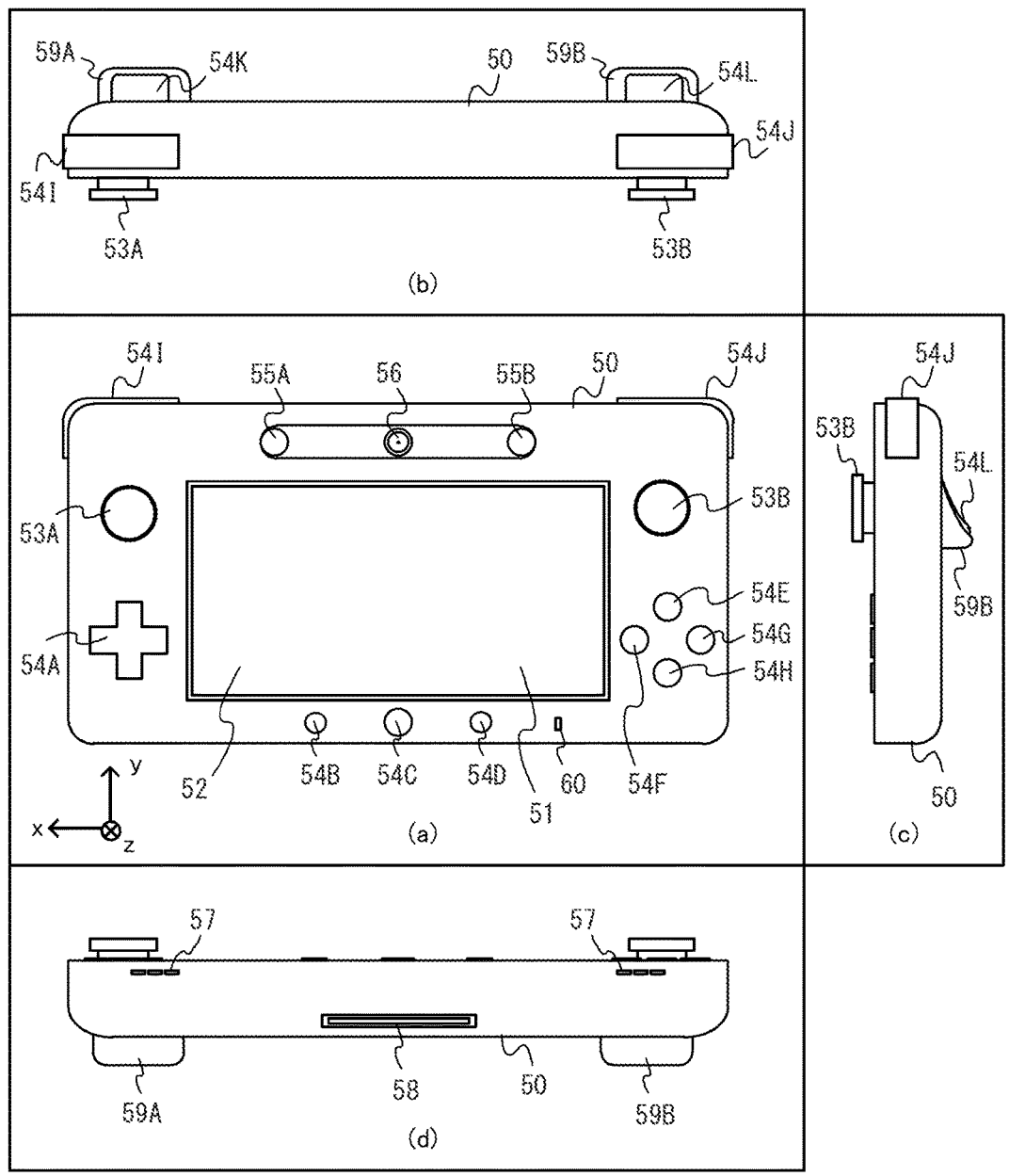

F I G. 9
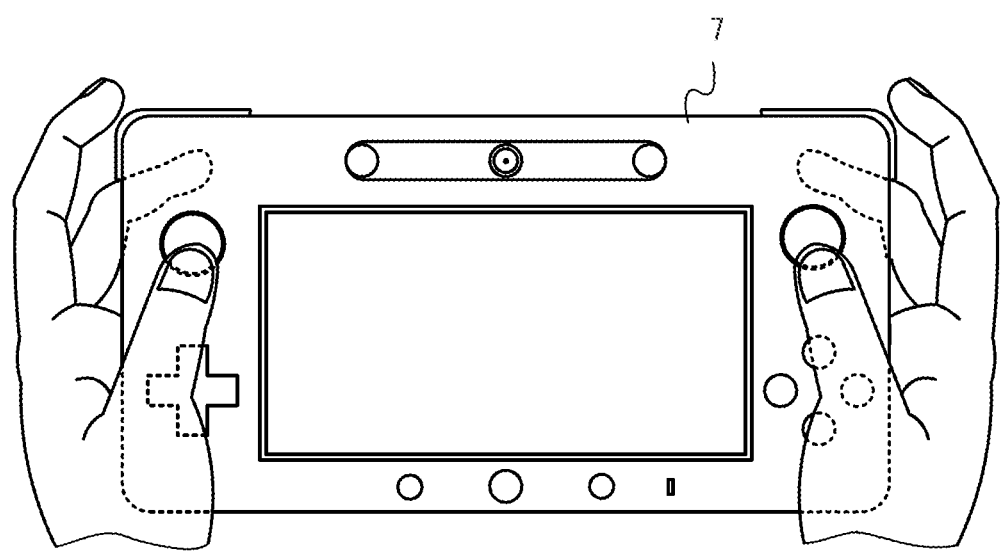

F I G. 1 1
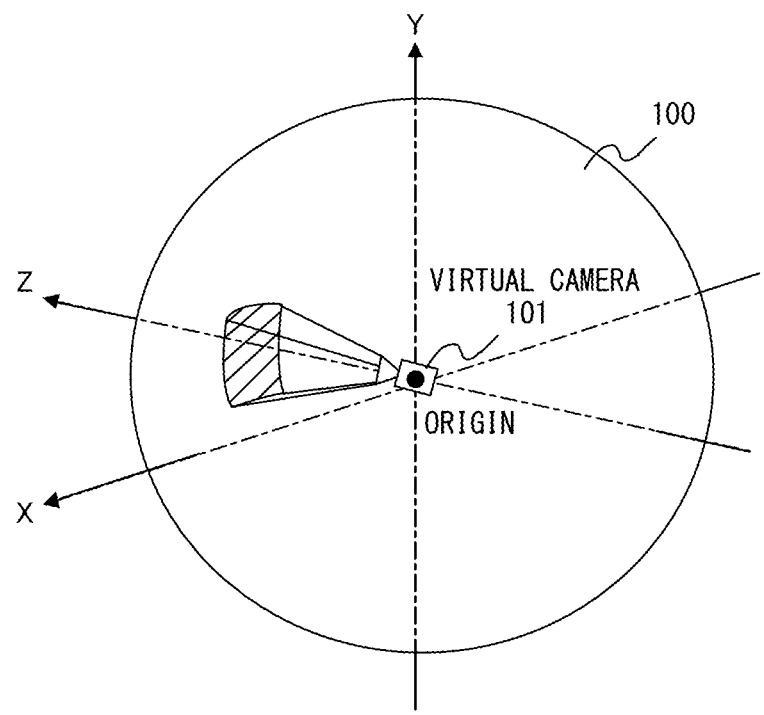

FIG. 19

DATA FORMAT OF PANORAMA IMAGE

PANORAMA TYPE INFORMATION T
COMPLETE SPHERICAL, INCOMPLETE SPHERICAL (DEAD ANGLE IN THE LOWER AREA),
INCOMPLETE SPHERICAL (DEAD ANGLE IN THE UPPER AREA),
LEFT/RIGHT-ONLY ALL-AROUND PANORAMA, LEFT/RIGHT-ONLY PANORAMA)

| FRAME NUMBER | PANORAMA IMAGE | COMPLEMENTARY IMAGE | POSITION INFORMATION | ORIENTATION INFORMATION | MAP IMAGE |
|---|---|---|---|---|---|
| N | Ip | Ic | P | Di | M |
| ... | ... | ... | ... | ... | ... |

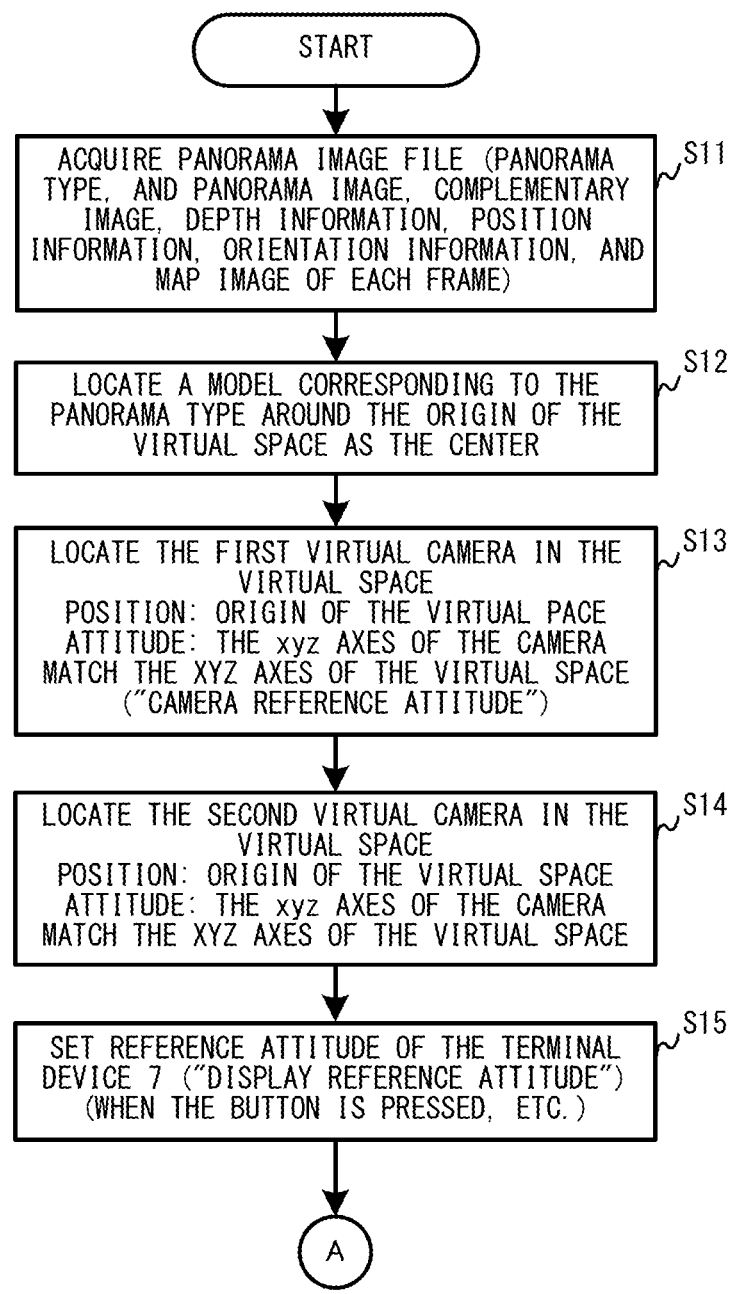
F I G. 2 0

STORAGE MEDIUM STORING INFORMATION PROCESSING PROGRAM, INFORMATION PROCESSING DEVICE, INFORMATION PROCESSING SYSTEM, AND INFORMATION PROCESSING METHOD

CROSS REFERENCE TO RELATED APPLICATION

The disclosures of Japanese Patent Application No. 2011-125866 filed on Jun. 3, 2011 and Japanese Patent Application No. 2012-102613 filed on Apr. 27, 2012 are incorporated herein by reference.

FIELD

The technology described herein relates to a storage medium storing an information processing program, an information processing device, an information processing system, and an information processing method; and specifically to a storage medium storing an information processing program, an information processing device, an information processing system, and an information processing method for, for example, displaying a panorama moving image.

BACKGROUND AND SUMMARY

There is a technology for displaying a virtual space on a portable display in accordance with a movement or an attitude thereof.

However, the above-described technology is for displaying one virtual space on a single display device, and the range which can be displayed is limited.

Accordingly, an object of the example embodiment is to provide a storage medium storing an information processing program, an information processing device, an information processing system, and an information processing method capable of displaying an image with an improved degree of freedom.

In order to achieve the above object, the example embodiment may adopt, for example, the following structures. It is understood that for interpreting the recitations of the claims, the range thereof is to be interpreted only based on the recitations of the claims, and that in the case where the recitations of the claims are contradictory to the description of the specification, the recitations of the claims are given priority.

An example of structure of a non-transitory computer-readable storage medium having an information processing program stored thereon according to the example embodiment is executed by a computer included in an information processing device for displaying a plurality of images on at least one display device. The information processing program allows the computer to execute reading and sequentially acquiring panorama images from a stored panorama moving image every predetermined time for reproduction on the display device, each of the panorama images being a frame of the panorama moving image; setting a range to be displayed in a first display area in each of the acquired panorama images; setting a range to be displayed in a second display area in each of the acquired panorama images; sequentially displaying, in the first display area, the respective ranges of the acquired panorama images which are set to be displayed in the first display area; and sequentially displaying, in the second display area, the respective ranges of the acquired panorama images which are set to be displayed in the second display area.

The above-mentioned "information processing device" may include a device different from the display device, or alternatively, in the case where the display device has an information processing function, the "information processing device" may include may include the display device. In the former case, processes of the example embodiment may be executed by the "different device", and the display device may perform only the process of displaying an image generated by the "different device". Alternatively, in the case where the display device has an information processing function, the processes of the example embodiment may be realized by a cooperation of the information processing function of the display device and the information processing function of the "different device". The "different device" may execute the processes by a plurality of information processing devices in a distributed manner. The "information processing device" may be a game device in the embodiments described below, or a multi-purpose information processing device such as a general personal computer or the like.

In the case where the display device includes one device, the first display area and the second display area may be provided in different areas in a display screen of the display device. In the case where the display device includes two or more devices, the first display area and the second display area may be provided in such different display devices. In this case, the first display area and the second display area may be respectively provided in two portable display devices or may be respectively provided in a portable display device and a non-portable display device.

The above-mentioned "panorama image" may have an angle of field larger than or equal to 180° in one of an up/down direction and a left/right direction. Further, the "panorama image" may have an angle of field of 360° in one of the directions. In the other direction, the "panorama image" may have an angle of field larger than or equal to the image to be displayed on the first display device and/or the second display device. Further, the "panorama image" may have an angle of field which is larger than or equal to twice the angle of field of the image, larger than or equal to 120°, larger than or equal to 150°, or 180°.

The above-mentioned "stored panorama moving image" may be a moving image captured by a panorama moving image capturing function of the information processing device, or a moving image captured by another device having such a moving image capturing function and stored on a predetermined storage medium or the like after being transmitted thereto by a network.

According to the above, at least parts of panorama images included in the panorama moving image are respectively displayed on a plurality of display devices. Therefore, the panorama image can be displayed with a high degree of freedom. The user can display different images on the two display areas in accordance with the situation or the taste of the user, and an image suitable to the viewing of the panorama moving image can be viewed.

The first display area may be provided in a first display device. The second display area may be provided in a second display device which is different from the first display device. The range of each of the acquired panorama images which is to be displayed on the first display device may be set in accordance with a user operation.

In an example, the first display device and the second display device are each a portable display device. In another example, one of the first display device and the second display device is a portable display device and the other is a non-portable display device. In this case, the non-portable display device may be any type of display device which is connected to an information processing device like a monitor 2 in embodiments described later, is separate from the portable display device, and is capable of displaying a display image generated by the information processing device. For example, the non-portable display device may be integral with the information processing device (may be included in one housing).

According to the above, at least parts of panorama images included in the panorama moving image are respectively displayed on a plurality of display devices, and a range of the panorama image to be displayed on at least one display device is set in accordance with the user operation. Therefore, the panorama image can be displayed with an improved degree of freedom. For example, the user can display different images on the two display areas in accordance with the operation state or the taste of the user, and an image suitable to the user operation can be viewed. The image displayed on the second display device can be used as an image to be viewed by another person different from the user. This may provide a viewing environment which is usable in a state where a plurality of people view the panorama image while communicating to the user.

At least parts of a panorama image of the panorama moving image having substantially the same time axis may be respectively displayed on the first display device and the second display device.

In each same panorama image as the panorama image in which the range to be displayed in the first display area has been set, the range to be displayed in the second display area may be set. The ranges to be displayed in the second display area which are respectively set in the same panorama images as the panorama images, the ranges of which are sequentially displayed in the first display area, may be sequentially displayed in the second display area.

According to the above, at least parts of a panorama image of the panorama moving image having substantially the same time axis are respectively displayed on a plurality of display devices. Therefore, images of at least parts of one, same panorama moving image which is being reproduced on the plurality of display devices can be displayed.

The range to be displayed on the first device and the range to be displayed on the second device may be set in accordance with the positional relationship between the first display device and the second display device in a real space.

The information processing program may allow the computer to further execute determining whether or not the positional relationship between the first display device and the second display device in the real space becomes a predetermined positional relationship. In this case, the range to be displayed on the first display device and the range to be displayed on the second display device may be set based on an attitude of the first display device and/or an attitude of the second display device at the time when it is determined that the positional relationship between first display device and the second display device becomes the predetermined positional relationship, in accordance with a change of the attitude.

According to the above, images which might be obtained by peeking into a space formed by the panorama moving image via a plurality of display devices can be displayed.

The first display device may be a portable display device and may be capable of outputting data in accordance with a user operation. In this case, the range to be displayed on the first display device may be set based on the data output from the first display device.

The second display device may be a non-portable display device.

The above-mentioned "portable display device" has a size with which the portable display device can be moved while being held by the user or can be carried to any position by the user. The "portable display device" may have a function of executing the processes of the example embodiment, or may receive an image generated by another information processing device and merely execute the process of displaying the image.

According to the above, a unit for outputting data for changing the display range of the panorama image and a display device for displaying the display area of the panorama image are integrated together. This provides a superb environment for allowing the user holding the display device to display a desired display range.

The first display device may include a sensor for outputting data in accordance with a movement or an attitude of the first display device. In this case, the range to be displayed on the first display device may be set in accordance with the attitude of the first display device which is calculated based on the data output from the sensor.

The above-mentioned "sensor" may be a gyrosensor, an acceleration sensor, a geomagnetic sensor, or any other sensor which outputs data for calculating the attitude of the first display device.

The above-mentioned "setting the range to be displayed in the first display area" is, typically, to move the range to be displayed on the first display device in accordance with the change of the attitude of the first display device in at least the same direction as the change. Alternatively, the above-mentioned "setting the range to be displayed in the first display area" is to increase the amount of movement of the range as the amount of change of the attitude of the first display device is increased. Still alternatively, the above-mentioned "setting the range to be displayed in the first display area" is to make the amount of change of the attitude of the first display device equal to the amount of change of the attitude of the virtual camera for generating the image of the range. The above-mentioned "setting the range to be displayed in the first display area" may be to control the change of the attitude of the virtual camera from the reference attitude to the current attitude in accordance with the change of the attitude of the first display device from the reference attitude to the current attitude, or to control the change of the attitude of the virtual camera from the immediately previous attitude to the current attitude in accordance with the change of the attitude of the first display device from the immediately previous attitude to the current attitude. The above-mentioned "attitude" may be set two-dimensionally or three-dimensionally.

According to the above, by changing the attitude of the display device which is being held, the display range of the panorama image in accordance with the change of the attitude is displayed. Therefore, an image which might be obtained by peeking into a space formed by the panorama moving image via the first display device can be displayed on the first display device.

The sensor may be at least one of a gyrosensor and an acceleration sensor for outputting the data in accordance with a movement or an attitude of the first display device. In this case, the range to be displayed on the first display device may be set in accordance with the attitude of the first display device which is calculated based on the data output from at least one of the gyrosensor and the acceleration sensor easily.

According to the above, by use of the angular velocity data obtained from the gyrosensor or the acceleration data obtained from the acceleration sensor, the attitude of the display device can be calculated.

A predetermined range of the panorama image may be set as the range to be displayed on the second display device.

According to the above, a predetermined range in a space formed by the panorama moving image is always displayed on the second display device. Therefore, the user can always view the predetermined range of the panorama moving image.

The stored panorama moving image may be a panorama moving image which is captured at a point of view moving in a real world or a virtual world. In this case, the predetermined range may be a range of the panorama image captured at the moving point of view as viewed in a direction of moving.

According to the above, a space of the panorama moving image moving toward the position at which the second display device is located can be formed. Thus, the user can view the panorama moving image while recognizing this moving direction.

A range larger than the range of the panorama image to be displayed on the first display device may be set as the range to be displayed on the second display device.

According to the above, a plurality of display devices can be used for different sizes of desirable display range; for example, the second display device is viewed for viewing a larger range.

The first display device may be a portable display device and may be capable of outputting data in accordance with a user operation. The second display device may be a non-portable display device. The range to be displayed on the first display device may be set based on the data output from the first display device. The range which has been set as the range to be displayed on the first display device may be set as the range to be displayed on the second display device.

According to the above, the same range as that of the panorama moving image displayed on the first display device is also displayed on the second display device. Therefore, the panorama moving image viewed by the user operating the portable first display device can be also viewed by another user via the non-portable second display device.

The first display device may be a portable display device and may be capable of outputting data in accordance with a user operation. The second display device may be a non-portable display device. The range to be displayed on the first display device may be set based on the data output from the first display device. The range to be displayed on the second display device may be set based on the range set to be displayed on the first display device, and a range in which a change amount, by which the range to be displayed on the first display device is changed in accordance with a user operation, is suppressed may be set as the range to be displayed on the second display device.

According to the above, when substantially the same range as that of the panorama moving image to be displayed on the portable first display device is to be displayed on the non-portable second display device, the range of the panorama image to be displayed on the first display device is displayed on the second display device in the state where the amount of change in accordance with a user operation is suppressed. Therefore, another user viewing the second display device is prevented from having visually induced motion sickness.

Panorama images read from the stored panorama moving image by decoding may be sequentially acquired. The range to be displayed on the first display device may be set in each of the panorama images acquired by decoding. The range to be displayed on the second display device may be set in each of the panorama images acquired by decoding. The respective ranges, of the panorama images acquired by decoding, which are set to be displayed on the first display device may be sequentially displayed on the first display device. The respective ranges, of the panorama images acquired by decoding, which are set to be displayed on the second display device may be sequentially displayed on the second display device.

According to the above, the panorama images acquired by decoding are respectively displayed on a plurality of display devices. Therefore, the processing load for the display can be reduced.

Data representing an image to be displayed on the first display device may be output to the first display device. The first display device may include an image data acquisition unit. The image data acquisition unit acquires the output data. In this case, a display screen of the first display device may display an image represented by the image data acquired by the image data acquisition unit.

According to the above, the first display device can act as a so-called thin client terminal which does not execute an information process such as a game process or the like.

The second display device may be a portable display device and may be capable of outputting data in accordance with a user operation. The range to be displayed on the second display device may be set based on the data output from the second display device.

According to the above, at least parts of the panorama images can be displayed on a plurality of portable display devices.

The second display device may include a sensor for outputting data in accordance with a movement or an attitude of the second display device. In this case, the range to be displayed on the second display device may be set in accordance with the attitude of the second display device which is calculated based on the data output from the sensor.

According to the above, by changing the attitude of the display devices respectively held by a plurality of users, the display ranges of the panorama image in accordance with the changes of the attitude. Therefore, images which might be obtained by the plurality of users peeking into a space formed by the panorama moving image via the plurality of display devices can be displayed on the respective display devices.

The information processing program may allow the computer to further execute accepting an input from each of input devices associated with the plurality of display devices. In this case, the range to be displayed on the first display device may be set in the acquired panorama image based on the input accepted by a first input device associated with the first display device. The range to be displayed on the second display device may be set in the acquired panorama image based on the input accepted by a second input device associated with the second display device.

According to the above, by operating the input devices respectively corresponding to the display devices, the display range can be freely changed.

The example embodiment may be carried out in the form of an information processing device or an information processing system each including units for performing the above-described processes, or in the form of an information processing method including the above-described operations.

According to the example embodiment, an image can be displayed with an improved degree of freedom.

These and other objects, features, aspects and advantages of the example embodiment will become more apparent from the following detailed description when taken in conjunction with the accompanying drawings.

BRIEF DESCRIPTION OF THE DRAWINGS

FIG. 7 is a block diagram showing an example non-limiting configuration of the controller 5;

FIG. 8 is a diagram showing an example non-limiting external configuration of a terminal device 7;

FIG. 9 shows an example non-limiting manner in which a user holds the terminal device 7;

FIG. 11 is an example non-limiting schematic view in the case of a complete spherical panorama image;

FIG. 19 shows an example non-limiting data format of a file;

FIG. 20 is a flowchart showing an example non-limiting process in a first embodiment executed by the game device 3;

DETAILED DESCRIPTION OF NON-LIMITING EXAMPLE EMBODIMENTS

[1. General Configuration of Game System]

Figure 1:
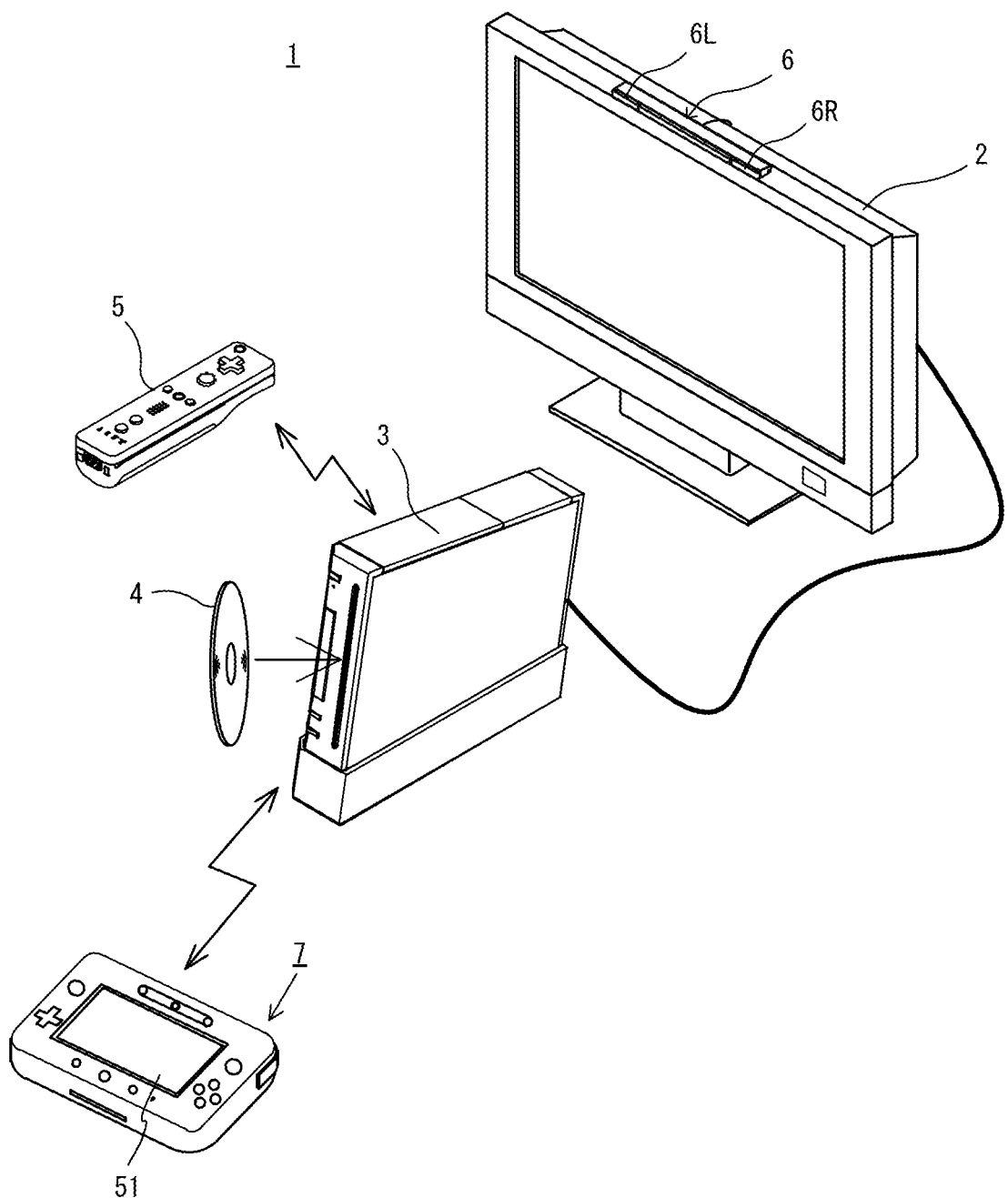
FIG. 1 is an external view of an example non-limiting game system 1.

An example non-limiting game system 1 according to an example embodiment will now be described with reference to the drawings. FIG. 1 is an external view of the game system 1. In FIG. 1, the game system 1 includes a non-portable display device (hereinafter referred to as a "monitor") 2 such as a television receiver, a home-console type game device 3, an optical disc 4, a controller 5, a marker device 6, and a terminal device 7. In the game system 1, the game device 3 performs game processes based on game operations performed using the controller 5 and the terminal device 7, and game images obtained through the game processes are displayed on the monitor 2 and/or the terminal device 7.

In the game device 3, the optical disc 4 typifying an information storage medium used for the game device 3 in a replaceable manner is removably inserted. An information processing program (a game program, for example) to be executed by the game device 3 is stored in the optical disc 4. The game device 3 has, on a front surface thereof, an insertion opening for the optical disc 4. The game device 3 reads and executes the information processing program stored on the optical disc 4 which is inserted into the insertion opening, to perform the game process.

The monitor 2 is connected to the game device 3 by a connecting cord. Game images obtained as a result of the game processes performed by the game device 3 are displayed on the monitor 2. The monitor 2 includes a speaker 2a (see FIG. 2), and a speaker 2a outputs game sounds obtained as a result of the game process. In other embodiments, the game device 3 and the non-portable display device may be an integral unit. Also, the communication between the game device 3 and the monitor 2 may be wireless communication.

The marker device 6 is provided along a periphery of the screen (on the upper side of the screen in FIG. 1) of the monitor 2. A user (player) can perform game operations of moving the controller 5, the details of which will be described later, and the marker device 6 is used by the game device 3 for calculating the movement, position, attitude, etc., of the controller 5. The marker device 6 includes two markers 6R and 6L on opposite ends thereof. Specifically, a marker 6R (as well as a marker 6L) includes one or more infrared LEDs (Light Emitting Diodes), and emits infrared light in a forward direction of the monitor 2. The marker device 6 is connected to the game device 3, and the game device 3 is able to control the lighting of each infrared LED of the marker device 6. The marker device 6 is portable, and the user can arrange the marker device 6 at any position. While FIG. 1 shows an embodiment in which the marker device 6 is arranged on top of the monitor 2, the position and the direction of arranging the marker device 6 are not limited to this particular arrangement.

The controller 5 provides the game device 3 with operation data representing the content of operations performed on the controller itself. The controller 5 and the game device 3 can communicate with each other by wireless communication. In the present embodiment, the wireless communication between a controller 5 and the game device 3 uses, for example, the Bluetooth (registered trademark) technology. In other embodiments, the controller 5 and the game device 3 may be connected by a wired connection. While only one controller 5 is included in the game system 1 in the present embodiment, the game device 3 can communicate with a plurality of controllers, and a game can be played by multiple players by using a predetermined number of controllers at the same time. A detailed configuration of the controller 5 will be described below.

The terminal device 7 is sized so that it can be held in one or both of the user's hands, and the user can hold and move the terminal device 7, or can use a terminal device 7 placed at an arbitrary position. The terminal device 7, whose detailed configuration will be described below, includes an LCD (Liquid Crystal Display) 51 as a display device and input units (e.g., a touch panel 52, a gyrosensor 64, etc., to be described later). The terminal device 7 and the game device 3 can communicate with each other by a wireless connection (or by a wired connection). The terminal device 7 receives from the game device 3 data of images (e.g., game images) generated by the game device 3, and displays the images on the LCD 51. While an LCD is used as the display device in the present embodiment, the terminal device 7 may include any other display device such as a display device utilizing EL (Electro Luminescence), for example. The terminal device 7 transmits operation data representing the content of operations performed on the terminal device itself to the game device 3.

[2. Internal Configuration of Game Device 3]

Figure 2:
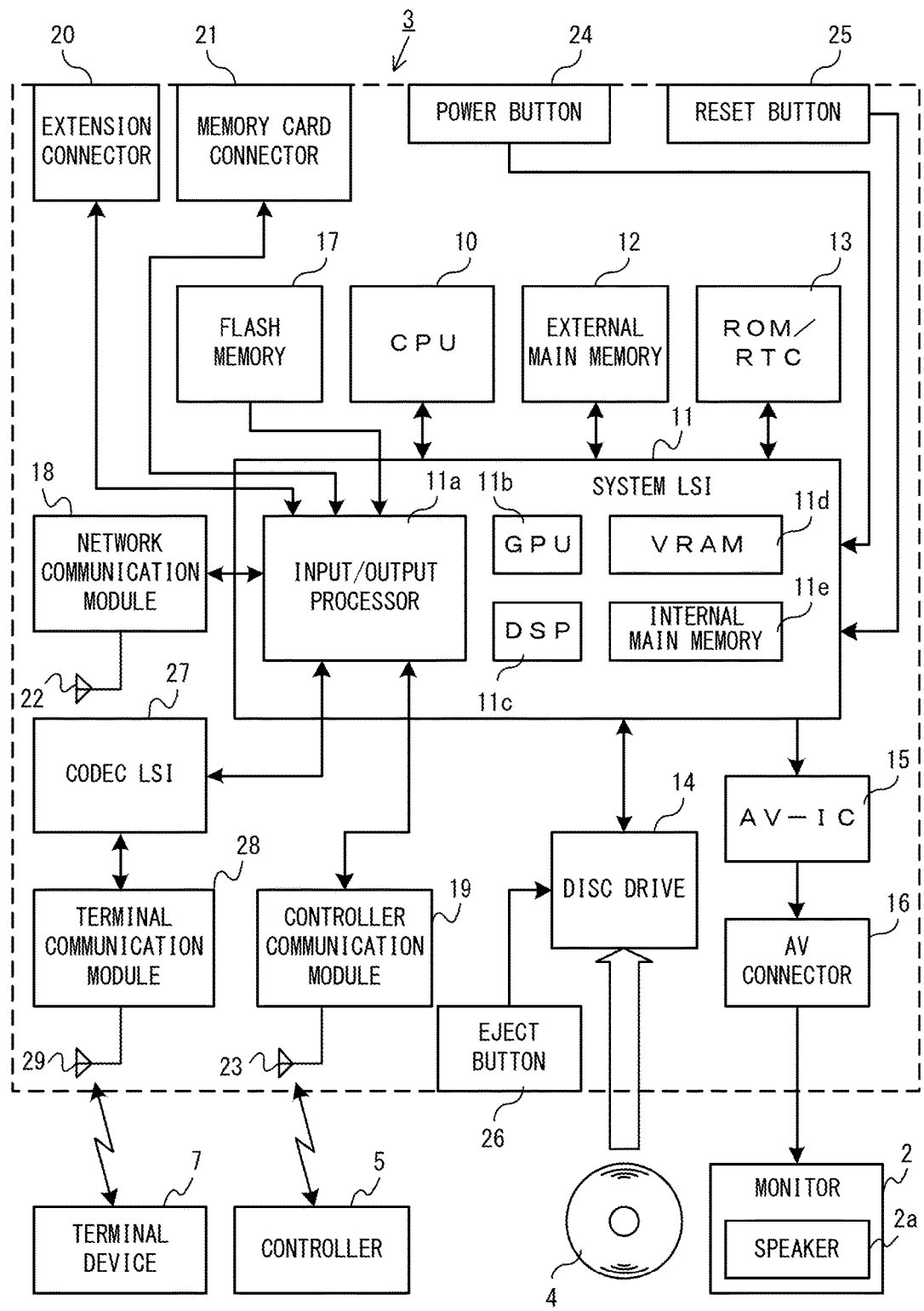
FIG. 2 is a block diagram showing an example non-limiting internal configuration of a game device 3.

An internal configuration of the game device 3 will be described with reference to FIG. 2. FIG. 2 is a block diagram illustrating the internal configuration of the game device 3. The game device 3 includes a CPU (Central Processing Unit) 10, a system LSI 11, an external main memory 12, a ROM/RTC 13, a disc drive 14, an AV-IC 15, and the like.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transfer between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from a flash memory 17, and various other data. The external main memory 12 is used as a work area or a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into an internal main memory 11*e* (to be described below) or the external main memory 12.

The system LSI 11 includes an input/output processor (I/O processor) 11*a*, a GPU (Graphics Processor Unit) lib, a DSP (Digital Signal Processor) 11*c*, a VRAM (Video RAM) 11*d*, and the internal main memory 11*e*. Although not shown in the figures, these components 11*a* to 11*e* are connected with each other through an internal bus.

The GPU 11*b*, acting as a part of a rendering unit, generates images in accordance with graphics commands (rendering commands) from the CPU 10. The VRAM 11*d* stores data (data such as polygon data and texture data) used for the GPU 11*b* to execute the graphics commands. For generating images, the GPU 11*b* generates image data using data stored in the VRAM 11*d*. The game device 3 generates both of images to be displayed on the monitor 2 and images to be displayed on the terminal device 7. Hereinafter, images to be displayed on the monitor 2 may be referred to as "monitor images", and images to be displayed on the terminal device 7 may be referred to as "terminal images".

The DSP 11*c*, functioning as an audio processor, generates sound data using data on sounds and sound waveform (e.g., tone quality) data stored in one or both of the internal main memory 11*e* and the external main memory 12. In the present embodiment, as with the game images, game sounds to be outputted from the speaker of the monitor 2 and game sounds to be outputted from the speaker of the terminal device 7 are both generated. Hereinafter, the sounds outputted from the monitor 2 may be referred to as "monitor sounds", and the sounds outputted from the terminal device 7 may be referred to as "terminal sounds".

As described above, of the images and sounds generated in the game device 3, the image data and the sound data outputted from the monitor 2 are read out by the AV-IC 15. The AV-IC 15 outputs the read-out image data to the monitor 2 via an AV connector 16, and outputs the read-out sound data to the speaker 2*a* provided in the monitor 2. Thus, images are displayed on the monitor 2, and sounds are outputted from the speaker 2*a*. While the connection scheme between the game device 3 and the monitor 2 may be any scheme, the game device 3 may transmit control commands, for controlling the monitor 2, to the monitor 2 via a wired connection or a wireless connection. For example, an HDMI (High-Definition Multimedia Interface) cable in conformity with the HDMI standard may be used. In the HDMI standard, it is possible to control the connected device by a function called CEC (Consumer Electronics Control). Thus, in a case in which the game device 3 can control the monitor 2, as when an HDMI cable is used, the game device 3 can turn ON the power of the monitor 2 or switch the input of the monitor 2 from one to another at any point in time.

Of the images and sounds generated in the game device 3, the image data and the sound data outputted from the terminal device 7 are transmitted to the terminal device 7 by the input/output processor 11*a*, etc. The data transmission to the terminal device 7 by the input/output processor 11*a*, or the like, will be described below.

The input/output processor 11*a* exchanges data with components connected thereto, and downloads data from an external device(s). The input/output processor 11*a* is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to a network such as the Internet to communicate with external information processing devices (e.g., other game devices, various servers, computers, etc.). That is, the input/output processor 11a can be connected to a network such as the Internet via the network communication module 18 and the antenna 22 and can communicate with other device(s) connected to the network. The input/output processor 11a regularly accesses the flash memory 17, and detects the presence or absence of any data to be transmitted to the network, and when there is such data, transmits the data to the network via the network communication module 18 and the antenna 22. Further, the input/output processor 11a receives data transmitted from an external information processing device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and an external information processing device. The flash memory 17 may also store a game program(s).

The game device 3 can receive operation data from the controller 5. That is, the input/output processor 11a receives operation data transmitted from the controller 5 via the antenna 23 and the controller communication module 19, and stores (temporarily) it in a buffer area of the internal main memory 11e or the external main memory 12.

The game device 3 can exchange data such as images and sounds with the terminal device 7. When transmitting game images (terminal game images) to the terminal device 7, the input/output processor 11a outputs data of game images generated by the GPU lib to the codec LSI 27. The codec LSI 27 performs a predetermined compression process on the image data from the input/output processor 11a. The terminal communication module 28 wirelessly communicates with the terminal device 7. Therefore, image data compressed by the codec LSI 27 is transmitted by the terminal communication module 28 to the terminal device 7 via the antenna 29. In the present embodiment, the image data transmitted from the game device 3 to the terminal device 7 is image data used in a game, and the playability of a game can be adversely influenced if there is a delay in the images displayed in the game. Therefore, delay may be eliminated as much as possible for the transmission of image data from the game device 3 to the terminal device 7. Therefore, in the present embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use any other communication scheme.

The game device 3 transmits sound data to the terminal device 7, in addition to image data. That is, the input/output processor 11a outputs sound data generated by the DSP 11c to the terminal communication module 28 via the codec LSI 27. The codec LSI 27 performs a compression process on sound data, as with image data. While the compression scheme for sound data may be any scheme, a scheme with a high compression ratio and little sound deterioration is usable. In other embodiments, the sound data may be transmitted uncompressed. The terminal communication module 28 transmits the compressed image data and sound data to the terminal device 7 via the antenna 29.

Moreover, the game device 3 transmits various control data to the terminal device 7 optionally, in addition to the image data and the sound data. Control data is data representing control instructions for components of the terminal device 7, and represents, for example, an instruction for controlling the lighting of a marker unit (a marker unit 55 shown in FIG. 10), an instruction for controlling the image-capturing operation of a camera (a camera 56 shown in FIG. 10), etc. The input/output processor 11a transmits control data to the terminal device 7 in response to an instruction of the CPU 10. While the codec LSI 27 does not perform a data compression process for the control data in the present embodiment, the codec LSI 27 may perform a compression process in other embodiments. The above-described data transmitted from the game device 3 to the terminal device 7 may be optionally encrypted or may not be encrypted.

The game device 3 can receive various data from the terminal device 7. In the present embodiment, the terminal device 7 transmits operation data, image data and sound data, the details of which will be described below. Such data transmitted from the terminal device 7 are received by the terminal communication module 28 via the antenna 29. The image data and the sound data from the terminal device 7 have been subjected to a compression process similar to that on the image data and the sound data from the game device 3 to the terminal device 7. Therefore, these image data and sound data are sent from the terminal communication module 28 to the codec LSI 27, and subjected to an expansion process by the codec LSI 27 to be outputted to the input/output processor 11a. On the other hand, the operation data from the terminal device 7 may not be subjected to a compression process since the amount of data is small as compared with images and sounds. The operation data may be optionally encrypted, or it may not be encrypted. After being received by the terminal communication module 28, the operation data is outputted to the input/output processor 11a via the codec LSI 27. The input/output processor 11a stores (temporarily) data received from the terminal device 7 in a buffer area of the internal main memory 11e or the external main memory 12.

The game device 3 can be connected to another device or an external storage medium. That is, the input/output processor 11a is connected to the extension connector 20 and the memory card connector 21. The extension connector 20 is a connector for an interface, such as a USB or SCSI interface. The extension connector 20 can be connected to a medium such as an external storage medium, a peripheral device such as another controller, or a wired communication connector, which enables communication with a network in place of the network communication module 18. The memory card connector 21 is a connector for connecting thereto an external storage medium such as a memory card.

For example, the input/output processor 11a can access an external storage medium via the extension connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is turned ON, power is supplied to the components of the game device 3 from an external power supply through an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other embodiments, some of the components of the game device 3 may be provided as extension devices separate from the game device 3. In this case, such an extension device may be connected to the game device 3 via the extension connector 20, for example. Specifically, the extension device may include components of the codec LSI 27, the terminal communication module 28 and the antenna 29, for example, and can be attached/detached to/from the extension connector 20. Thus, by connecting the extension device to a game device which does not include the above components, the game device can be made communicable with the terminal device 7.

[3. Configuration of Controller 5]

Figure 3:
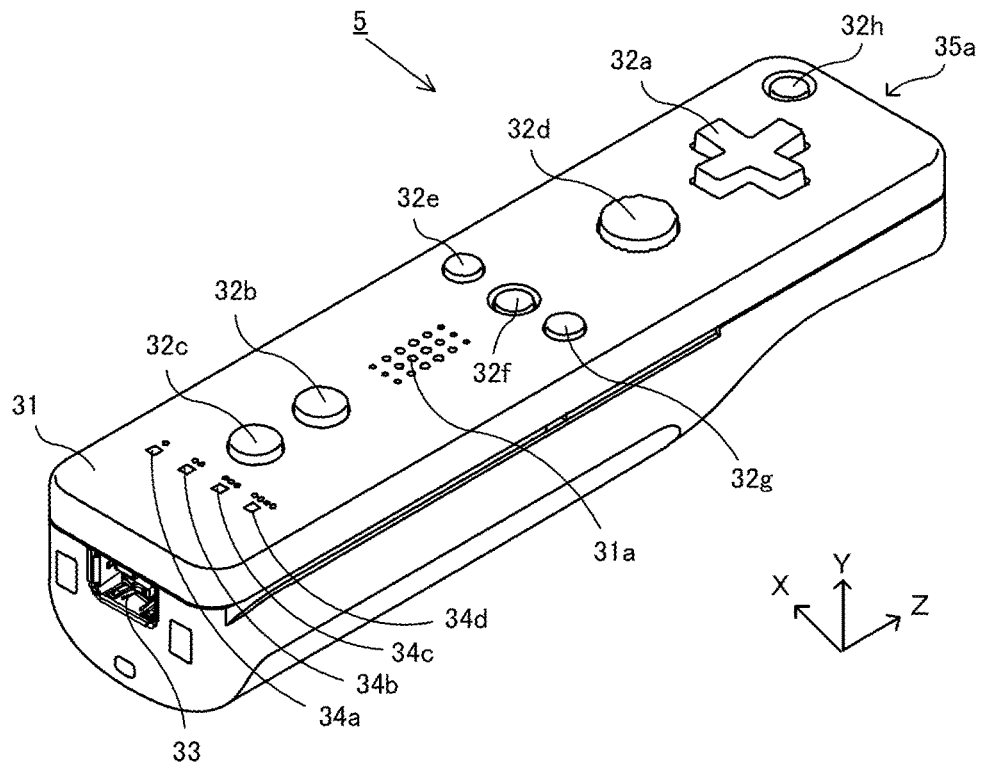
FIG. 3 is a perspective view showing an example non-limiting external configuration of a controller 5.
Figure 4:
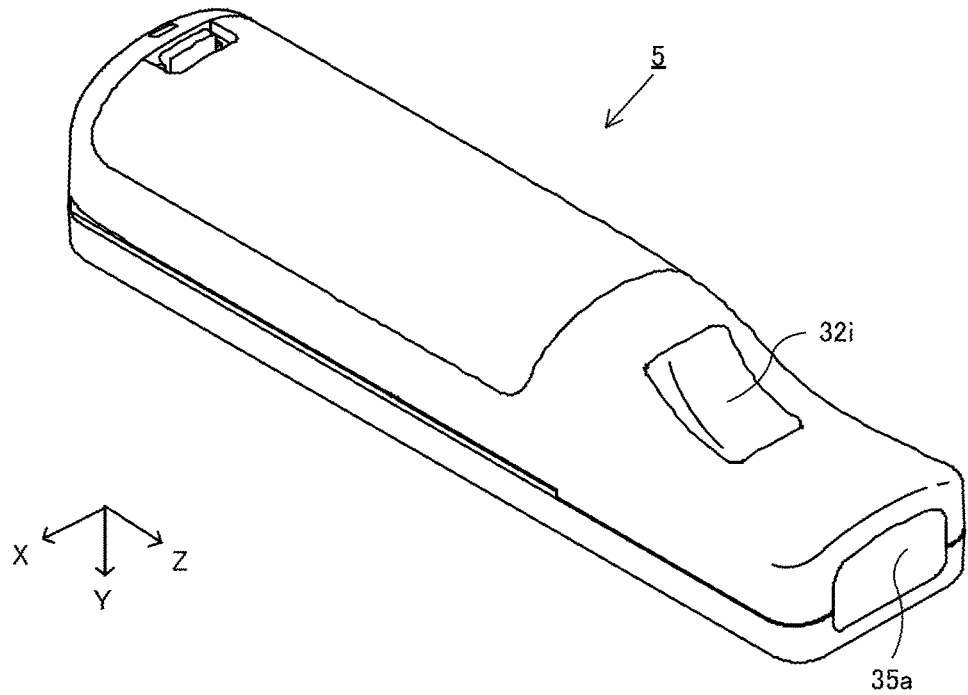
FIG. 4 is a perspective view showing an example non-limiting external configuration of the controller 5.

Next, with reference to FIGS. 3 to 7, the controller 5 will be described. FIG. 3 is a perspective view illustrating an external configuration of the controller 5. FIG. 4 is a perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIGS. 3 and 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or a child. The user can perform game operations by pressing buttons provided on the controller 5, and by moving the controller 5 itself to change the position and the attitude (tilt) thereof.

The housing 31 has a plurality of operation buttons. As shown in FIG. 3, on a top surface of the housing 31, a cross button 32a, a first button 32b, a second button 32c, an A button 32d, a minus button 32e, a home button 32f, a plus button 32g, and a power button 32h are provided. In the present specification, the top surface of the housing 31 on which the buttons 32a to 32h are provided may be referred to as a "button surface". As shown in FIG. 4, a recessed portion is formed on a bottom surface of the housing 31, and a B button 32i is provided on a rear slope surface of the recessed portion. The operation buttons 32a to 32i are optionally assigned their respective functions in accordance with the information processing program to be executed by the game device 3. Further, the power button 32h is used to remotely turn ON/OFF the game device 3. The home button 32f and the power button 32h each have the top surface thereof recessed below the top surface of the housing 31. Therefore, the likelihood of the home button 32f and the power button 32h being inadvertently pressed by the user is reduced.

On a rear surface of the housing 31, a connector 33 is provided. The connector 33 is used for connecting another device (e.g., another sensor unit or another controller) to the controller 5. Both sides of the connector 33 on the rear surface of the housing 31 have an engagement hole 33a for preventing easy inadvertent disengagement of a device connected to the controller 5 as described above.

In the rear-side portion of the top surface of the housing 31, a plurality of (four in FIG. 3) LEDs 34a to 34d are provided. The controller 5 is assigned a controller type (number) so as to be distinguishable from other controllers. The LEDs 34a to 34d are each used for informing the user of the controller type which is currently set for the controller 5, and for informing the user of the battery level of the controller 5, for example. Specifically, when game operations are performed using the controller 5, one of the plurality of LEDs 34a to 34d corresponding to the controller type is lit up.

The controller 5 has an image capturing/processing unit (FIG. 6), and a light incident surface 35a of an image capturing/processing unit 35 is provided on a front surface of the housing 31, as shown in FIG. 4. The light incident surface 35a is made of a material transmitting therethrough at least infrared light from the markers 6R and 6L.

On the top surface of the housing 31, sound holes 31a for externally outputting a sound from a speaker 47 (see FIG. 5) provided in the controller 5 are provided between the first button 32b and the home button 32f.

Figure 5:
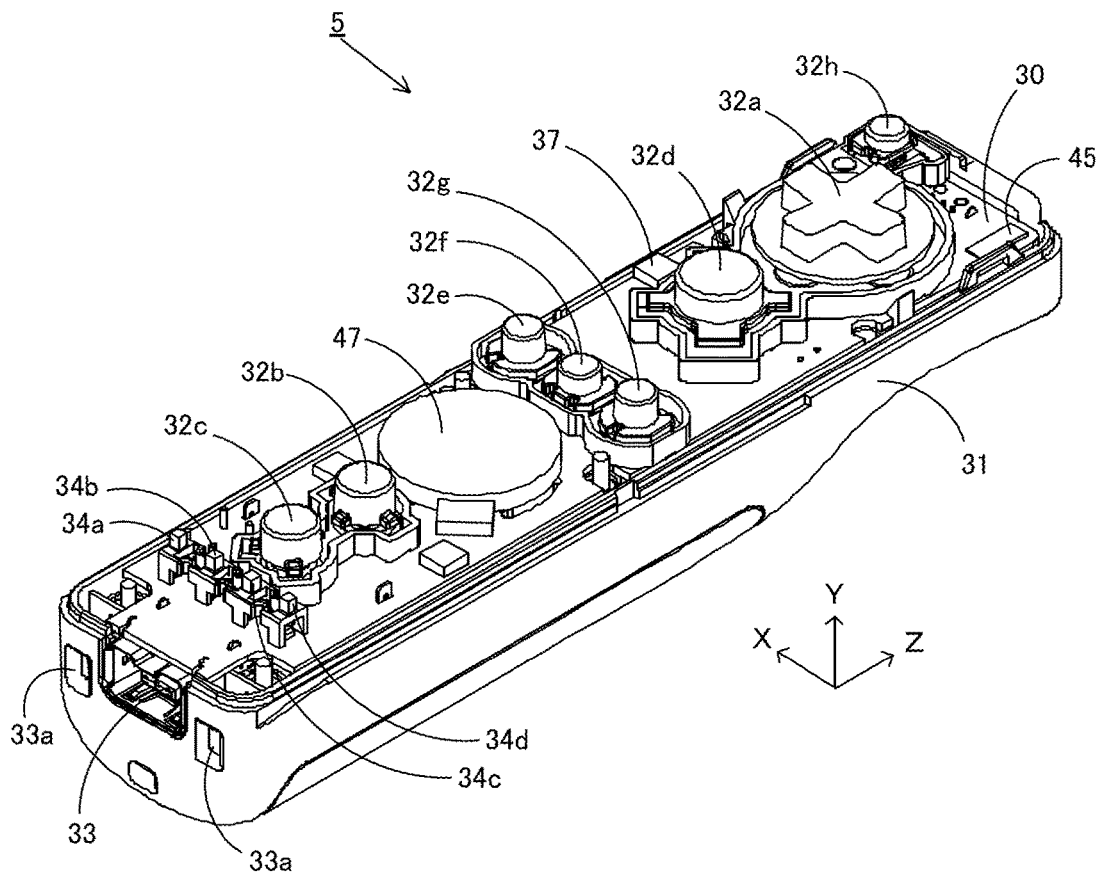
FIG. 5 is a diagram showing an example non-limiting internal configuration of the controller 5.
Figure 6:
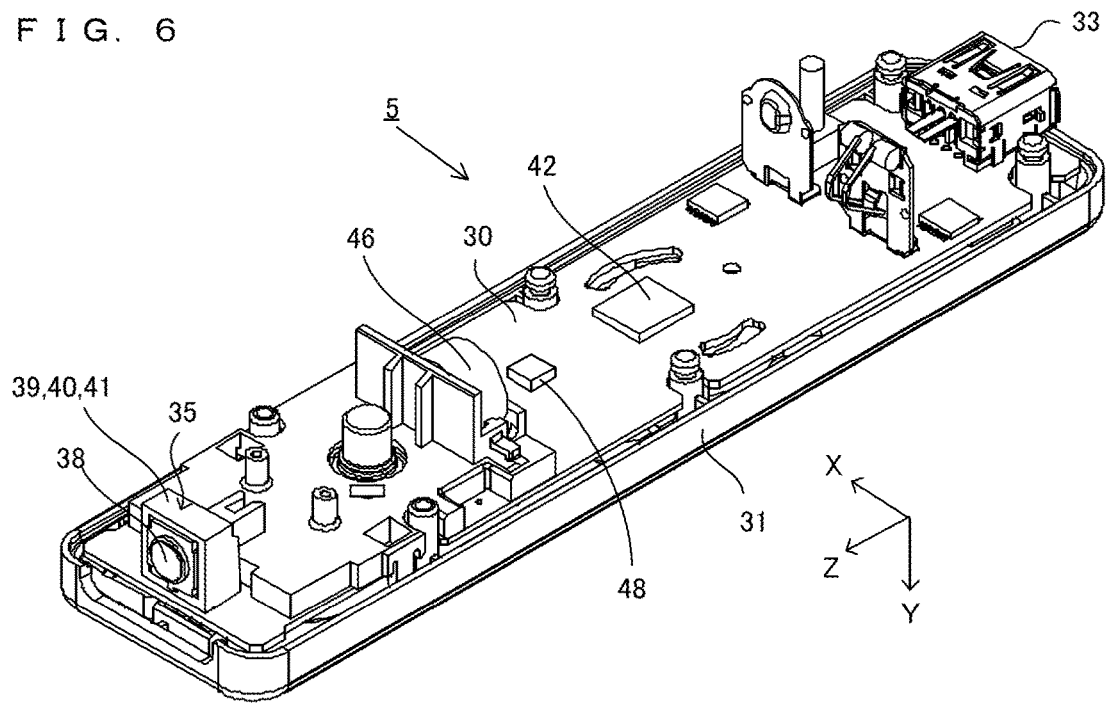
FIG. 6 is a diagram showing an example non-limiting internal configuration of the controller 5.

Next, with reference to FIGS. 5 and 6, an internal configuration of the controller 5 will be described. FIGS. 5 and 6 are diagrams illustrating the internal configuration of the controller 5. FIG. 5 is a perspective view illustrating a state in which an upper casing (a part of the housing 31) of the controller 5 is removed. FIG. 6 is a perspective view illustrating a state in which a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 47, and the like are provided. These elements are connected to a microcomputer 42 (see FIG. 6) via lines (not shown) formed on the substrate 30 and the like. In the present embodiment, the acceleration sensor 37 is provided at a position offset from the center of the controller 5 with respect to an X-axis direction. Thus, calculation of the movement of the controller 5 when the controller 5 is rotated about the Z-axis is facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

As shown in FIG. 6, at a front edge of a bottom main surface of the substrate 30, the image capturing/processing unit 35 is provided. The image capturing/processing unit 35 includes an infrared filter 38, a lens 39, an image-capturing element 40 and an image processing circuit 41 located in this order from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present embodiment, the vibrator 46 is disposed slightly toward the front portion of the housing 31. That is, the vibrator 46 is positioned offset from the center toward the end of the controller 5 so that the vibration of the vibrator 46 significantly vibrates the entire controller 5. Further, the connector 33 is provided at a rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 47, and the like.

The shape of the controller 5, the shape of each operation button, the number and the positions of acceleration sensors and vibrators, and so on, shown in FIGS. 3 to 6 are merely illustrative, and these components may be implemented with any other shape, number, and position. Further, while the image-capturing direction of the image-capturing unit is the Z-axis positive direction in the present embodiment, the image-capturing direction may be any other direction. That is, the position of the image capturing/processing unit 35 (the light incident surface 35a of the image capturing/processing unit 35) in the controller 5 may not be on the front surface of the housing 31, but may be on any other surface on which light can be received from the outside of the housing 31.

FIG. 7 is a block diagram illustrating the configuration of the controller 5. The controller 5 includes an operation unit 32 (the operation buttons 32a to 32i), the image capturing/processing unit 35, a communication unit 36, the acceleration sensor 37, and a gyrosensor 48. The controller 5 transmits, to the game device 3, data representing the content of operations performed on the controller itself as operation data. Hereinafter, the operation data transmitted by the controller 5 may be referred to as the "controller operation data", and the operation data transmitted by the terminal device 7 may be referred to as the "terminal operation data".

The operation unit 32 includes the operation buttons 32a to 32i described above, and outputs, to the microcomputer 42 of the communication unit 36, operation button data indicating the input status of the operation buttons 32a to 32i (e.g., whether or not the operation buttons 32a to 32i are pressed).

The image capturing/processing unit 35 is a system for analyzing image data captured by the image-capturing element and calculating the centroid, the size, etc., of an area(s) having a high brightness in the image data. The image capturing/processing unit 35 has a sampling period of, for example, about 200 frames/sec. at the maximum, and therefore, can trace and analyze even a relatively fast movement of the controller 5.

The image capturing/processing unit 35 includes the infrared filter 38, the lens 39, the image-capturing element 40 and the image processing circuit 41. The infrared filter 38 transmits there through only infrared light among the light incident on the front surface of the controller 5. The lens 39 collects the infrared light transmitted through the infrared filter 38 so that it is incident on the image-capturing element 40. The image-capturing element 40 is a solid-state image-capturing device such as, for example, a CMOS sensor or a CCD sensor, which receives the infrared light collected by the lens 39, and outputs an image signal. The marker unit 55 of the terminal device 7 and the marker device 6, which are image-capturing targets, are formed of markers for outputting infrared light. Therefore, the provision of the infrared filter 38 enables the image-capturing element 40 to receive only the infrared light transmitted through the infrared filter 38 and generate image data, so that an image of the image-capturing targets (e.g., the marker unit 55 and/or the marker device 6) can be captured more accurately. Hereinafter, an image taken by the image-capturing element 40 will be referred to as a captured image. The image data generated by the image-capturing element 40 is processed by the image processing circuit 41. The image processing circuit 41 calculates the positions of the image-capturing targets within the captured image. The image processing circuit 41 outputs coordinates of the calculated positions, to the microcomputer 42 of the communication unit 36. The data representing the coordinates is transmitted as operation data to the game device 3 by the microcomputer 42. Hereinafter, such coordinates will be referred to as "marker coordinates". The marker coordinates change depending on the orientation (tilt angle) and/or the position of the controller 5 itself, and therefore the game device 3 can calculate, for example, the orientation and the position of the controller 5 using the marker coordinates.

In other embodiments, the controller 5 may not include the image processing circuit 41, and the captured image itself may be transmitted from the controller 5 to the game device 3. In this case, the game device 3 may have a circuit or a program, having substantially the same function as the image processing circuit 41, for calculating the marker coordinates.

The acceleration sensor 37 detects accelerations (including a gravitational acceleration) of the controller 5, that is, a force (including gravity) applied to the controller 5. The acceleration sensor 37 detects, among all the accelerations applied to a detection unit of the acceleration sensor 37, a value of an acceleration (linear acceleration) that is applied to the detection unit of the acceleration sensor 37 in a straight line direction along a sensing axis direction. For example, a multi-axis acceleration sensor having two or more axes detects acceleration components along the axes, as the acceleration applied to the detection unit of the acceleration sensor. While the acceleration sensor 37 is assumed to be an electrostatic capacitance type MEMS (Micro Electro Mechanical System)-type acceleration sensor, any other type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects an acceleration in the straight line direction along each axis, and therefore an output from the acceleration sensor 37 represents a value of the linear acceleration along each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication unit 36. The acceleration detected by the acceleration sensor 37 changes depending on the orientation and the movement of the controller 5 itself, and therefore the game device 3 is capable of calculating the orientation (tilt angle) and the movement of the controller 5 using the obtained acceleration data. In the present embodiment, the game device 3 calculates the attitude, the tilt angle, etc., of the controller 5 based on the obtained acceleration data.

One skilled in the art will readily understand from the description herein that additional information relating to the controller 5 can be estimated or calculated (determined) through a process performed by a computer, such as a processor of the game device 3 (for example, the CPU 10) or a processor of the controller 5 (for example, the microcomputer 42), based on an acceleration signal outputted from the acceleration sensor 37 (this applies also to an acceleration sensor 63 to be described later). For example, in the case in which the computer performs a process on the premise that the controller 5 including the acceleration sensor 37 is in a static state (that is, in the case in which the process is performed on the premise that the acceleration to be detected by the acceleration sensor includes only a gravitational acceleration), when the controller 5 is actually in a static state, it is possible to determine whether or not, or how much, the controller 5 is tilting relative to the direction of gravity, based on the detected acceleration. Specifically, when the state in which the detection axis of the acceleration sensor 37 faces vertically downward is used as a reference, whether or not the controller 5 is tilting relative to the reference can be determined based on whether or not 1G (gravitational acceleration) is present, and the degree of tilt of the controller 5 relative to the reference can be determined based on the magnitude thereof. Further, with the multi-axis acceleration sensor 37, it is possible to more specifically determine the degree of tilt of the controller 5 relative to the direction of gravity by performing a process on an acceleration signal of each of the axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is premised that the controller 5 is in a dynamic state (in which the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is premised that the controller 5 is in a dynamic state, it is possible to determined the tilt of the controller 5 relative to the direction of gravity by removing the acceleration component based on the movement of the acceleration sensor from the detected acceleration through a predetermined process. In other embodiments, the acceleration sensor 37 may include an embedded processor or any other type of dedicated processor for performing a predetermined process on an acceleration signal detected by a built-in acceleration detector before the acceleration signal is outputted to the microcomputer 42. For example, when the acceleration sensor 37 is used to detect a static acceleration (for example, a gravitational acceleration), the embedded or dedicated processor may convert the acceleration signal to a tilt angle(s) (or another appropriate parameter).

The gyrosensor 48 detects angular velocities about three axes (the X, Y and Z axes in the present embodiment). In the present specification, with respect to the image-capturing direction (the Z-axis positive direction) of the controller 5, the rotation direction about the X axis is referred to as the pitch direction, the rotation direction about the Y axis as the yaw direction, and the rotation direction about the Z axis as the roll direction. Regarding the gyrosensor 48, the number and combination of gyrosensors to be used are not limited to any particular number and combination as long as the angular velocities about three axes can be found. For example, the gyrosensor 48 may be a 3-axis gyrosensor, or a combination of a 2-axis gyrosensor and a 1-axis gyrosensor for detecting angular velocities about three axes. Data representing the angular velocities detected by the gyrosensor 48 is outputted to the communication unit 36. The gyrosensor 48 may be a gyrosensor that detects an angular velocity or velocities about one axis or two axes.

The communication unit 36 includes the microcomputer 42, a memory 43, the wireless module 44 and the antenna 45. For performing a process, the microcomputer 42 controls the wireless module 44 for wirelessly transmitting, to the game device 3, data acquired by the microcomputer 42 while using the memory 43 as a storage area.

Data outputted from the operation unit 32, the image capturing/processing unit 35, the acceleration sensor 37 and the gyrosensor 48 to the microcomputer 42 are temporarily stored in the memory 43. Such data are transmitted as the operation data (controller operation data) to the game device 3. Namely, at the time of transmission to the controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated into the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. Based on the operation data obtained from the controller 5, the CPU 10 of the game device 3 performs the game process. Note that while the wireless transmission from the communication unit 36 to the controller communication module 19 is sequentially performed with a predetermined cycle, since the game process is generally performed with a cycle of 1/60 sec. (as one frame period), the transmission may be performed with a cycle less than or equal to this period. The communication unit 36 of the controller 5 outputs, to the controller communication module 19 of the game device 3, the operation data at a rate of once per 1/200 sec., for example.

As described above, as operation data representing operations performed on the controller itself, the controller 5 can transmit marker coordinate data, acceleration data, angular velocity data, and operation button data. The game device 3 performs the game processes using the operation data as game inputs. Therefore, by using the controller 5, the user can perform game operations of moving the controller 5 itself, in addition to the conventional typical game operation of pressing the operation buttons. For example, an operation of tilting the controller 5 to any intended attitude, an operation of specifying any intended position on the screen with the controller 5, an operation of moving the controller 5 itself or the like is made possible.

While the controller 5 does not include a display device for displaying a game image in the present embodiment, the controller 5 may include a display device for displaying, for example, an image representing the battery level, etc.

[4. Configuration of Terminal Device 7]

Figure 10:
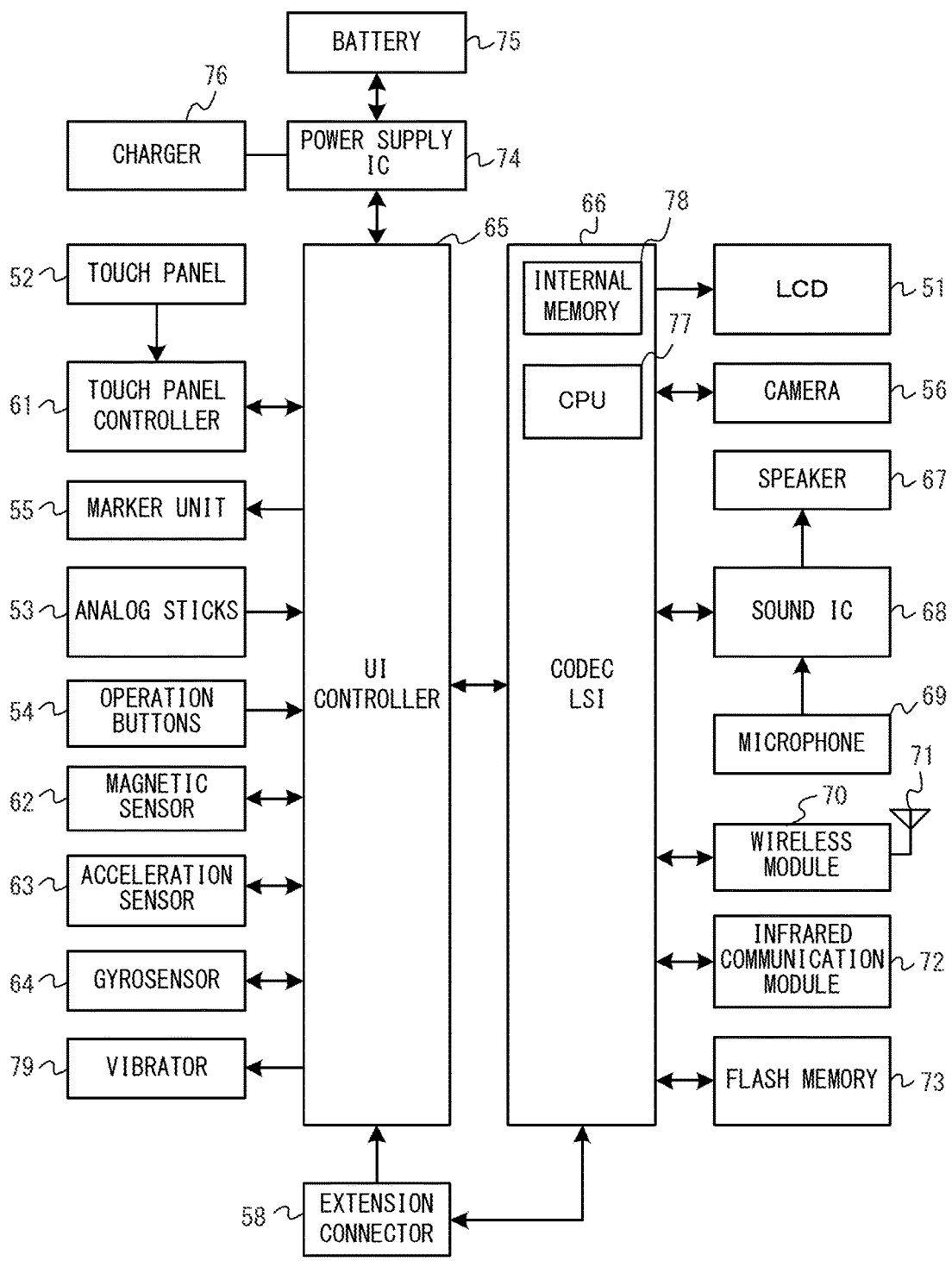
FIG. 10 is a block diagram showing an example non-limiting internal configuration of the terminal device 7.

Next, a configuration of the terminal device 7 will be described with reference to FIGS. 8 to 10. FIG. 8 is a diagram showing an external configuration of the terminal device 7. FIG. 8(*a*) is a front view of the terminal device 7, FIG. 8(b) is a top view thereof, FIG. 8(c) is a right side view thereof, and FIG. 8(d) is a bottom view thereof. FIG. 9 is a diagram showing the terminal device 7 held by the user.

As shown in FIG. 8, the terminal device 7 includes a housing 50 generally in a horizontally-elongated rectangular plate shape. The housing 50 is sized so that it can be held by the user. Thus, the user can hold and move the terminal device 7, and can change the position in which the terminal device 7 is placed.

The terminal device 7 includes the LCD 51 on a front surface of the housing 50. The LCD 51 is provided near the center of the front surface of the housing 50. Therefore, the user can hold and move the terminal device 7 while looking at the screen of the LCD 51 by holding opposing end portions of the housing 50 along the LCD 51, as shown in FIG. 9. While FIG. 9 shows an example in which the user holds the terminal device 7 in a landscape position (in a horizontally-oriented direction) by holding left and right end portions of the housing 50 along the LCD 51, the user can hold the terminal device 7 in a portrait position (in a vertically-oriented direction).

As shown in FIG. 8(a), the terminal device 7 includes the touch panel 52 on the screen of the LCD 51 as an operation unit. In the present embodiment, the touch panel 52 is a resistive-type touch panel. However, the touch panel is not limited to be of a resistive type, and may be a touch panel of any type such as, for example, an electrostatic capacitance type, etc. The touch panel 52 may be of a single-touch type or a multi-touch type. In the present embodiment, a touch panel having the same resolution (detection precision) as the resolution of the LCD 51 is used as the touch panel 52. However, the resolution of the touch panel 52 does not always need to coincide with the resolution of the LCD 51. While a touch pen is usually used for making inputs on the touch panel 52, an input may be made on the touch panel 52 with a finger of the user, instead of using the touch pen. The housing 50 may be provided with a hole for accommodating the touch pen used for performing operations on the touch panel 52. Since the terminal device 7 includes the touch panel 52 in this manner, the user can operate the touch panel 52 while moving the terminal device 7. That is, the user can move the screen of the LCD 51 while directly (by the touch panel 52) making an input on the screen.

As shown in FIG. 8, the terminal device 7 includes two analog sticks 53A and 53B and a plurality of buttons 54A to 54M, as operation units. The analog sticks 53A and 53B are each a direction-specifying device. The analog sticks 53A and 53B are each configured so that a stick portion operable with a finger of the user can be slid (or tilted) in any direction (at any angle in up, down, left, right and diagonal directions) with respect to the front surface of the housing 50. The left analog stick 53A is provided on the left side of the screen of the LCD 51, and the right analog stick 53B is provided on the right side of the screen of the LCD 51. Therefore, the user can make a direction-specifying input by using an analog stick with either the left or the right hand. As shown in FIG. 9, the analog sticks 53A and 53B are provided at such positions that the user can operate them while holding the left and right portions of the terminal device 7, and therefore the user can easily operate the analog sticks 53A and 53B even when holding and moving the terminal device 7.

The buttons 54A to 54L are operation units for making predetermined inputs. As will be discussed below, the buttons 54A to 54L are provided at such positions that the user can operate them while holding the left and right portions of the terminal device 7 (see FIG. 9). Therefore, the user can easily operate these operation units even when holding and moving the terminal device 7.

As shown in FIG. 8(a), among the operation buttons 54A to 54L, a cross button (direction-input button) 54A and buttons 54B to 54H are provided on the front surface of the housing 50. That is, these buttons 54A to 54H are provided at positions at which they can be operated by the thumbs of the user (see FIG. 9).

The cross button 54A is provided on the left side of the LCD 51 and under the left analog stick 53A. That is, the cross button 54A is provided at such a position that it can be operated with the left hand of the user. The cross button 54A has a cross shape, and is usable to specify any of the up, down, left and right directions. The buttons 54B to 54D are provided on the lower side of the LCD 51. These three buttons 54B to 54D are provided at positions at which they can be operated with either the left or the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are respectively provided at the upper, lower, left and right positions (with respect to the center position among the four buttons 54E to 54H). Therefore, with the terminal device 7, the four buttons 54E to 54H can also serve as buttons with which the user specifies the up, down, left and right directions.

As shown in FIGS. 8(a), 8(b) and 8(c), a first L button 54I and a first R button 54J are provided on diagonally upper portions (the left upper portion and the right upper portion) of the housing 50. Specifically, the first L button 54I is provided at the left end of the upper side surface of the plate-like housing 50, and is exposed on the upper side surface and the left side surface. The first R button 54J is provided at the right end of the upper side surface of the housing 50, and is exposed on the upper side surface and the right side surface. Thus, the first L button 54I is provided at such a position that it can be operated with the left index finger of the user, and the first R button 54J is provided at such a position that it can be operated with the right index finger of the user (see FIG. 9).

As shown in FIGS. 8(b) and 8(c), a second L button 54K and a second R button 54L are arranged on leg portions 59A and 59B which are provided so as to project from a back surface of the plate-like housing 50 (i.e., the surface opposite to the front surface on which the LCD 51 is provided). Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided generally on the reverse side to the left analog stick 53A provided on the front surface, and the second R button 54L is provided generally on the reverse side to the right analog stick 53B provided on the front surface. Thus, the second L button 54K is provided at a position at which it can be operated with the left middle finger of the user, and the second R button 54L is provided at a position at which it can be operated with the right middle finger of the user (see FIG. 9). As shown in FIG. 8(c), the second L button 54K and the second R button 54L are respectively provided on diagonally-upward-facing surfaces of the leg portions 59A and 59B and have button surfaces facing diagonally upward. It is believed that when the user holds the terminal device 7, the middle fingers will move in the up/down direction.

Therefore, it will be easier for the user to press the second L button 54K and the second R button 54L in the case where the button surfaces are facing upward. With the provision of leg portions on the back surface of the housing 50, it is made easier for the user to hold the housing 50, and with the provision of buttons on the leg portions, it is made easier to make operations on while holding the housing 50.

With the terminal device 7 shown in FIG. 8, since the second L button 54K and the second R button 54L are provided on the back surface, when the terminal device 7 is put down with the screen of the LCD 51 (the front surface of the housing 50) facing up, the screen may not be completely horizontal. Therefore, in other embodiments, three or more leg portions may be formed on the back surface of the housing 50. In this case, the terminal device 7 can be put down on a floor surface with the leg portions in contact with the floor surface in a state where the screen of the LCD 51 is facing up, and thus can be put down so that the screen is horizontal. A removable leg portion may be added so that the terminal device 7 is put down horizontally.

The buttons 54A to 54L are each optionally assigned a function in accordance with the game program. For example, the cross button 54A and the buttons 54E to 54H may be used for direction-specifying operations, selection operations, etc., whereas the buttons 54B to 54E may be used for determination operations, cancellation operations, etc.

Although not shown, the terminal device 7 includes a power button for turning ON/OFF the power of the terminal device 7. The terminal device 7 may also include a button for turning ON/OFF the screen display of the LCD 51, a button for performing a connection setting with the game device 3 (pairing), and a button for adjusting the sound volume of the speaker (a speaker 67 shown in FIG. 10).

As shown in FIG. 8(*a*), the terminal device 7 includes the marker unit including a marker 55A and a marker 55B (the marker unit 55 shown in FIG. 10) on the front surface of the housing 50. The marker unit 55 is provided on the upper side of the LCD 51. The marker 55A and the marker 55B are each formed by one or more infrared LEDs, as are the markers 6R and 6L of the marker device 6. The marker unit 55 is used for the game device 3 to calculate the movement, etc., of the controller 5, as is the marker device 6 described above. The game device 3 can control the lighting of each of the infrared LEDs of the marker unit 55.

The terminal device 7 includes the camera 56 as an image-capturing unit. The camera 56 includes an image-capturing element (e.g., a CCD image sensor, a CMOS image sensor, or the like) having a predetermined resolution, and a lens. As shown in FIG. 8, the camera 56 is provided on the front surface of the housing 50 in the present embodiment. Therefore, the camera 56 can capture an image of the face of the user holding the terminal device 7, and can capture an image of the user playing a game while looking at the LCD 51, for example.

The terminal device 7 includes a microphone (a microphone 69 shown in FIG. 10) as a sound input unit. A microphone hole 60 is provided on the front surface of the housing 50. The microphone 69 is provided inside the housing 50 behind the microphone hole 60. The microphone detects sounds around the terminal device 7 such as the voice of the user.

The terminal device 7 includes a speaker (the speaker 67 shown in FIG. 10) as a sound output unit. As shown in FIG. 8(*d*), speaker holes 57 are provided on the lower side surface of the housing 50. The output sounds from the speaker 67 are outputted from the speaker holes 57. In the present embodiment, the terminal device 7 includes two speakers, and the speaker holes 57 are provided at the respective position of each of the left speaker and the right speaker.

The terminal device 7 includes an extension connector 58 via which another device can be connected to the terminal device 7. In the present embodiment, the extension connector 58 is provided on the lower side surface of the housing 50 as shown in FIG. 8(*d*). The another device connected to the extension connector 58 may be any device, and may be, for example, a game-specific controller (gun-shaped controller, etc.) or an input device such as a keyboard. The extension connector 58 may be omitted if there is no need to connect another device to the terminal device 7.

With the terminal device 7 shown in FIG. 8, the shape of each operation button, the shape of the housing 50, the number and the positions of the components, etc., are merely illustrative, and these components may be implemented with any other shape, number, and position.

Next, an internal configuration of the terminal device 7 will be described with reference to FIG. 10. FIG. 10 is a block diagram showing an internal configuration of the terminal device 7. As shown in FIG. 10, in addition to the components shown in FIG. 8, the terminal device 7 includes a touch panel controller 61, a magnetic sensor 62, the acceleration sensor 63, the gyrosensor 64, a user interface controller (UI controller) 65, a codec LSI 66, the speaker 67, a sound IC 68, the microphone 69, a wireless module 70, an antenna 71, an infrared communication module 72, a flash memory 73, a power supply IC 74, a battery 75, and a vibrator 79. These electronic components are mounted on an electronic circuit board and accommodated in the housing 50.

The UI controller 65 is a circuit for controlling the input/output of data to/from various types of input/output units. The UI controller 65 is connected to the touch panel controller 61, the analog sticks 53 (the analog sticks 53A and 53B), the operation buttons 54 (the operation buttons 54A to 54L), the marker unit 55, the magnetic sensor 62, the acceleration sensor 63, the gyrosensor 64, and the vibrator 79. The UI controller 65 is also connected to the codec LSI 66 and the extension connector 58. The power supply IC 74 is connected to the UI controller 65, and power is supplied to various units via the UI controller 65. The built-in battery 75 is connected to the power supply IC 74 to supply power. A charger 76 or a cable with which power can be obtained from an external power source via a connector, or the like, can be connected to the power supply IC 74, and the terminal device 7 can receive power supply from, or be charged by, the external power source using the charger 76 or the cable. The terminal device 7 may be attached to a cradle (not shown) having a charging function to be charged.

The touch panel controller 61 is a circuit connected to the touch panel 52 for controlling the touch panel 52. The touch panel controller 61 generates touch position data of a predetermined format based on signals from the touch panel 52, and outputs the data to the UI controller 65. The touch position data represents the coordinates of a position on an input surface of the touch panel 52 at which an input has been made. The touch panel controller 61 reads a signal from the touch panel 52 and generates touch position data at a rate of once per a predetermined amount of time. Various control instructions for the touch panel 52 are outputted from the UI controller 65 to the touch panel controller 61.

The analog sticks 53 each output, to the UI controller 65, stick data representing the direction and the amount of slide (or tilt) of the corresponding stick portion operable with a finger of the user. The operation buttons 54 each output, to the UI controller 65, operation button data representing the input status of the corresponding one of the operation buttons 54A to 54L (e.g., whether the button has been pressed or not).

The magnetic sensor 62 detects the azimuthal direction by sensing the magnitude and the direction of the magnetic field. Azimuthal direction data representing the detected azimuthal direction is outputted to the UI controller 65. Control instructions for a magnetic sensor 62 are outputted from the UI controller 65 to the magnetic sensor 62. While there are sensors using an MI (magnetic impedance) element, a fluxgate sensor, a Hall element, a GMR (giant magneto-resistive) element, a TMR (tunnel magneto-resistive) element, an AMR (anisotropic magneto-resistive) element, etc., the magnetic sensor 62 may be any of these sensors as long as it is possible to detect the azimuthal direction. Strictly speaking, in a place where there is a magnetic field other than the geomagnetic field, the obtained azimuthal direction data does not represent the azimuthal direction. Even in such a case, when the terminal device 7 moves, the azimuthal data changes. Therefore, a change of the attitude of the terminal device 7 can be calculated.

The acceleration sensor 63 is provided inside the housing 50 for detecting the magnitude of the linear acceleration along each of the directions of three axes (x, y and z axes shown in FIG. 8(*a*)). Specifically, the acceleration sensor 63 detects the magnitude of a linear acceleration along each of the axes, where the x axis lies in a direction of a longer side of the housing 50, the y axis lies in a direction of a shorter side of the housing 50, and the z axis lies in a direction perpendicular to the front surface of the housing 50. Acceleration data representing the detected accelerations is outputted to the UI controller 65. Control instructions for the acceleration sensor 63 are outputted from the UI controller 65 to the acceleration sensor 63. While the acceleration sensor 63 is assumed to be, for example, an electrostatic capacitance type MEMS-type acceleration sensor in the present embodiment, any other type of acceleration sensor may be employed in other embodiments. The acceleration sensor 63 may be an acceleration sensor that detects an acceleration along one axis or two axes.

The gyrosensor 64 is provided inside the housing 50 for detecting angular velocities about three axes, i.e., the x-axis, the y-axis and the z-axis. Angular velocity data representing the detected angular velocities is outputted to the UI controller 65. Control instructions for the gyrosensor 64 are outputted from the UI controller 65 to the gyrosensor 64. Regarding the gyrosensor 64, the number and combination of gyrosensors used for detecting the angular velocities about three axes are not limited to any particular number and combination, and the gyrosensor 64 may be formed by a 2-axis gyrosensor and a 1-axis gyrosensor, as is the gyrosensor 48. The gyrosensor 64 may be a gyrosensor that detects an angular velocity or velocities about one axis or two axes.

The vibrator 79 is, for example, a vibration motor or a solenoid, and is connected to the UI controller 65. The terminal device 7 is vibrated by actuation of the vibrator 79 based on an instruction from the UI controller 65. Therefore, the vibration is conveyed to the user's hand holding the terminal device 7, and thus a so-called vibration-feedback game is realized.

The UI controller 65 outputs, to the codec LSI 66, operation data including touch position data, stick data, operation button data, azimuthal direction data, acceleration data, and angular velocity data received from various components described above. In the case where another device is connected to the terminal device 7 via the extension connector 58, data representing an operation performed on the another device may be further included in the operation data.

The codec LSI 66 is a circuit for performing a compression process on data to be transmitted to the game device 3, and an expansion process on data transmitted from the game device 3. The LCD 51, the camera 56, the sound IC 68, the wireless module 70, the flash memory 73, and the infrared communication module 72 are connected to the codec LSI 66. The codec LSI 66 includes a CPU 77 and an internal memory 78. While the terminal device 7 does not itself perform game processes, the terminal device 7 may execute a minimal program for the management thereof and for the communication. When the terminal device 7 is started up by the power being turned ON, a program stored in the flash memory 73 is read out to the internal memory 78 and executed by the CPU 77. A part of the area of the internal memory 78 is used as the VRAM for the LCD 51.

The camera 56 captures an image in response to an instruction from the game device 3, and outputs the captured image data to the codec LSI 76. Control instructions for the camera 56, such as an image-capturing instruction, are outputted from the codec LSI 66 to the camera 56. The camera 56 can also capture moving images. That is, the camera 56 can repeatedly capture images and repeatedly output the image data to the codec LSI 66.

The sound IC 68 is a circuit connected to the speaker 67 and the microphone 69 for controlling input/output of sound data to/from the speaker 67 and the microphone 69. That is, when the sound data is received from the codec LSI 66, the sound IC 68 outputs sound signals, obtained by performing D/A conversion on the sound data, to the speaker 67 so that sound is outputted from the speaker 67. The microphone 69 detects sounds propagated to the terminal device 7 (the voice of the user, etc.), and outputs sound signals representing such sounds to the sound IC 68. The sound IC 68 performs A/D conversion on the sound signals from the microphone 69 to output sound data of a predetermined format to the codec LSI 66.

The infrared communication module 72 emits an infrared signal and establishes infrared communication with another device. Herein, the infrared communication module 72 has, for example, a function of establishing infrared communication in conformity with the IrDA standard and a function of outputting an infrared signal for controlling the monitor 2.

The codec LSI 66 transmits image data from the camera 56, sound data from the microphone 69 and terminal operation data from the UI controller 65 to the game device 3 via the wireless module 70. In the present embodiment, the codec LSI 66 performs a compression process similar to that of the codec LSI 27 on the image data and the sound data. The terminal operation data and the compressed image data and sound data are outputted, as transmission data, to the wireless module 70. The antenna 71 is connected to the wireless module 70, and the wireless module 70 transmits the transmission data to the game device 3 via the antenna 71. The wireless module 70 has a similar function to that of the terminal communication module 28 of the game device 3. That is, the wireless module 70 has a function of connecting to a wireless LAN by a scheme in conformity with the IEEE 802.11n standard, for example. The data to be transmitted may be optionally encrypted or may not be encrypted.

As described above, the transmission data transmitted from the terminal device 7 to the game device 3 includes operation data (the terminal operation data), image data, and sound data. In a case in which another device is connected to the terminal device 7 via the extension connector 58, data received from the another device may be further included in the transmission data. The codec LSI 66 may transmit, to the game device 3, data received via infrared communication by the infrared communication module 72 as being included in the transmission data optionally.

As described above, compressed image data and sound data are transmitted from the game device 3 to the terminal device 7. These data are received by the codec LSI 66 via the antenna 71 and the wireless module 70. The codec LSI 66 expands the received image data and sound data. The expanded image data is outputted to the LCD 51, and images are displayed on the LCD 51. The expanded sound data is outputted to the sound IC 68, and the sound IC 68 outputs sounds from the speaker 67.

In a case in which control data is included in the data received from the game device 3, the codec LSI 66 and the UI controller 65 give control instructions to various units in accordance with the control data. As described above, the control data is data representing control instructions for the components of the terminal device 7 (the camera 56, the touch panel controller 61, the marker unit 55, the sensors 62 to 64, the infrared communication module 72, and the vibrator 79 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmission data to be transmitted from the terminal device 7 to the game device 3. For the marker unit 55, which is an infrared LED, the control can be done simply by turning ON/OFF the power supply thereto.

The game device 3 can control the operation of the monitor 2 by controlling the output of the infrared communication module 72. That is, the game device 3 outputs, to the terminal device 7, an instruction (the control data) for causing the infrared communication module 72 to output an infrared signal corresponding to a control command for controlling the monitor 2. In response to this instruction, the codec LSI 66 causes the infrared communication module 72 to output an infrared signal corresponding to the control command. Herein, the monitor 2 includes an infrared receiving portion capable of receiving infrared signals. As the infrared signal outputted from the infrared communication module 72 is received by the infrared receiving portion, the monitor 2 performs an operation in accordance with the infrared signal. The instruction from the game device 3 may represent a pattern of an infrared signal, or may be an instruction representing such a pattern in a case in which the terminal device 7 stores patterns of infrared signals.

While the terminal device 7 includes operation units such as the touch panel 52, the analog sticks 53 and the operation buttons 54 as described above, any other operation unit may be included instead of, or in addition to, these operation units in other embodiments.

While the terminal device 7 includes the magnetic sensor 62, the acceleration sensor 63 and the gyrosensor 64 as sensors for calculating movement of the terminal device 7 (including the position and the attitude thereof, or changes in the position and the attitude thereof), the terminal device 7 may only include one or two of these sensors in other embodiments. In other embodiments, any other sensor may be included instead of, or in addition to, these sensors.

While the terminal device 7 includes the camera 56 and the microphone 69, the terminal device 7 may include neither the camera 56 nor the microphone 69, or may include only one of them in other embodiments.

While the terminal device 7 includes the marker unit 55 as a component for calculating the positional relationship between the terminal device 7 and the controller 5 (the position and/or attitude, etc., of the terminal device 7 as seen from the controller 5), the terminal device 7 may not include the marker unit 55 in other embodiments. In other embodiments, the terminal device 7 may include another unit as a component for calculating the positional relationship. For example, in other embodiments, the controller 5 may include a marker unit, and the terminal device 7 may include an image-capturing element. In such a case, the marker device 6 may include an image-capturing element, instead of an infrared LED.

[5. Reproduction of Panorama Moving Image]

Now, an operation of reproducing a moving image executed by the game system 1 will be described. The game system 1 reads and reproduces a panorama moving image stored on the internal memory and displays the panorama moving image on the terminal device 7. As the reproduction of the moving image proceeds, frames of the panorama moving image are sequentially displayed on the terminal device 7 at a cycle of predetermined time length. On the terminal device 7, the entirety of a panorama image of each frame is not displayed, but a part thereof is displayed. An area of the panorama image which is displayed (hereinafter, may be referred to simply as a "displayed area") is changed in accordance with the attitude of the terminal device 7. Hereinafter, this will be described specifically.

When start of reproduction of a panorama moving image is instructed, a default area of a panorama image of a leading frame of the panorama moving image is displayed on the terminal device 7. The default area may be an area of the panorama image corresponding to a reference direction of panorama image capturing (usually, a direction in which the image-capturing equipment proceeds), and typically, may be a central area of the panorama image. After this, the reproduction of the panorama moving image continues. As long as the terminal device 7 is kept at the same attitude, the default area of the panorama image of each frame is displayed on the terminal device 7. When the attitude of the terminal device 7 is changed during the reproduction of the panorama moving image, the displayed area is changed.

More specifically, when the user holding the terminal device 7 moves the terminal device 7 upward, downward, leftward or rightward around the user at the center while the screen thereof is kept directed toward the user, the displayed area is changed upward, downward, leftward or rightward. When the user moves the terminal device 7 upward around the user at the center while the screen thereof is kept directed toward the user, the screen of the terminal device 7 is directed downward or diagonally downward, and the user looks at the screen of the terminal device 7 from below in the state where the terminal device 7 is above the user. In this state, the displayed area is an area above the default area or the displayed area before the terminal device 7 is moved. When the user moves the terminal device 7 downward around the user at the center while the screen thereof is kept directed toward the user, the screen of the terminal device 7 is directed upward or diagonally upward, and the user looks at the screen of the terminal device 7 from above in the state where the terminal device 7 is below the user. In this state, the displayed area is an area below the default area or the displayed area before the terminal device 7 is moved. When the user moves the terminal device 7 rightward around the user at the center while the screen thereof is kept directed toward the user, the screen of the terminal device 7 is directed more leftward than before the terminal device 7 is moved. The displayed area is an area right to the default area or the displayed area before the terminal device 7 is moved. When the user moves the terminal device 7 leftward around the user at the center while the screen thereof is kept directed toward the user, the screen of the terminal device 7 is directed more rightward than before the terminal device 7 is moved. The displayed area is an area right to the default area or the displayed area before the terminal device 7 is moved. Such a movement is repeated in each frame, and thus the area displayed on the terminal device 7 is changed appropriately in accordance with the attitude of the terminal device 7.

When the user holding the terminal device 7 rotates the terminal device 7 about an axis perpendicular to the screen of the terminal device 7, the displayed are is rotated.

In the example embodiment, the displayed area is moved upward, downward, leftward and rightward and is rotated in accordance with the attitude of the terminal device 7 about three axes. Alternatively, the displayed area may be moved only leftward and rightward or only upward and downward in accordance with the attitude of the terminal device 7 about one axis. Still alternatively, the displayed area may be moved upward, downward, leftward and rightward, may be moved upward and downward and rotated, or may be moved leftward and rightward downward and rotated, in accordance with the attitude of the terminal device 7 about two axes.

The displayed area may be changed from the default area by a change of the terminal device 7 from the reference attitude. In this case, when the attitude of the terminal device 7 is changed from the reference attitude, the displayed area is changed from the default area; and when the attitude of the terminal device 7 is returned to the reference attitude, the displayed area is returned to the default area.

When the user has the terminal device 7 make a rotation around the user at the center (rotates the terminal device 7 over) 360° leftward or rightward, the displayed area may be returned to the original area.

[6. First Embodiment]

In a first embodiment, the above-described movement is realized, for example, as follows. A panorama image of each frame is pasted as texture on an inner surface of a spherical model (complete spherical model, incomplete spherical model) or of a cylindrical model in the virtual space, and the panorama image is captured by the virtual camera from the inside of the model. An image-capturing direction of the virtual camera is changed in accordance with the attitude of the terminal device 7. Thus, the above-described movement is realized.

FIG. 11 shows an example in which a complete spherical panorama image is used. When a complete spherical panorama image is used, a complete spherical model 100 is located in a virtual space. The complete spherical panorama image is pasted as texture on the entirety of an inner surface of the complete spherical model 100.

In the example embodiment, a panorama image of an equirectangular format is used. A mapping technique for pasting a panorama image of this format on an inner surface of a spherical model is well-known and will not be described herein.

A virtual camera 101 is located at the center of this model, and an image of a part of the inner surface of the spherical model 100 is captured by the virtual camera 101. Thus, a part of the panorama image is rendered. As described later, the image-capturing direction of the virtual camera 101 is changed in accordance with the attitude of the terminal device 7. The position of the virtual camera 101 is fixed.

In the case of a complete spherical panorama image, a leg of the camera, a part of the body of a photographer or the like may be undesirably included in the panorama image. In such a case, any of the following techniques is usable.

Erase the leg of the camera or the like in the panorama image by image processing.

Replace a certain area from the bottom (or top) of the panorama image (typically, a rectangular area) with another image (e.g., a black image).

FIG. 12 through FIG. 15 each show an example in which an incomplete spherical panorama image is used. The incomplete spherical panorama image may be, for example, a panorama image captured such that the leg of the photographer or the like is not included, or obtained by cutting a certain area (typically, a rectangular area) from the bottom (or top) of a panorama image captured as a complete spherical panorama image.

Typically, an incomplete panorama image has a dead angle in a lower area (lacks image-capturing information on a lower area of a certain angle of field) or has a dead angle in an upper area (lacks image-capturing information on an upper area of a certain angle of field).

Figure 12:
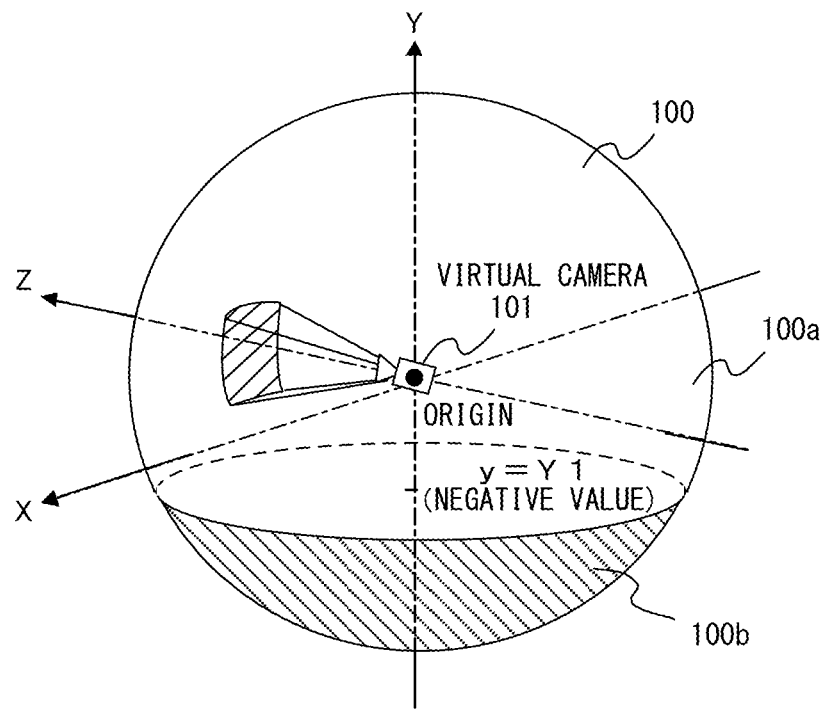
FIG. 12 is an example non-limiting schematic view in the case of an incomplete spherical panorama image (having a dead angle in a lower area)
Figure 13:
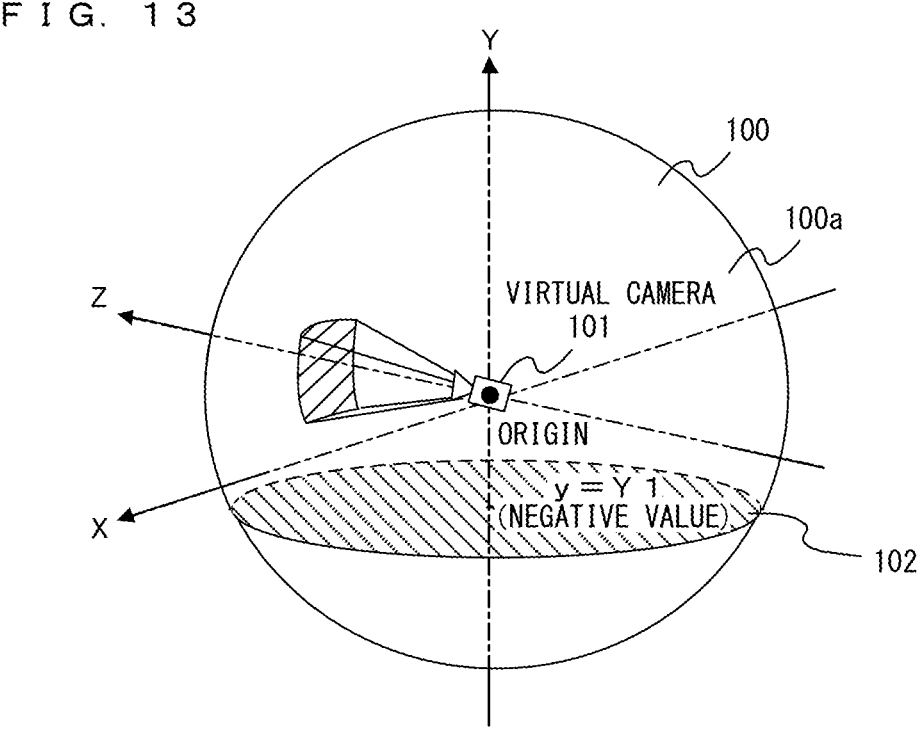
FIG. 13 shows an example non-limiting modification in the case of an incomplete spherical panorama image (having a dead angle in a lower area)

FIG. 12 and FIG. 13 each show an example in which an incomplete spherical panorama image having a dead angle in a lower area is used. A technique shown in FIG. 12 or a technique shown in FIG. 13 is selectively usable.

In both of the example shown in FIG. 12 and the example shown in FIG. 13, the complete spherical model 100 is located in the virtual space. The panorama image is pasted on an inner surface of a part 100a of the complete spherical model 100 exclusive the lower area (inner surface of an upper spherical part). More specifically, the complete spherical model 100 is located at the origin of the virtual space, and where the up/down direction is a positive/negative direction of the Y axis, the panorama image is pasted on a part, of the complete spherical model, in which $Y>Y1$ (negative value). The value of $Y1$ is determined in accordance with the value of the dead angle. More specifically, when the dead angle is large, the value of $Y1$ is large (close to 0); whereas when the dead angle is small, the value of $Y1$ is small (far from 0).

When a part of $Y<Y1$ is included in a visual field of the virtual camera 101, an image of a model with no texture is captured. Hence, in the example of FIG. 12, predetermined texture is pasted on an inner surface of a lower area 100b of the completely spherical model 100 (inner surface of a spherical part hatched with lines extending between upper left and lower right). More specifically, the predetermined texture is pasted on the inner surface of the part of $Y<Y1$ (negative value) of the completely spherical model. The "predetermined texture" may be a single color image (e.g., black image) or a photograph or a CG image representing the land surface, a floor, the earth's surface or the like. The "predetermined texture" may be a moving image or may be switched to another image under a predetermined condition (at a certain time length, when the scene is switched, etc.).

In the example of FIG. 13, a planar model is located in an opening of a part, of the spherical model 100, on which the panorama is to be pasted, such that the planar model blocks the opening. On this planar model, the "predetermined texture" is pasted. More specifically, the "predetermined texture" is pasted on a "surface on the side of the center of the spherical model" of the planar model. In the example of FIG. 13, a disc-shaped model 102 (part hatched with lines extending between upper left and lower right in FIG. 13) is located parallel to a ZX plane at the position of Y=Y1. The disc-shaped model has a radius which is set such that the disc-shaped model contacts the surface of the spherical model.

In this manner, the "predetermined texture" is pasted on the dead angle part, and thus a rendered image can be accurately generated regardless of the direction in which the virtual camera is directed among 360°. In the example of FIG. 13, the "predetermined texture" is pasted on the planar model. Therefore, a usual planar image can be prepared as the "predetermined texture".

In both of the example of FIG. 12 and the example of FIG. 13, like in FIG. 11, the virtual camera 101 is located at the center of the spherical model, and the virtual camera 101 captures an image of a part of the inner surface of the spherical model 100. Thus, a part of the panorama image is rendered. As described later, the image-capturing direction of the virtual camera 101 is changed in accordance with the attitude of the terminal device 7. The position of the virtual camera 101 is fixed.

Figure 14:
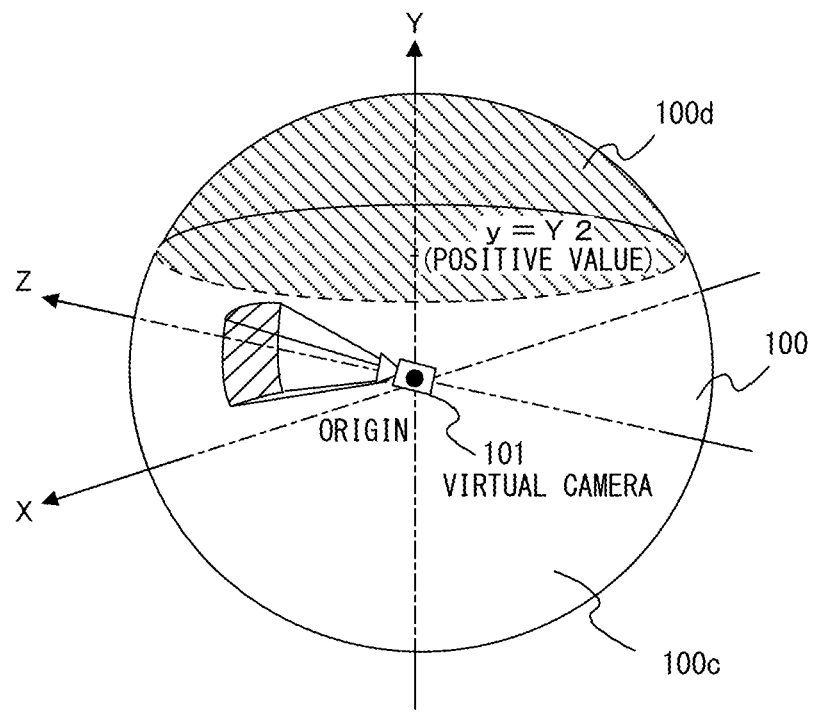
FIG. 14 is an example non-limiting schematic view in the case of an incomplete spherical panorama image (having a dead angle in an upper area)
Figure 15:
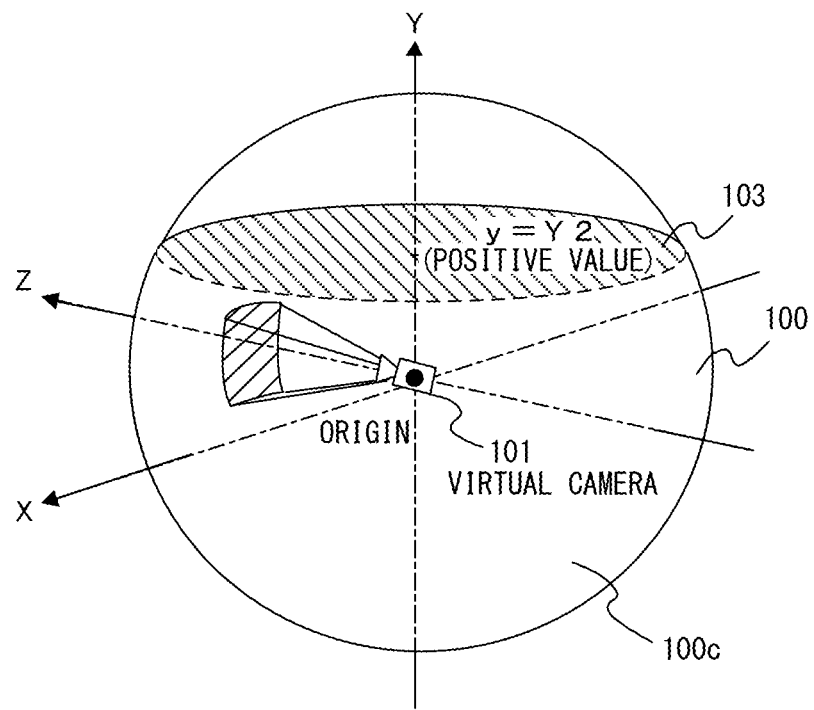
FIG. 15 shows an example non-limiting modification in the case of an incomplete spherical panorama image (having a dead angle in an upper area)

FIG. 14 and FIG. 15 each show an example in which an incomplete spherical panorama image having a dead angle in an upper area is used. A technique shown in FIG. 14 or a technique shown in FIG. 15 is selectively usable.

In both of the example shown in FIG. 14 and the example shown in FIG. 15, the complete spherical model 100 is located in the virtual space. The panorama image is pasted on an inner surface of a part 100c of the complete spherical model 100 exclusive the upper area (inner surface of a lower spherical part). More specifically, the complete spherical model 100 is located at the origin of the virtual space, and where the up/down direction is the positive/negative direction of the Y axis, the panorama image is pasted on a part, of the complete spherical model, in which Y<Y2 (positive value). The value of Y2 is determined in accordance with the value of the dead angle. More specifically, when the dead angle is large, the value of Y2 is small; whereas when the dead angle is small, the value of Y2 is large.

When a part of Y>Y2 is included in the visual field of the virtual camera 101, an image of a model with no texture is captured. Hence, in the example of FIG. 14, predetermined texture is pasted on an inner surface of an upper area 100d of the completely spherical model 100 (inner surface of a spherical part hatched with lines extending between upper left and lower right). More specifically, the predetermined texture is pasted on the inner surface of the part of Y<Y2 (positive value) of the completely spherical model. The "predetermined texture" may be a single color image (e.g., black image) or a photograph or a CG image representing the sky, the universe, a ceiling or the like. The "predetermined texture" may be a moving image or may be switched to another image under a predetermined condition (at a certain time length, when the scene is switched, etc.).

In the example of FIG. 15, a planar model is located in an opening of a part, of the spherical model 100, on which the panorama is to be pasted, such that the planar model blocks the opening. On this planar model, the "predetermined texture" is pasted. More specifically, the "predetermined texture" is pasted on a "surface on the side of the center of the spherical model" of the planar model. In the example of FIG. 15, a disc-shaped model 103 (part hatched with lines extending between upper left and lower right in FIG. 15) is located parallel to the ZX plane at the position of Y=Y2. The disc-shaped model has a radius which is set such that the disc-shaped model contacts the surface of the spherical model.

In both of the example of FIG. 14 and the example of FIG. 15, the virtual camera 101 is located at the center of the spherical model, and the virtual camera 101 captures an image of a part of the inner surface of the spherical model 100. Thus, a part of the panorama image is rendered. As described later, the image-capturing direction of the virtual camera 101 is changed in accordance with the attitude of the terminal device 7. The position of the virtual camera 101 is fixed.

Figure 16:
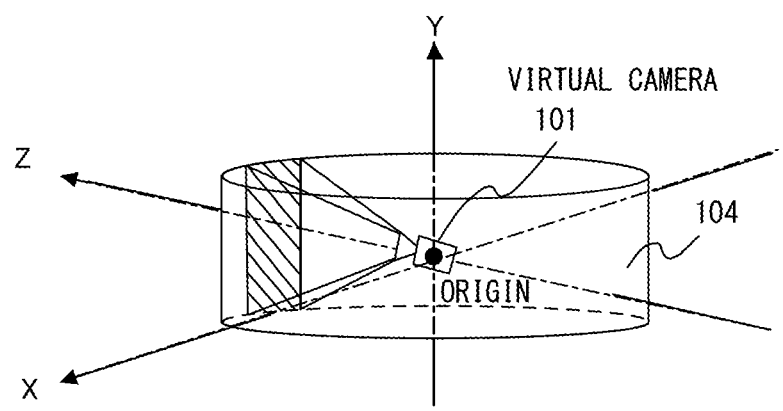
FIG. 16 is an example non-limiting schematic view in the case of a left/right-only all-around panorama image.

FIG. 16 is an example in which a panorama image which is an "all-around panorama image having an angle of field of 360° in the left/right direction and a predetermined angle of field (smaller than 180°) in the up/down direction" (hereinafter, referred to as a "left/right-only all-around panorama image") is used.

When a left/right-only all-around panorama image is used, a cylindrical model 104 is located in the virtual space. The panorama image is pasted on the entirety of an inner side surface of the cylindrical model 104.

As shown in FIG. 16, the viewing angle of the virtual camera 101 in the up/down direction is set to the same angle as the angle of field of the panorama image. Therefore, the entirety of the panorama image from top to bottom is displayed on the terminal device 7 (needless to say, in the left/right direction, a part of the panorama image is displayed).

The virtual camera 101 is located at the center of the cylindrical model 104, and the virtual camera 101 captures an image of a part of the inner surface of the cylindrical model 104. Thus, a part of the panorama image is rendered. As described later, the image-capturing direction of the virtual camera 101 is changed in accordance with the attitude of the terminal device 7 in the left/right direction. However, the image-capturing direction of the virtual camera 101 is not changed in accordance with the attitude of the terminal device 7 in the up/down direction. The position of the virtual camera 101 is fixed.

Even when the cylindrical model is used, the viewing angle of the virtual camera 101 in the up/down direction may be set to be smaller than the angle of field of the panorama image, so that a part of the panorama image is displayed. In this case, the image-capturing direction of the virtual camera 101 may be changed in accordance with the attitude of the terminal device 7 in the up/down direction. Also in this case, the "predetermined texture" may be pasted on a top surface and/or a bottom surface of the cylindrical model.

Figure 17:
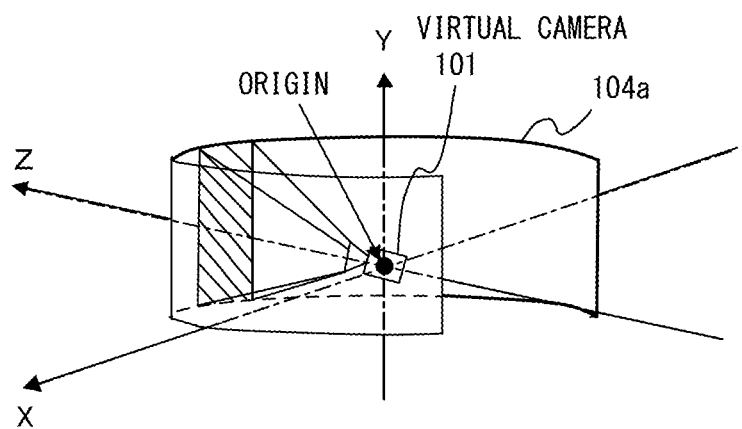
FIG. 17 is an example non-limiting schematic view in the case of a panorama image having an angle of field smaller than 360°.

FIG. 17 is an example in which a panorama image which "has an angle of field smaller than 360° (may be 180° or larger) in the left/right direction and a predetermined angle of field (smaller than 180°) in the up/down direction in contrast to an all-around panorama image" (hereinafter, referred to as a "left/right-only panorama image") is used.

When a left/right-only panorama image is used, the cylindrical model 104 shown in FIG. 16 is located in the virtual space. The panorama image is pasted on a range 104a shown in FIG. 17 of an inner side surface of the cylindrical model 104. The range 104a is determined in accordance with the angle of field of the panorama image in the left/right direction. More specifically, as the angle of field is larger, the range 104a is larger. Typically, the angle of field matches the angle of the range 104a as seen from the Y axis.

On a part of the inner side surface of the cylindrical model 104 other than the range 104a, the "predetermined texture" is pasted.

The viewing angle in the up/down direction, the position and the image-capturing direction of the virtual camera are controlled in substantially the same manner as those in the example of FIG. 16.

In any of the examples of FIG. 11 through FIG. 17, the viewing angle of the virtual camera in the left/right direction is set to smaller than the angle of field of the panorama image in the left/right direction, and typically, is set to 25 to 90° (or may be set to 30 to 60°). In the examples of FIG. 11 through FIG. 15, the viewing angle of the virtual camera in the up/down direction is set to be smaller than the angle of field of the panorama image in the up/down direction, and typically, is set to 20 to 60° (or may be set to 20 to 40°).

In any of examples of FIG. 11 through FIG. 17, the virtual camera 101 is located such that an initial attitude thereof matches an X axis, a Y axis and a Z axis of the virtual space. More specifically, the virtual camera 101 is located such that the image-capturing direction thereof (z axis) matches the Z axis, the left/right direction thereof (x axis) matches the X axis, and the up/down direction thereof (y axis) matches the Y axis (the x, y axis and z axis of the virtual camera 101 at such an initial attitude will be referred to as "x0 axis", "y0 axis" and "z0 axis").

Figure 18A:
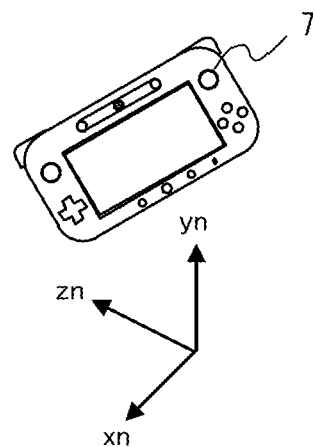
FIG. 18A shows an example non-limiting control on a virtual camera 101 in accordance with an attitude of the terminal device 7.
Figure 18B:
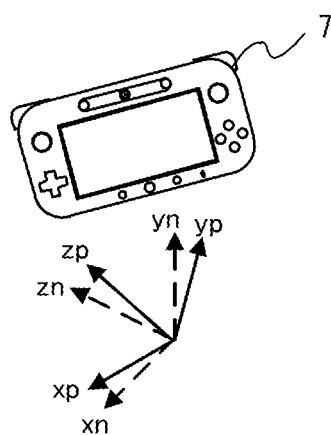
FIG. 18B shows an example non-limiting control on the virtual camera 101 in accordance with the attitude of the terminal device 7.
Figure 18C:
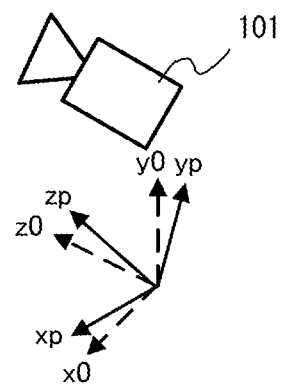
FIG. 18C shows an example non-limiting control on the virtual camera 101 in accordance with the attitude of the terminal device 7.

FIG. 18A through FIG. 18C each show control on the image-capturing direction of the virtual camera 101 in accordance with the attitude of the terminal device 7. First, referring to FIG. 18A, the reference attitude of the terminal device 7 (xn, yn, zn) is set. More specifically, the attitude of the terminal device 7 at the start of, or at a predetermined timing before the start of, reproduction of the moving image is set as the reference attitude. Still more specifically, the attitude of the terminal device 7 at the start of the reproduction of the moving image may be set as the reference attitude, the attitude of the terminal device 7 when the user makes a predetermined operation before the start of the reproduction of the moving image may be set as the reference attitude, a predetermined fixed attitude may be may be set as the reference attitude, or one of a plurality of predetermined fixed attitudes may be selected by the user as the reference attitude.

In the example embodiment, the attitude of the terminal device 7 is calculated based on an output value from the gyrosensor 64, and therefore, setting of the reference attitude means resetting of the attitude value calculated by the gyrosensor. Alternatively, for setting the reference attitude, an appropriate process may be executed depending on the type of the sensor.

After the reference attitude is set, as shown in FIG. 18B, the attitude of the terminal device (xp, yp, zp) is sequentially calculated based on the output value from the gyrosensor 64. The attitude may be calculated by use of a value from the acceleration sensor 63 instead of the gyrosensor 64, or by use of both of the value from the gyrosensor 64 and the value from the acceleration sensor 63.

Then, as shown in FIG. 18C, in accordance with the direction of change of the attitude (rotation about the xn axis, rotation about the yn axis, the rotation about the zn axis) of the terminal device 7 (xp, yp, zp) from the reference attitude thereof (xn, yn, zn), the attitude of the virtual camera 101 is changed from the initial attitude (reference attitude: x0 axis, y0 axis and z0 axis of the virtual camera 101 matching the X axis, the Y axis and the Z axis of the virtual space as described above) in the same direction of the change of the attitude of the terminal device 7 (rotation about the X axis, rotation about the Y axis, rotation about the Z axis). In accordance with the amount of the attitude change (rotation amount about the xn axis, rotation amount about the yn axis, and rotation amount about the zn axis) of the attitude of the terminal device 7 (xp, yp, zp) from the reference attitude (xn, yn, zn), the attitude of the virtual camera 101 may be changed by the same amount as the amount of the attitude change of the terminal device 7 from the initial attitude (reference attitude: x0 axis, y0 axis and z0 axis of the virtual camera 101 matching the X axis, the Y axis and the Z axis of the virtual space as described above).

FIG. 19 shows a file format of a panorama image data file in the example embodiment. In this example embodiment, one file includes the following.

(1) Panorama type information T (2) As information for each frame, frame number N, panorama image data Ip, complementary image data Ic, position information P, orientation information Di, and map image data M The panorama type information T represents the type of the panorama image, and specifically identifies the panorama image as a complete spherical image, an incomplete spherical image (having a dead angle in a lower area), an incomplete spherical image (having a dead angle in an upper area), a left/right-only all-around panorama image, a left/right-only panorama image or the like. For example, the panorama type information T may be an identification number assigned to each type of panorama image.

Regarding information on each frame, various types of data are recorded for each frame number (1, 2, 3, . . . ). The panorama image data Ip will not be described because such a description is not necessary. The complementary image data Ic is used as the "predetermined texture" described above, and is for complementing the dead angle part of the panorama image. The position information P represents the position at which the panorama image of the corresponding frame has been captured, and may be data representing coordinates on the map image M or information representing an absolute spot as provided by the GPS or the like. The orientation information Di represents the panorama image-capturing direction at which the panorama image of the corresponding frame has been captured, and may be data representing the orientation on the map image M or information representing an absolute azimuth as provided by the GPS or the like. The map image M is image data representing a region in which the panorama image has been captured, and may be a photograph or a CG image. Typically, an image representing an aerial view of the region is used as the map image M. As described later, the map image M is displayed on the monitor 2. The map image M may be an image in which the reference direction of panorama image capturing of the corresponding frame is the upward direction.

The complementary image may not have data for each frame. For example, one complementary image may be recorded for one moving image file, or one complementary image may be recorded for a plurality of frames. The same is applicable to the map image M. Regarding the position information and the orientation information, one piece of information may be recorded for a plurality of frames.

Figure 21:
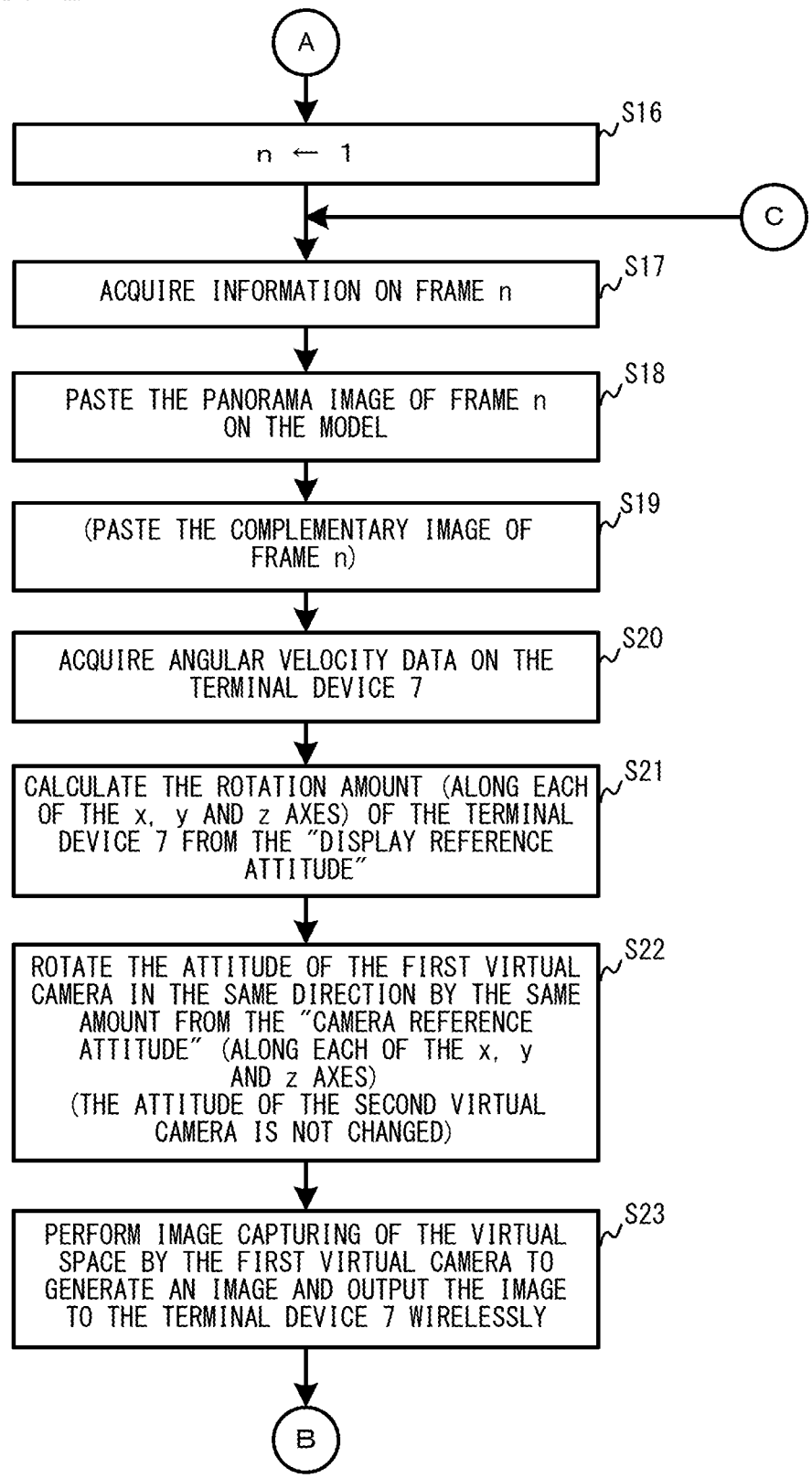
FIG. 21 is a flowchart showing an example non-limiting process in the first embodiment executed by the game device 3.
Figure 22:
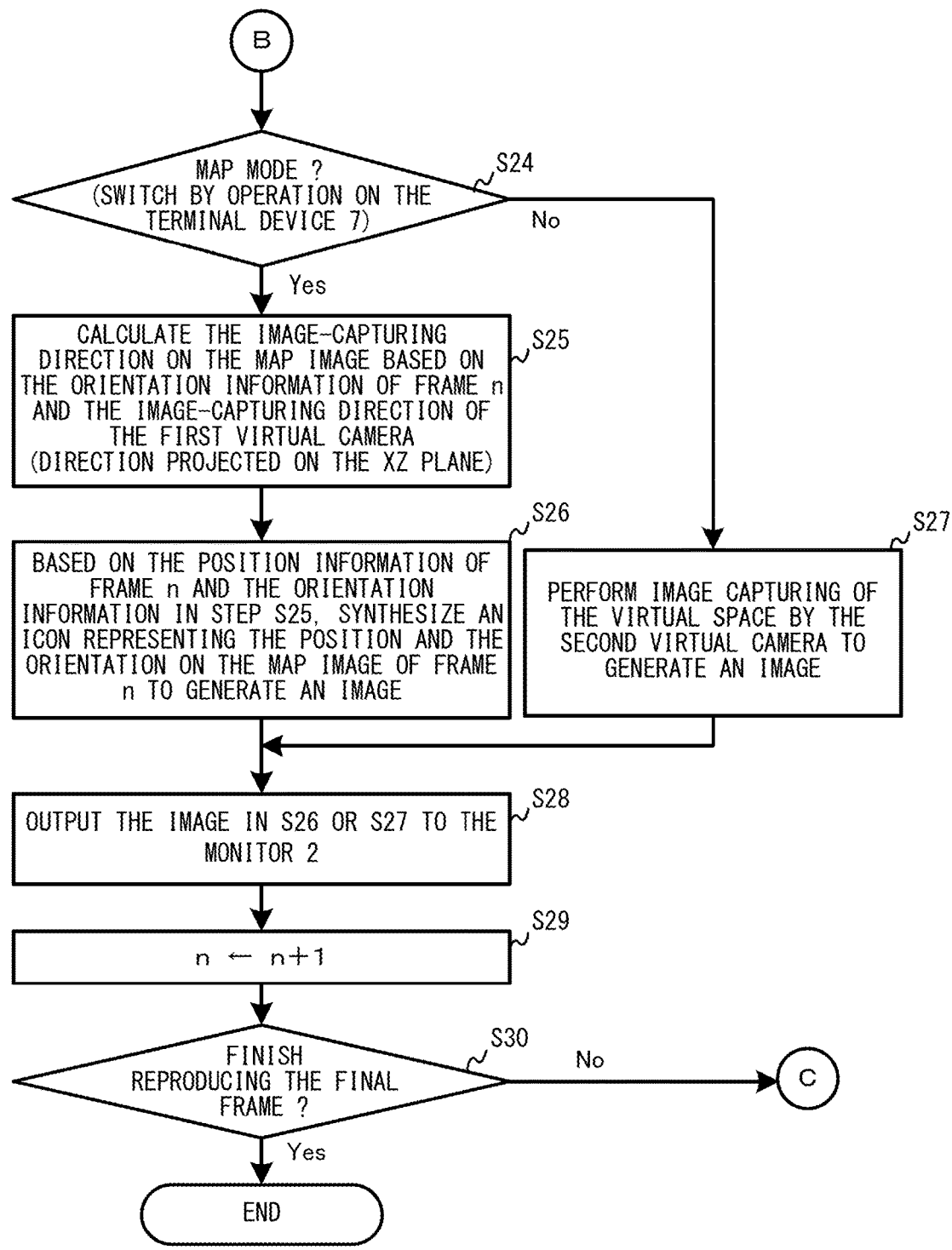
FIG. 22 is a flowchart showing an example non-limiting process in the first embodiment executed by the game device 3.

FIG. 20 through FIG. 22 are each a flowchart illustrating a processing operation of the game device 3. The process in each step shown in the flowcharts is realized by execution by the CPU 10 of a program (browser program) stored on a nonvolatile memory in the game device 3 or the optical disc 4.

First, referring to FIG. 20, in step S11, the game device 3 acquires a panorama image file. Specifically, the panorama image file is acquired from the nonvolatile memory in the game device 3, a storage medium attached to the game device 3, or a predetermined server via a network.

After step S11, in step S12, a model corresponding to the panorama type is located in the virtual space such that the center of the model is positioned at the origin of the virtual space, based on the panorama type information in the file acquired in step S11. Specifically, in the case where the panorama type is spherical panorama (complete spherical, incomplete spherical), a spherical model is located. In the case where the panorama type is left/right-only all-around panorama, left/right-only panorama or the like, a cylindrical model is located. In the case of the example of FIG. 13 and the example of FIG. 15, a disc-shaped model is also located.

After step S12, in step S13, a first virtual camera is located in the same virtual space as the model. In the example embodiment, the first virtual camera is located at the origin of the virtual space, and the attitude of the first virtual camera is such that the xyz axes of the camera match the XYZ axes of the virtual space. In the example embodiment, the first virtual camera is located parallel to the XZ plane. Alternatively, the first virtual camera may have a predetermined angle with the XZ plane. The attitude of the virtual camera in the virtual space at this point will be referred to as a "camera reference attitude". The first virtual camera is for generating an image to be outputted to the terminal device 7, and the virtual camera 101 shown in FIG. 11 through FIG. 17 is the first virtual camera.

After step S13, in step S14, a second virtual camera is located in the same virtual space. More specifically, the position and the attitude of the second virtual camera are set to be the same as those of the first virtual camera.

After step S14, in step S15, the reference attitude of the terminal device 7 is set. More specifically, it is displayed on the terminal device 7 or the monitor 2 that the reference attitude is to be set, so as to urge the user to press a predetermined button. Then, the terminal device 7 or the monitor 2 waits for an input by the predetermined button. The attitude of the terminal device 7 when an operation is made on the predetermined button is set as the reference attitude. The attitude of the terminal device 7 at this point will be referred to as a "display reference attitude".

After step S15, in step S16 shown in FIG. 21, n is set to 1. n is a frame number. After step S16, until the reproduction of the panorama moving image is finished, processes in steps S17 through S30 are repeated at a cycle of the predetermined time length.

In step S17, among information included in the panorama image file, information on frame m (panorama image Ip, complementary image Ic, position information P, orientation information Di, and map image M) is acquired.

After step S17, in step S18, the panorama image Ip acquired in step S17 is pasted as texture on the model located in step S12. As described above with reference to FIG. 11 through FIG. 17, the location at which the panorama image Ip is to be pasted is determined based on the panorama type information acquired in step S11.

More specifically, in step S18, the panorama image is pasted such that the up/down direction of the panorama image matches the up/down direction of the first virtual camera at the reference attitude (in the example embodiment, a positive/negative direction of the y0 axis, and also a positive/negative direction of the Y axis of the virtual space), such that the left/right direction of the panorama image matches the left/right direction of the first virtual camera at the reference attitude (in the example embodiment, a positive/negative direction of the x0 axis, and also a positive/negative direction of the X axis of the virtual space), and such that the center of the panorama image matches the image-capturing direction of the first virtual camera at the reference attitude. In the example embodiment, the x0 axis, the y0 axis and the z0 axis of the first virtual camera at the reference attitude are parallel to the X axis, the Y axis and the Z axis of the virtual space. Therefore, the panorama image is pasted such that the center thereof matches a point at which Z>0 among intersections of the panorama image and the Z axis of the model located step S12. The panorama image may be pasted such that the center thereof matches an intersection of the image-capturing direction of the first virtual camera at the reference attitude (Z-axis direction of the virtual camera (depth direction)) and the model located in step S12.

In the examples of FIG. 12 through FIG. 15 and FIG. 17 described above, after step S18, in step S19, the complementary image Ic acquired in step S17 is pasted on the model described above with reference to FIG. 12 through FIG. 15 and FIG. 17. In the examples of FIG. 11 and FIG. 16, the process of step S19 is not executed. The manner of pasting the complementary image (regarding the direction and the center position) is the same as the manner of pasting the panorama image in step S18.

After step S19 (in the examples of FIG. 11 and FIG. 16, after step S18), in step S20, the output value from the gyrosensor 64 of the terminal device 7 is acquired. The output value from the gyrosensor 64 is transmitted from the terminal device 7 to the game device 3 at a cycle of certain time length and stored in the game device 3.

After step S20, in step S21, a direction and an amount of rotation of the terminal device 7 from the "display reference attitude" (rotation direction and rotation amount after the initialization in step S15) are calculated by use of the data acquired in step S20. For example, in step S21, the rotation direction and the rotation amount about the x axis of the terminal device 7 at the display reference attitude (xn in FIG. 18A), such a rotation direction and such a rotation amount about the y axis (yn in FIG. 18A), and such a rotation direction and such a rotation amount about the z axis (yz in FIG. 18A) are each calculated. The rotation direction can be represented by whether the rotation amount has a positive value or a negative value. Therefore, only the rotation amount may be calculated as data.

More specifically, in step S21, the rotation amount calculated in step S21 in the immediately previous process and the rotation amount calculated in step S21 in the current process based on the angular velocity are added together, and the resultant sum is calculated as a new rotation amount.

After step S21, in step S22, the first virtual camera in the virtual space is rotated from the "camera reference attitude" by the rotation amount calculated in step S21. More specifically, from the "camera reference attitude", the first virtual camera is rotated about the X axis of the virtual space (x0 in FIG. 18C) by the same amount as the rotation amount of the terminal device 7 about the xn axis calculated in step S21, about the Y axis of the virtual space (y0 in FIG. 18C) by the same amount as the rotation amount of the terminal device 7 about the yn axis calculated in step S21, and about the Z axis of the virtual space (z0 in FIG. 18C) by the same amount as the rotation amount of the terminal device 7 about the zn axis calculated in step S21. The attitude of the second virtual camera is not changed.

After step S22, in step S23, image capturing of the virtual space is performed by the first virtual camera to generate an image, and the image is outputted to the terminal device 7 wirelessly.

After step S23, in step S24 shown in FIG. 22, it is determined whether the game device 3 is in a map mode or not. The map mode is a mode in which a map image M is displayed on the monitor 2. When the game device 3 is not in the map mode, the panorama image is displayed on the monitor 2. The panorama image displayed on the monitor 2 is an image captured by the second virtual camera. The map mode and the non-map mode may be made switchable to each other by an operation made by the user on a predetermined operation unit of the terminal device 7.

When it is determined that the game device 3 is in the map mode in step S24, in step S25, the direction of a part of the panorama image which is currently displayed on the terminal device 7 is calculated, based on the orientation information acquired in step S17 and the image-capturing direction of the first virtual camera (direction of the z-axis direction (depth direction) of the first virtual camera projected on the XZ plane of the virtual space). Specifically, where the orientation information is set as information on the orientation on the map image, a direction obtained by changing the orientation direction by the amount of change of the current image-capturing direction of the first virtual camera from the image-capturing direction thereof at the reference attitude is the direction displayed on the terminal device 7, which is shown on the map image.

After step S25, in step S26, based on the position information acquired in step S17 and the orientation information acquired in step S25, an icon representing the position and the orientation is synthesized on the map image acquired in step S17.

When it is determined that the game device 3 is not in the map mode in step S24, in step S27, image capturing of the virtual space is performed by the second virtual camera to generate an image.

After step S26 or step S27, the image in step S26 or step S27 is outputted to the monitor 2.

After step S28, in step S29, n is incremented. In step S30, it is determined whether the reproduction of the final frame has been finished or not. When the reproduction of the final frame has been finished, the process is terminated. Otherwise, the process is returned to step S17, and the reproduction of the moving image is repeated.

[7. Second Embodiment]

In a second embodiment, like in the first embodiment, as the reproduction of a panorama moving image proceeds, panorama images, each of which is a frame of the stored panorama moving image, are read at a cycle of a predetermined time length and sequentially displayed on a display device (e.g., the monitor 2 and the terminal device 7). In this embodiment, the panorama image of each frame is pasted as texture on an inner surface of a hexahedron model in a virtual space, and the inner surface is viewed from at least one virtual camera located inside the model. Thus, a panorama image to be displayed on the terminal device 7 is generated, and the direction of the virtual camera is changed in accordance with the attitude of the terminal device 7. In this embodiment, a panorama image to be displayed on the monitor 2 and a panorama image to be displayed on the terminal device 7 are generated by use of the same panorama image which is read from the panorama moving image at the timing at which the respective panorama images are controlled to be displayed on the monitor 2 and the terminal device 7. As a result, images having substantially the same time axis in the panorama moving image are respectively displayed on the monitor 2 and the terminal device 7. In an example, the panorama image to be displayed on the monitor 2 has a larger display range than that of the panorama image to be displayed on the terminal device 7. For example, an omnidirectional image, described later, of the panorama moving image is displayed on the monitor 2. In another example, the panorama image to be displayed on the monitor 2 is an image showing the inner surface of the model as viewed from another virtual camera fixed inside the model. For example, an image in a predetermined direction of the panorama image is displayed on the monitor 2.

Figure 23:
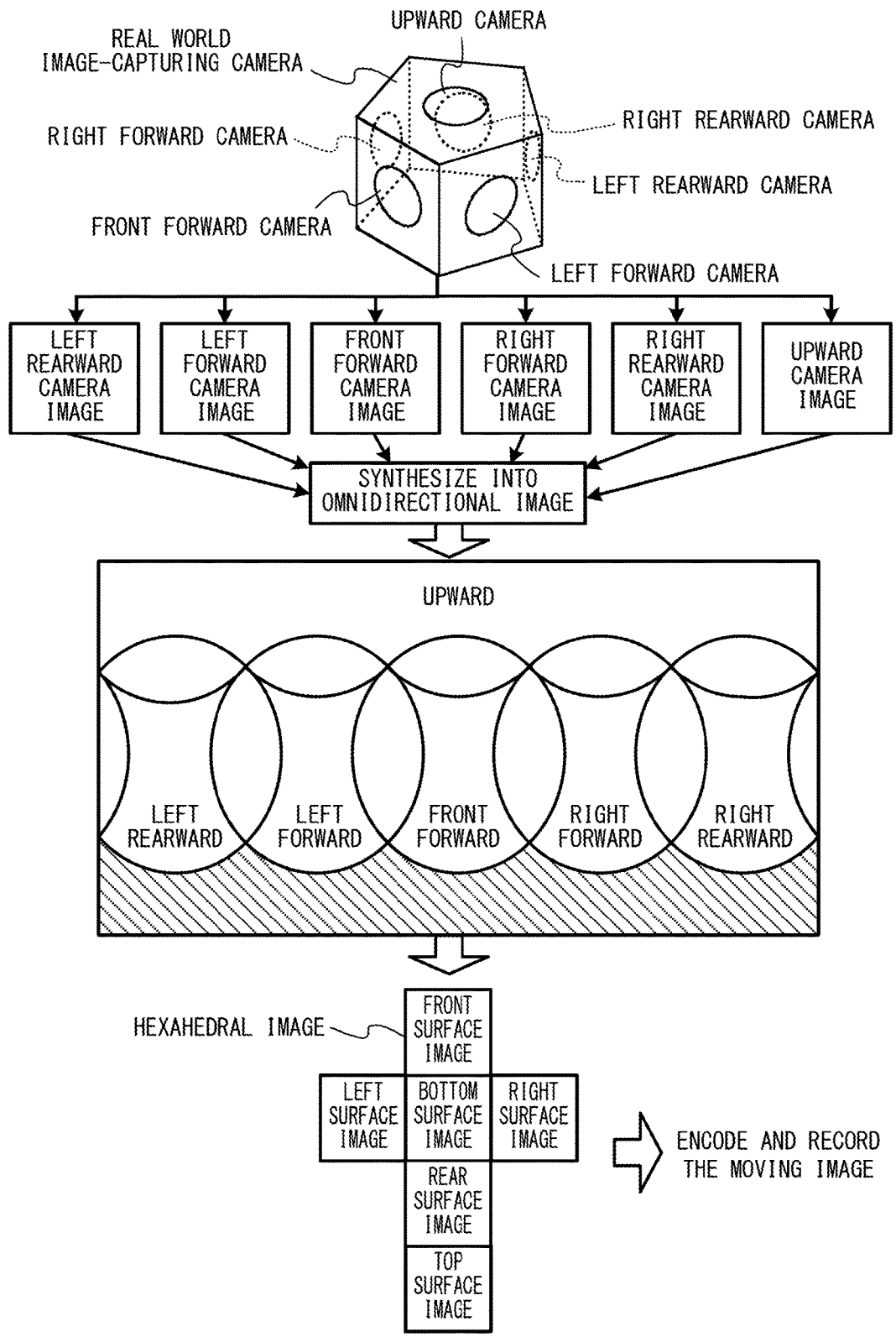
FIG. 23 shows a flow of an example non-limiting process of capturing an example non-limiting panorama moving image including panorama images each of which is a frame, and encoding and recording the panorama moving image.

FIG. 23 shows an example of flow of a process of capturing a panorama moving image including panorama images, each of each is a frame, and encoding and recording the panorama moving image.

In an example, for capturing a panorama moving image of a real world, a plurality of real world image-capturing cameras, the image-capturing direction of which are fixed to each other, are used. For example, six real world image-capturing cameras are provided at fixed positions. The image-capturing directions of these cameras are, respectively, directions radiating from side surfaces and a top surface of a support member having a pentagonal prism shape. The six real world image-capturing cameras capture an image of the real world while moving in a forward direction, which is the direction in which one of the side surfaces is directed. The image-capturing camera provided on the side surface set as the forward direction (i.e., the side surface directed in the forward direction while the cameras capture the image while moving) is labeled as a "front forward camera". The image-capturing camera having the left forward direction as the image-capturing direction while moving is labeled as a "left forward camera". The image-capturing camera having the right forward direction as the image-capturing direction while moving is labeled as a "right forward camera". The image-capturing camera having the left rearward direction as the image-capturing direction while moving is labeled as a "left rearward camera". The image-capturing camera having the right rearward direction as the image-capturing direction while moving is labeled as a "right rearward camera". The image-capturing camera having the upward direction as the image-capturing direction while moving is labeled as an "upward camera". As the cameras move, images having the same time axis are obtained by the image-capturing cameras. The image obtained by the front forward camera is labeled as a "front forward camera image". The image obtained by the left forward camera is labeled as a "left forward camera image". The image obtained by the right forward camera is labeled as a "right forward camera image". The image obtained by the left rearward camera is labeled as a "left rearward camera image". The image obtained by the right rearward camera is labeled as a "right rearward camera image". The image obtained by the upward camera is labeled as an "upward camera image".

The above-described structure of the real world image-capturing cameras is one example, and another structure may be used, needless to say. A panorama image of the real world may be captured by the real world image-capturing cameras without moving the cameras (i.e., by fixed-point image capturing).

The images obtained at each time axis by the image-capturing cameras are synthesized into one omnidirectional image (panorama image) by panorama extension. The omnidirectional image used in the example shown in FIG. 23 is generated as follows. The front forward camera image is placed at the center of the panorama image. The left forward camera image and the left rearward camera image are placed leftward in this order from the center, and the right forward camera image and the right rearward camera image are placed rightward in this order from the center. The upward camera image is placed in an area upper to the five camera images thus synthesized. As an image at an azimuth which is at a deal angle for the camera images (typically, a lower area of the panorama image, which is hatched in FIG. 23), a predetermined image (e.g., a black image) is provided. An omnidirectional image (panorama image) generated by synthesizing images obtained by a plurality of image-capturing cameras may not necessarily have the structure shown in FIG. 23, and may have another structure. A technique for generating a panorama image from images obtained by a plurality of image-capturing cameras is well known and will not be described herein in detail.

Next, the omnidirectional image generated at a cycle of a predetermined time length is converted into a hexahedral image. All the hexahedral images converted at a cycle of a predetermined time length by a predetermined method (e.g., the compression-encoding method of moving image data standardized as H.264) are encoded and stored on a storage medium such as an optical disc or the like. A "hexahedral image" means an image generated on the six surfaces of an inner surface of a regular hexahedron model when an omnidirectional image (panorama image) is pasted on the inner surface of the regular hexahedron model and mapped. For example, when the omnidirectional image is converted into a hexahedral image, six surface images (front surface image, left surface image, right surface image, rear surface image, top surface image, bottom surface image) are obtained. The omnidirectional image is converted such that an area of the omnidirectional image corresponding to the front forward camera image is at least partially included in the front surface image among the six surface images (e.g., such that the center of the area is at the center or the vicinity thereof of the front surface image). A mapping technique for generating the hexahedral image is also well known and will not be described herein in detail.

In the process of encoding a panorama moving image and storing the encoded image on a storage medium, a plurality of panorama images included in the panorama moving image are encoded. For this process, a compression-encoding method other than H.264 may be used. Any method is usable for encoding each of the panorama images. For example, a method of compressing a panorama image of each frame in the state where there is no inter-frame dependence (e.g., motion JPEG), or a method of compressing a difference between one panorama image and an immediately previous panorama image (e.g., MPEG) is usable. For encoding a panorama moving image by use of a frame prediction encoding method, an encoding method using intra-frame prediction may be used as well as a method using inter-frame prediction.

In the process of encoding a panorama moving image and storing the encoded image on a storage medium, audio data representing an audio signal which is output when the panorama moving image is reproduced may be added. For example, in synchronization with the reproduction of a panorama moving image, sound which was recorded at the position where the panorama moving image was captured, or a pre-recorded background music or sound effects, are output. In such a case, sound data representing the sound, background music, sound effects or the like may be stored on a storage medium together with the panorama moving image. In this case, when the encoded panorama moving image data is decoded and reproduced, the sound can be output in synchronization with the reproduction of the panorama moving image.

Figure 24:
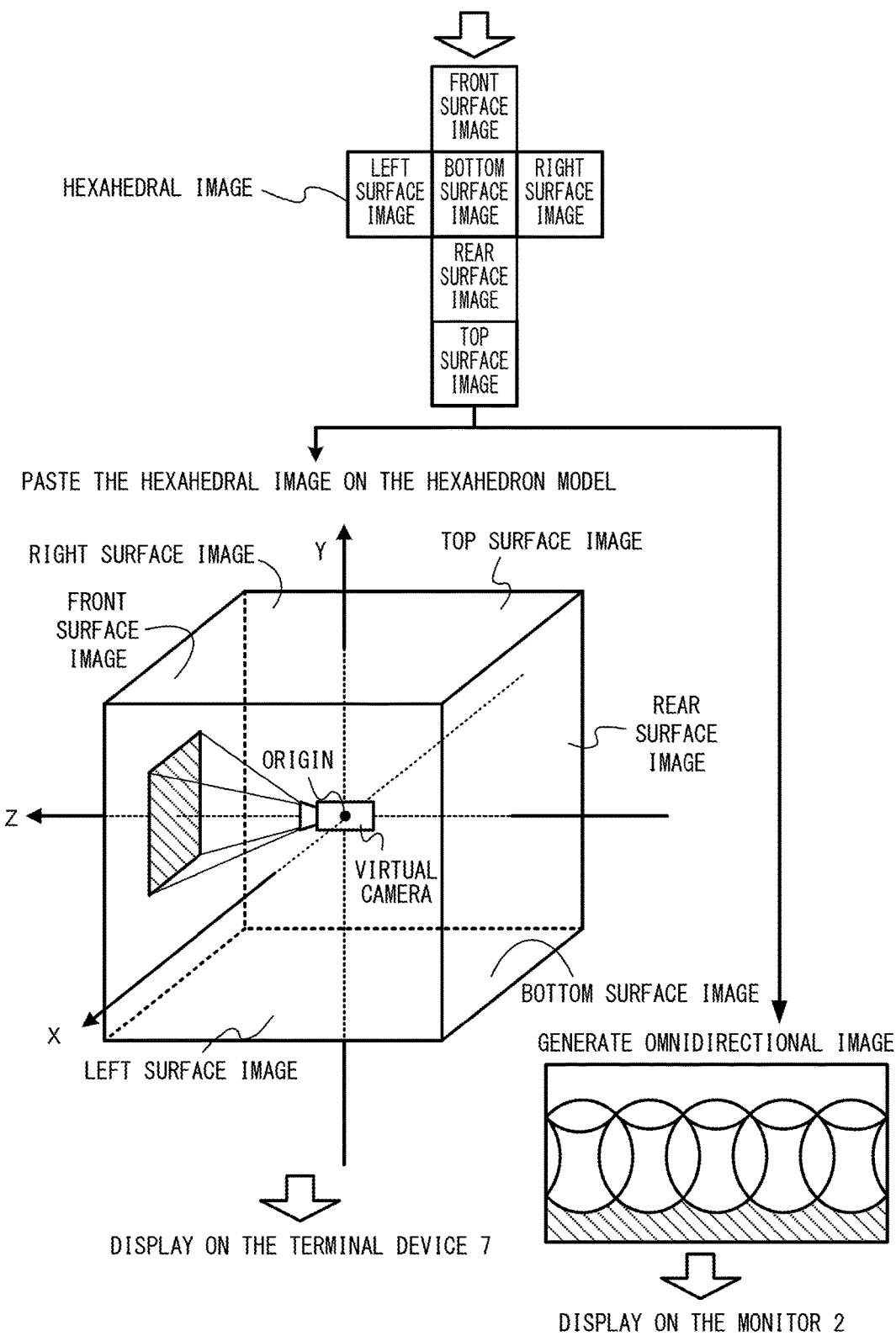
FIG. 24 shows a flow of an example non-limiting process of decoding the encoded panorama moving image data and displaying the decoded image.

FIG. 24 shows an example of flow of a process of decoding the encoded panorama moving image and displaying the decoded image. In the example shown in FIG. 24, an image as viewed from the virtual camera is displayed on the terminal device 7, and an omnidirectional image is displayed on the monitor 2.

The panorama moving image encoded and stored on a predetermined storage medium is decoded into a hexahedral image of each display time (frame) by any of the above-described methods. The surface images of the hexahedral image of each frame are pasted as texture on the respective surfaces of the inner surface of the hexahedron model. A partial area of the hexahedral image as viewed from the virtual camera located inside the hexahedron model is rendered and displayed on the terminal device 7 for each frame.

In an example, the hexahedron model is located at the origin of a virtual space. Here, it is assumed that the up/down direction of the hexahedron model is the positive/negative direction of the Y axis of the virtual space. A top surface and a bottom surface of the hexahedron model are located perpendicularly to the Y axis (the top surface is located on the positive side of the Y axis, and the bottom surface is located on the negative side of the Y axis). It is also assumed that the left/right direction of the hexahedron model is the positive/negative direction of the X axis of the virtual space. A left side surface and a right side surface of the hexahedron model are located perpendicularly to the X axis (the left side surface is located on the positive side of the X axis, and the right side surface is located on the negative side of the X axis). It is also assumed that the front/rear direction of the hexahedron model is the positive/negative direction of the Z axis of the virtual space. A front surface and a rear surface of the hexahedron model are located perpendicularly to the Z axis (the front surface is located on the positive side of the Z axis, and the rear surface is located on the negative side of the Z axis). On the inner surfaces of the front surface, the left side surface, the right side surface, the rear surface, the top surface and the bottom surface of the hexahedron model, the front surface image, the left surface image, the right surface image, the rear surface image, the top surface image and the bottom surface image of the hexahedral image are respectively pasted as texture.

At the center of the hexahedron model (origin of the virtual space), a virtual camera is located, and a partial area of the inner surface of the hexahedron model as viewed from the virtual camera is rendered as a partial area of the panorama moving image. The line-of-sight direction of the virtual camera is changed in accordance with the attitude of the terminal device 7 as described later. Like in the first embodiment, the virtual camera is located with an initial attitude such that the left/right direction thereof, the up/down direction thereof and the front/rear direction thereof respectively match the X axis, the Y axis and the Z axis of the virtual space. More specifically, the virtual camera is located such that the line-of-sight direction of the virtual camera (z-axis positive direction) matches the Z-axis positive direction, the leftward direction of the virtual camera (x-axis positive direction) matches the X-axis positive direction of the virtual camera, and the upward direction of the virtual camera (y-axis positive direction) matches the Y-axis positive direction of the virtual camera. As a result, the panorama moving image displayed on the terminal device 7 by the initial attitude of the virtual camera is a display range encompassing at least the center of the front surface image of the hexahedral image. An example in which the attitude of the virtual camera controlled in accordance with the attitude of the terminal device 7 and the setting of the initial attitude and the reference attitude are substantially the same as those in the first embodiment, and will not be described here in detail.

The decoded surface images of the hexahedral image are synthesized into one image and thus converted into an omnidirectional image as described above, and is displayed on the monitor 2 for each frame. As a result, a panorama moving image having substantially the same time axis as that of the panorama moving image displayed on the terminal device 7 is displayed on the monitor 2. The display range of the panorama moving image on the monitor 2 is relative large as compared with the range displayed on the terminal device 7.

An image representing the range of the panorama image (hexahedral image) displayed on the terminal device 7 may be displayed in superposition on the omnidirectional image displayed on the monitor 2. When the range of the image displayed on the terminal device 7 is displayed on the monitor 2 in this manner, the user viewing the monitor 2 can find what image is viewed by the user operating the terminal device 7, or the user operating the terminal device 7 views the monitor 2 and can grasp the positional relationship of the part of the panorama image displayed on the terminal device 7 with respect to the entire panorama image.

In the second embodiment, at least parts of one decoded panorama moving image are respectively displayed on a plurality of display devices, and the panorama moving images displayed on the plurality of display devices have substantially the same time axis. On each of the plurality of display devices, the panorama moving image is displayed after the direction of the display screen is calibrated. Therefore, the range of the panorama moving image displayed on each display screen can be the range based on the positional relationship between the display devices in the actual space. For example, it is assumed that the direction in which the monitor 2 is located is set to the reference direction (front direction) of the panorama moving image. When the orientation of the display screen of the monitor 2 is the same as the orientation of the display screen of the terminal device 7, the panorama moving image in the front direction is displayed on the display screen of the terminal device 7. The attitude of the virtual camera is changed in the same manner as the attitude of the terminal device 7. Therefore, the user viewing the virtual space generated by the panorama moving image with the direction of the monitor 2 always being the reference direction (front direction) perceives that he/she can view the image in any optional direction by changing the attitude of the terminal device 7.

Figure 25:
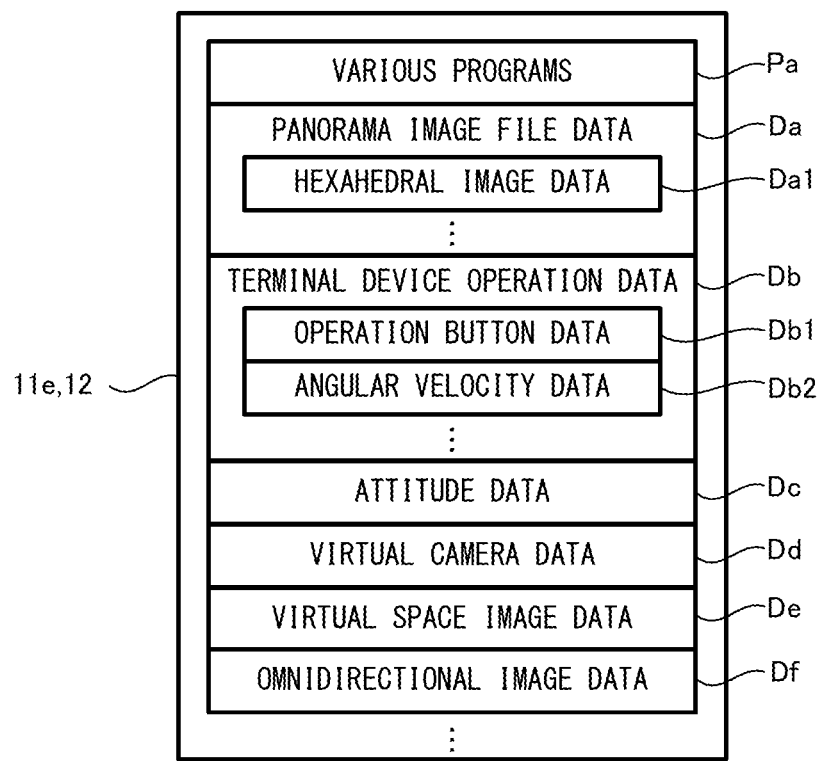
FIG. 25 shows an example non-limiting main data and an example non-limiting programs in a second embodiment which are stored on a main memory of the game device 3.

Now, the processing operation executed by the game device 3 will be described in detail. First, with reference to FIG. 25, main data used in the processing operation will be described. FIG. 25 shows an example of main data and programs stored on the internal main memory lie and/or the external main memory 12 (hereinafter, these two main memories will be collectively referred to simply as the "main memory").

As shown in FIG. 25, in a data storage area of the main memory, panorama image file data Da, terminal operation data Db, attitude data Dc, virtual camera data Dd, virtual space image data De, omnidirectional image data Df and the like are stored. The main memory may have, in addition to the data shown in FIG. 25, data usable for an application to be executed, other data usable for the processing operation and the like stored thereon. In a program storage area of the main memory, a group Pa of various programs included in an information processing program is stored.

The panorama image file data Da includes hexahedral image data Da1 and the like as information for each frame. The hexahedral image data Da1 includes data representing the above-described six surface images (front surface image, left surface image, right surface image, rear surface image, top surface image, bottom surface image) for each frame number N (1, 2, 3, . . . ). The hexahedral image data Da1 is obtained by decoding a panorama moving image, encoded and stored on a predetermined storage medium, by the above-described method.

The terminal device data Db represents a content of operations made on the terminal device 7, and includes operation button data Db1, angular velocity data Db2 and the like. The operation button data Db1 represents a content of operations made on the operation buttons 54. The angular velocity data Db2 represents the angular velocity caused to the terminal device 7, which is output from the gyrosensor 64.

The attitude data Dc represents the attitude of the terminal device 7 in the actual space, for example, the rotation amount of the terminal device 7 from the reference attitude.

The virtual camera data Dd represents data regarding a virtual camera located at the center of the hexahedron model.

The virtual space image data De represents a virtual space image of the inner surface of the hexahedron model as viewed from the virtual camera. The omnidirectional image data Df represents an omnidirectional image which is generated by synthesizing the surface images of the hexahedral image represented by the hexahedral image data Da1 into one image.

Figure 26:
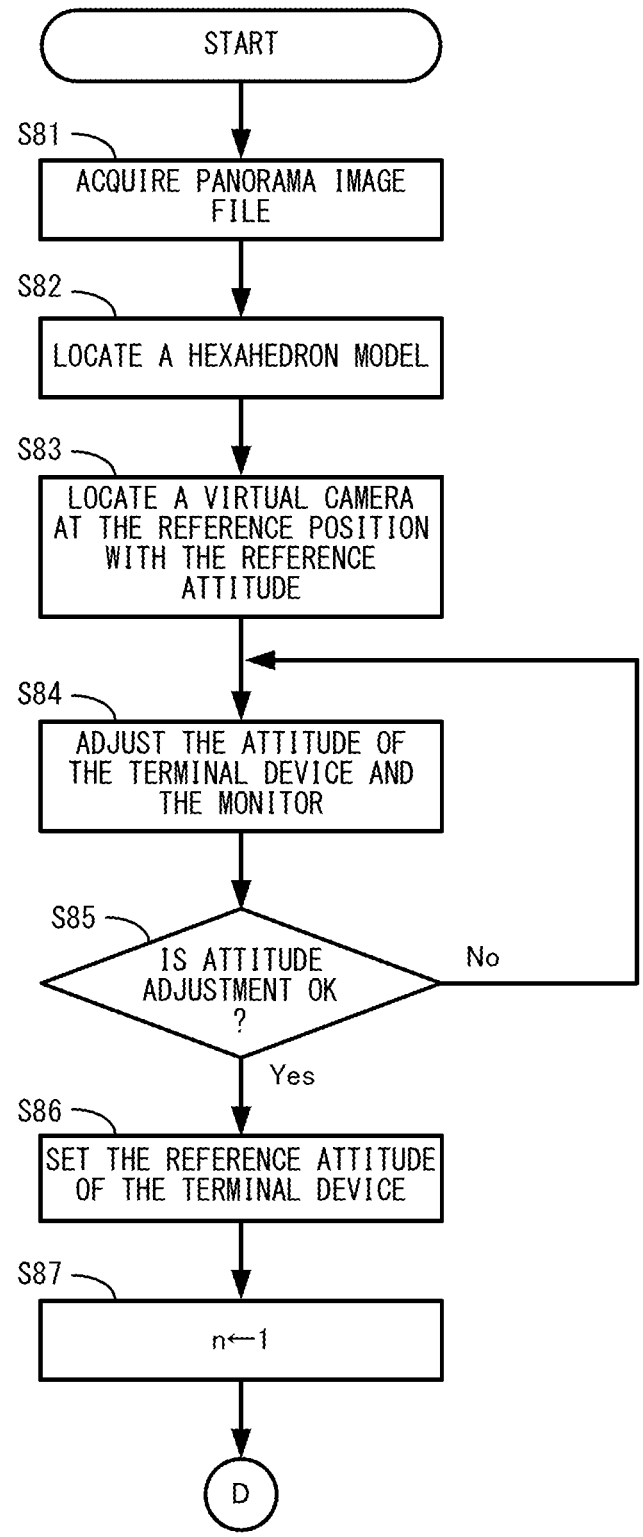
FIG. 26 is a flowchart showing a first half of an example non-limiting process in the second embodiment executed by the game device 3.
Figure 27:
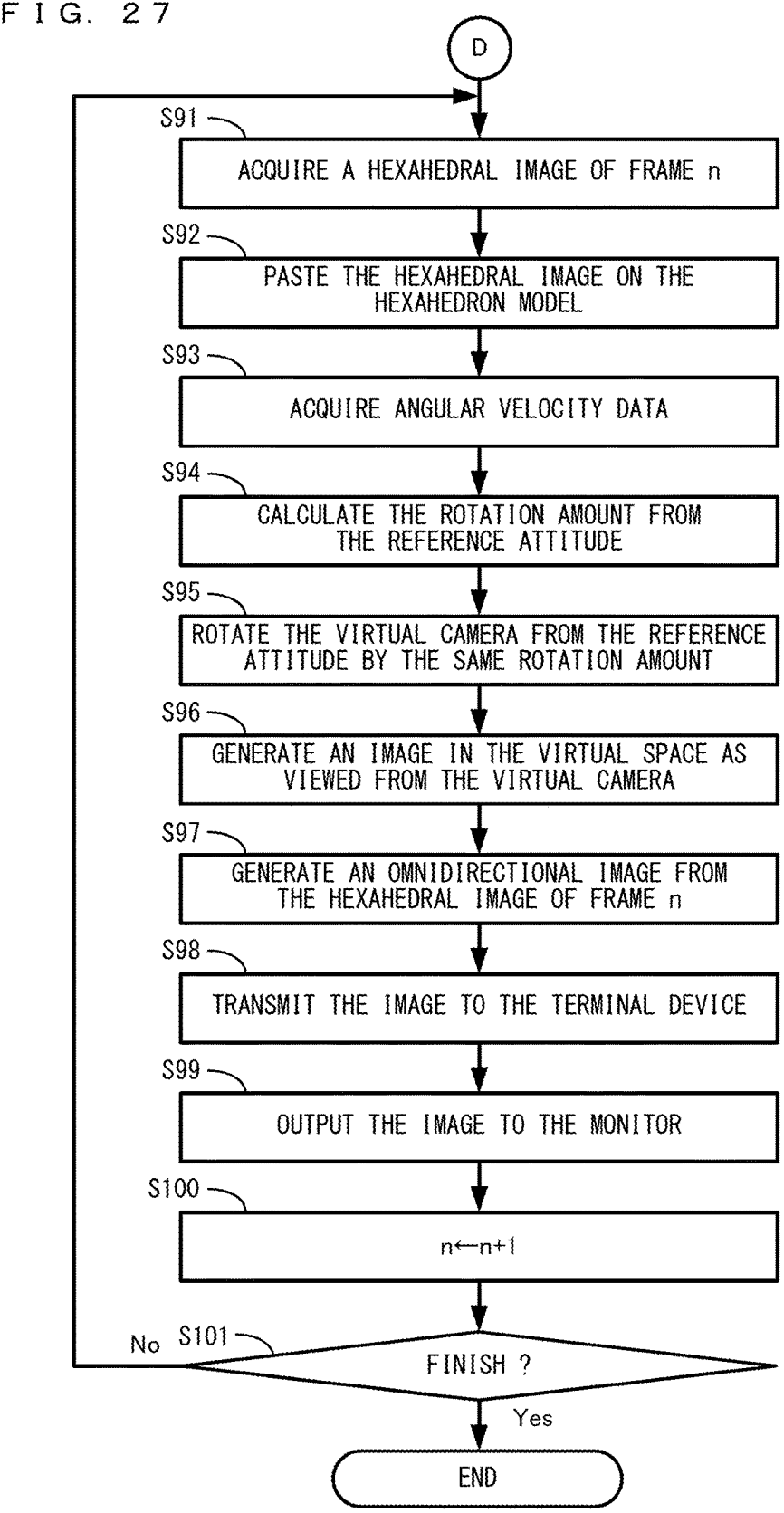
FIG. 27 is a flowchart showing a second half of an example non-limiting process in the second embodiment executed by the game device 3.

Now, with reference to FIG. 26 and FIG. 27, the processing operation executed by the game device 3 will be described in detail. FIG. 26 is a flowchart showing an example of a first half of the process executed by the game device 3, and FIG. 27 is flowchart showing an example of a second half of the process executed by the game device 3. With reference to FIG. 26 and FIG. 27, a process of displaying a panorama moving image on the terminal device 7 and the monitor 2 will be mainly described among processes executed by the game device 3, and other processes which are not directly related to this process will not be described here in detail.

The CPU 10 initializes the main memory and the like, and reads the information processing program stored on a nonvolatile memory in the game device 3 or on the optical disc 4 to the main memory. Then, the CPU 10 starts execution of the information processing program. The flowcharts shown in FIG. 26 and FIG. 27 show the processing operation executed after the above processes are completed.

The steps in the flowcharts shown in FIG. 26 and FIG. 27 are merely an example. The order of the steps may be changed, or a different processing operation may be executed in addition to, or instead of, the processing operation shown in FIG. 26 and FIG. 27, as long as substantially the same results are obtained. In this example embodiment, each step in the flowcharts will be described as being executed by the CPU 10. Alternatively, a part of, or the entirety of, the steps in the flowcharts may be executed by a processor other than the CPU 10 or a dedicated circuit.

Referring to FIG. 26, the CPU 10 acquires a panorama image file (step S81). For example, the CPU 10 acquires a panorama image file from a nonvolatile memory in the game device 3, from a storage medium mounted on the game device 3, or from another device via a network of the like, and stores the panorama image file in the panorama image file data Da.

Next, the CPU 10 locates a hexahedron model, to which the panorama moving image is to be pasted, in the virtual space such that the center of the hexahedron model is positioned at the origin of the virtual space (step S82), and advances the processing operation to the next step. For example, the CPU 10 locates the hexahedron model with respect to the XYZ axes set in the virtual space, such that the front surface of the hexahedron model perpendicularly crosses the Z axis on the positive side of the Z axis, the rear surface perpendicularly crosses the Z axis on the negative side of the Z axis, the left side surface perpendicularly crosses the X axis on the positive side of the X axis, the right side surface perpendicularly crosses the X axis on the negative side of the X axis, the top surface perpendicularly crosses the Y axis on the positive side of the Y axis, and the bottom surface perpendicularly crosses the Y axis on the negative side of the Y axis (state shown in FIG. 24).

Next, the CPU 10 locates a virtual camera at the reference position with the reference attitude (step S83), and advances the processing operation to the next step. For example, the CPU 10 sets the origin of the virtual space (center of the hexahedron model) as the reference position of the virtual camera, and sets the attitude with which the xyz axes of the virtual camera (the x-axis positive direction is the leftward direction of the virtual camera, the y-axis positive direction is the upward direction of the virtual camera, and the z-axis positive direction is the line-of-sight direction of the virtual camera) match the X, Y and Z axes of the virtual space as the reference attitude. Then, the CPU 10 updates the virtual camera data Dd by use of the reference position and the reference attitude of the virtual camera.

Next, the CPU 10 urges the user to adjust the attitude of the terminal device 7 and the monitor 2 (step S84) and waits for the attitude to be adjusted (step S85). For example, the CPU 10 provides, on the terminal device 7 and/or the monitor 2, a display which urges the user to adjust the terminal device 7 such that the orientation of the LCD 51 of the terminal device 7 is the same as the orientation of the display screen of the monitor 2, and also urges the user to, when the attitude is so adjusted, press a predetermined operation button of the terminal device 7. The CPU 10 refers to the operation button data Db1 to acquire data which represents the content of operations made on the operation buttons 54. When the data shows that the predetermined button has been pressed, the CPU 10 determines that the above-described attitude adjustment has been made, and advances the processing operation to the next step S86. The data representing the content of operations made on the operation buttons 54 is transmitted from the terminal device 7 to the game device 3 at a cycle of a predetermined time length and stored in the operation button data Db1.

In step S86, the CPU 10 sets the current attitude of the terminal device 7 as the reference attitude, and advances the processing operation to the next step. For example, the CPU 10 initializes the attitude of the terminal device 7 (rotation amount from the reference attitude) represented by the attitude data Dc (i.e., the CPU 10 sets the rotation amount about each axis to 0), and sets the reference attitude of the terminal device 7. As a result of the processes in steps S84 through S86, the attitude of the terminal device 7, which has been adjusted such that the orientation of the LCD 51 of the terminal device 7 is the same as the orientation of the display screen of the monitor 2, is set as the reference attitude of the terminal device 7.

Next, the CPU 10 sets the frame number n to 1 (step S87), and advances the processing operation to the next step S91 (see FIG. 27).

Referring to FIG. 27, the CPU 10 acquires a hexahedral image corresponding to frame n from the hexahedral image data Da1 (step S91), and advances the processing operation to the next step.

Next, the CPU 10 pastes the hexahedral image acquired in step S91 as texture on an inner surface of the hexahedron model (step S92), and advances the processing operation to the next step. For example, as described above with reference to FIG. 24, the surface images of the hexahedral image is pasted on the surfaces of the inner surface of the hexahedron model.

Next, the CPU 10 acquires an output value of the gyrosensor 64 of the terminal device 7 (step S93), and advances the processing operation to the next step. Data representing the output value of the gyrosensor 64 is transmitted from the terminal device 7 to the game device 3 at a cycle of a predetermined time length and stored in the angular data Db2.

Next, the CPU 10 uses the data acquired in step S93 to calculate the rotation direction and the rotation amount of the terminal device 7 from the reference attitude (the rotation direction and the rotation amount after the initialization in step S86) (step S94), and advances the processing operation to the next step. For example, in step S94, the rotation direction and the rotation amount about the x axis (xn in FIG. 18A) of the reference attitude of the terminal device 7, the rotation direction and the rotation amount about the y axis (yn in FIG. 18A), and the rotation direction and the rotation amount about the z axis (zn in FIG. 18A) are calculated, and the attitude data Dc is updated. The rotation direction can be represented by whether the rotation amount has a positive value or a negative value. Therefore, only data representing the rotation amount may be stored in the attitude data Dc. For example, the CPU 10 adds the rotation amount based on the angular velocity acquired in step S94 in the current process to the rotation amount calculated in step S94 in the immediately previous process to find a new rotation amount.

Next, the CPU rotates the attitude of the virtual camera in the virtual space from the reference attitude by the rotation amount calculated in step S94 (step S95), and advances the processing operation to the next step. For example, the CPU 10 rotates the attitude of the virtual camera from the reference attitude about the X axis of the virtual space (x0 in FIG. 18C) by the amount same as the rotation amount of the terminal device 7 about the xn axis calculated in step S94, about the Y axis of the virtual space (y0 in FIG. 18C) by the amount same as the rotation amount of the terminal device 7 about the yn axis calculated in step S94, and about the Z axis of the virtual space (z0 in FIG. 18C) by the amount same as the rotation amount of the terminal device 7 about the zn axis calculated in step S94. Then, the CPU 10 updates the virtual camera data Dd.

Next, the CPU 10 generates an image of the inner surface of the hexahedron model as viewed from the virtual camera (virtual space image) (step S96), and advances the processing operation to the next step. For example, the CPU 10 uses data representing the generated virtual space image to update the virtual space image data De.

Next, the CPU 10 synthesizes the surface images of the hexahedron image acquired in step S91 into one image to generate an omnidirectional image (step S97), and advances the processing operation to the next step. For example, the CPU 10 uses data representing the generated omnidirectional image to update the omnidirectional image data Df. The method for producing the omnidirectional image is substantially the same as the method described with reference to FIG. 23 and FIG. 24 and will not be described here in detail.

Next, the CPU 10 transmits a virtual space image based on the virtual space image data De to the terminal device 7 (step S98), and advances the processing operation to the next step. For example, the virtual space image based on the virtual space image data De is stored on the VRAM 11*d*, then is transmitted to the codec LSI 27, and is compressed in a predetermined manner by the codec LSI 27. The data on the compressed virtual space image is transmitted to the terminal communication module 28 by the codec LSI 27, and is transmitted to the terminal device 7 by the terminal communication module 28 via the antenna 29. The data on the virtual space image which has been transmitted from the game device 3 is received by the wireless module 70 of the terminal device 7 and expanded in a predetermined manner by the codec LSI 78. The data on the virtual space image which has been expanded is output to the LCD 51, and thus the virtual space image is displayed.

Next, the CPU 10 outputs an omnidirectional image based on the omnidirectional image data Df to the monitor 2 (step S99), and advances the processing operation to the next step. For example, the omnidirectional image based on the omnidirectional image data Df is stored on the VRAM 11*d* and then is transmitted to the AV-IC 15. Then, the AV-IC 15 outputs the data representing the omnidirectional image to the monitor 2 via the AV connector 16. Thus, the omnidirectional image is displayed on the monitor 2.

Next, the CPU 10 increments the frame number n (step S100), and determined whether or not to finish the processing operation (step S101). A condition for finishing the processing operation may be, for example, that reproduction of an image of the final frame of the panorama moving image is finished, that the user makes an operation of finishing the processing operation, or the like. When the processing operation is not to be finished, the CPU 10 returns the processing operation to step S91 and repeats the above-described processing operation. When the processing operation is to be finished, the CPU 10 finishes the processing operation of the flowcharts. Until it is determined that the processing operation is to be finished in step S101, the series of processes in steps S91 through S101 is performed in repetition.

[8. Modifications]

The example embodiment is merely one example, and the following configuration or the like may be used in other examples.

In this embodiment, the game system 1 includes only one terminal device 7. Alternatively, the game system 1 may include a plurality of terminal devices 7. Namely, the game device 3 may be wirelessly communicable with a plurality of terminal devices 7, so that image data can be transmitted to each of the terminal devices 7 and receive data of the gyrosensor 64 from each of the terminal devices 7. A virtual camera for each terminal device 7 may be located in the virtual space, and the game device 3 may control the attitude of each virtual camera in accordance with the attitude of the corresponding terminal device 7 and transmit an image of the virtual space as viewed from each virtual camera to the corresponding terminal device 7. The game device 3 may perform wireless communication with each terminal device 7 in a time division manner or in a frequency division manner.

As described above, when a panorama moving image is displayed by use of a plurality of terminal devices 7, the monitor 2 may not be used. For example, regarding the second embodiment, a case where one, same panorama moving image is displayed on a plurality of terminal devices 7 (e.g., a first terminal device and a second terminal device) at substantially the same time axis will be discussed. In this case, in step S83, two virtual cameras (e.g., a first virtual camera and a second virtual camera) are located at the same reference position with the same reference attitude. In step S84, a display is provided on the terminal devices which urges the user to adjust the attitude of the first terminal device and the second terminal device such that the orientation of the LCD 51 of the first terminal device is the same as the orientation of the LCD 51 of the second terminal device and also urges the user to, when the attitude is so adjusted, press a predetermined operation button of at least one of the terminal devices. The attitude of the first terminal device and the attitude of the second terminal device at the time when the attitude adjustment is made in step S86 are set as the respective reference attitudes. Based on such settings, the attitude of the first virtual camera is changed in accordance with the rotation amount of the first terminal device from the reference attitude, and the attitude of the second virtual camera is changed in accordance with the rotation amount of the second terminal device from the reference attitude. An image of the inner surface of the hexahedron model as viewed from the first virtual camera is displayed on the first terminal device, and an image of the inner surface of the hexahedron model as viewed from the second virtual camera is displayed on the second terminal device. In this manner, the relative positions of the first terminal device and the second terminal device in the real space are calibrated, and then the attitude of each virtual camera is changed in the same manner as the change of the attitude of the corresponding terminal device. Owing to this, images which might be obtained by peeking into the same world generated by the panorama moving image via a plurality of display devices in an optional manner are displayed on the respective display devices.

Now, it is assumed that the position and the attitude of the second virtual camera are fixed to the reference position and the reference attitude, and an image of the inner surface of the hexahedron model as viewed from the second virtual camera is displayed on the monitor 2 instead of the second terminal device. In this case, the monitor 2 can always display a panorama moving image in the reference direction (front direction). Owing to this, in the case where the panorama moving image is captured while the point of view is moving to generate a panorama moving image, the monitor 2 always displays a part of the panorama image showing the forward direction of the move.

The range of the panorama moving image to be displayed on the monitor 2 may be changed by operating the controller 5. In an example, for displaying a part of the above-described omnidirectional image on the monitor 2, the range of the omnidirectional image to be displayed on the monitor 2 is moved in accordance with at least one of the marker coordinate data, the acceleration data, the angular velocity data, and the operation button data which are output by the controller 5 as the operation data. In another example, for displaying an image of the inner surface of the hexahedron model as viewed from the second virtual camera on the monitor 2, the attitude of the virtual camera is changed in accordance with at least one of the marker coordinate data, the acceleration data, the angular velocity data, and the operation button data which are output by the controller 5 as the operation data.

A predetermined object or additional information may be added to the panorama moving image by operating the controller 5. For example, the user viewing the panorama moving image displayed on the monitor 2 can make a predetermined operation on the controller 5 to input a predetermined object or additional information to a part of the panorama moving image specified by the operation. Specifically, when the user points to a part of the panorama moving image displayed on the monitor 2 with the controller 5 and makes a predetermined button operation, an object or additional information in accordance with the button operation is added to the part of the panorama moving image which is being reproduced.

The input predetermined object or additional information (e.g., comment) is additionally displayed also on the panorama moving image displayed on the terminal device 7. As described above, the image displayed on the monitor 2 and the image displayed on the terminal device 7 are respectively at least parts of a panorama image having the same time axis of one panorama moving image which is being reproduced. Therefore, when a range including a part of the panorama moving image having the predetermined object or additional information added thereto is displayed on the terminal device 7 via the monitor 2, the terminal device 7 displays, in addition to the panorama moving image, the added predetermined object or additional information at substantially the same timing as the operation of adding the predetermined object or additional information. As a result, the user can view the panorama moving image and also the object or additional information which has been added by another user through the pointing operation. Owing to such a structure that allows a predetermined object or additional information to be added to the panorama moving image via the monitor 2, the users can communicate to each other regarding the panorama moving image displayed on the monitor 2 and the terminal device 7.

When such a predetermined object or additional information is input via the monitor 2, the CPU 10 controls target information representing a target of addition (predetermined object or additional information) and input position information usable for adding the target information to the panorama moving image. For example, the input position information can specify the input position in the display range of the panorama image displayed on the monitor 2 when the input of the target information is accepted. The input position may be, for example, specified by the above-described addition operation.

In an example, as the input position information representing the input position, vector information representing the attitude (line-of-sight direction) of the virtual camera for generating an image to be displayed on the monitor 2 is used. For example, a vector representing the direction from the position of the virtual camera to the input position on a three-dimensional model (above-described spherical model or hexahedron model) can represent the input position. In the case where the point of view for capturing the panorama moving image moves in a predetermined space (e.g., real world) as the time passes, the input position is also moved on the three-dimensional model along with the movement of the point of view. When the input position is encompassed in the display range of the panorama moving image displayed on the monitor 2 and the terminal device 7, a predetermined object or additional information corresponding to the target information controlled at the input position is displayed in superposition at the input position in the panorama moving image.

The panorama moving image displayed on the terminal device 7 may be displayed on the monitor 2. For example, the panorama moving image displayed on the terminal device 7 may be displayed on the monitor 2 in addition to the panorama moving image displayed on the monitor 2 in the above-described case. Alternatively, the panorama moving image displayed on the terminal device 7 may be displayed on the monitor 2 independently. In the former case, the panorama moving image displayed on the terminal device 7 may be displayed in a different display area of the monitor 2 from the display area in which the panorama moving image is displayed in the above-described case, or the display areas of these panorama moving images may at least partially overlap. In the latter case, the panorama moving image displayed on the terminal device 7 may be displayed on the entire display area of the monitor 2. In this manner, when the panorama moving image displayed on the terminal device 7 is displayed also on the monitor 2, the panorama image viewed by the user operating the terminal device 7 can also be viewed by another user via the monitor 2. Thus, the users can communicate to each other regarding the viewed panorama moving image.

When the panorama moving image displayed on the terminal device 7 is to be displayed on the monitor 2, the viewer of the panorama moving image displayed on the monitor 2 may have visually induced motion (image) sickness because of a relatively small swing of the image caused by the shake of the hand of the user holding the terminal device 7 or because of a relatively large change of the line-of-sight direction caused by the user largely moving the terminal device 7 in the up, down, left and right directions. In order to prevent the viewer from having the visually induced motion sickness, an image, in which the change of the line-of-sight direction of the panorama moving image displayed on the terminal device 7 is alleviated, may be displayed on the monitor 2. For example, a monitor virtual camera is set in the virtual world with the same point of view and the same line-of-sight direction as those of a terminal device virtual camera for displaying a panorama moving image on the terminal device 7, and the monitor virtual camera is moved basically in the same manner as the terminal device virtual camera. In a first example, for instance, in the case where the amount of change per unit time of the orientation of the terminal device 7 in the real space is less than a predetermined threshold level or in the case where the value output from a sensor (accelerator sensor 63, gyrosensor 64, etc.) for detecting the movement of the terminal device 7 (value representing the acceleration or the angular velocity) is less than a predetermined threshold level, the attitude of the monitor virtual camera is fixed to prevent a relatively small swing of the image caused by the shake of the hand. In the case where the amount of change or the output value is 0 or greater than or equal to the predetermined threshold level, the attitude of the monitor virtual camera is controlled to be close to, or the same as, the attitude of the terminal device virtual camera. In a second example, for instance, in the case where the amount of change per unit time of the orientation of the terminal device 7 in the real space is greater than or equal to a predetermined threshold level or in the case where the value output from a sensor (accelerator sensor 63, gyrosensor 64, etc.) for detecting the movement of the terminal device 7 (value representing the acceleration or the angular velocity) is greater than or equal to a predetermined threshold level, the movement of the monitor virtual camera is restricted to suppress a relatively large movement of the line-of-sight direction. In the case where the amount of change or the output value is less than the predetermined threshold level, the attitude of the monitor virtual camera is controlled to be close to, or the same as, the attitude of the terminal device virtual camera. In a third example, the movement of the monitor virtual camera is controlled to follow the movement of the terminal device virtual camera at a predetermined ratio, so that a relatively small swing of the image caused by the shake of the hand or a relatively large change of the line-of-sight direction is suppressed. Specifically, the line-of-sight direction of the monitor virtual camera is controlled to always change to be close to the line-of-sight direction of the terminal device virtual camera at a predetermined ratio (e.g., 50%) with respect to the angle difference between the line-of-sight direction of the terminal device virtual camera and the line-of-sight direction of the monitor virtual camera. Using one or a combination of these control examples to display an image of the inner surface of the three-dimensional model as viewed from the monitor virtual camera, the attitude of which is controlled, an image, in which the change of the line-of-sight direction of the panorama moving image displayed on the terminal device 7 is alleviated, can be displayed on the monitor 2.

In the above description, when the panorama moving image displayed on the terminal device 7 is to be displayed on the monitor 2, the visually induced motion sickness caused by a visual vibration in the up, down, left and right directions is prevented. It is also conceivable that a change of the image caused when the panorama moving image is enlarged or reduced is decreased in the image displayed on the monitor 2. For example, when the user holding the terminal device 7 makes an operation of enlarging or reducing the panorama moving image displayed on the terminal device 7, a panorama moving image enlarged or reduced in accordance with the operation is displayed on the LCD 51. For displaying, also on the monitor 2, the panorama moving image on the terminal device 7 after being enlarged or reduced in accordance with the operation made on the terminal device 7, in the case where the ratio of enlargement or reduction of the panorama moving image is greater than or equal to a predetermined threshold level, a panorama moving image enlarged or reduced at a ratio suppressed to the threshold level is displayed on the monitor 2. In the case where the panorama moving image is reduced within a predetermined time length after being enlarged in accordance with the operation made on the terminal device 7, or in the case where the panorama moving image is enlarged within a predetermined time length after being reduced in accordance with the operation made on the terminal device 7, a panorama moving image obtained by performing the reduction or enlargement made within the predetermined time length in a suppressed manner is displayed on the monitor 2. Using one or a combination of these control examples to display a panorama moving image enlarged or reduced in a controlled manner on the monitor 2, a panorama moving image, in which the change of the image caused by the enlargement or reduction made for the terminal device 7 is alleviated, can be displayed on the monitor 2.

The above-described terminal device 7 does not execute the series of processes described above with reference to FIGS. 20 through 22, 26 and 27 or the game process executed by the game device 3; namely, acts as a so-called thin client terminal. Alternatively, the terminal device 7 may have a function of executing a predetermined information process (game process) by a predetermined program (game program), such as, for example, a mobile game device. In this case, at least a part of the series of processes executed by the game device 3 in the above example may be executed by the terminal device 7. In an example, in the case where a panorama moving image is displayed on a plurality of terminal devices by use of at least one terminal device which is capable of executing all of the above-described series of processes, one of the at least one terminal device is used as a main processing device for executing the series of processes, and a panorama moving in accordance with the attitude of the other terminal device(s) is transmitted from the main processing device to the other terminal device(s). Thus, substantially the same panorama moving images can be displayed on the terminal devices.

In the above example, a panorama moving image including panorama images captured by the real world image-capturing cameras moving in the real world is displayed. Alternatively, a panorama moving image including panorama images captured by a virtual camera moving in the virtual world, or a panorama moving image obtained by synthesizing the panorama image of the real world and the panorama image of the virtual world may be displayed.

In other embodiments, in a game system including a plurality of information processing devices communicable to each other, the information processes may be divided for the plurality of information processing devices so that each information processing device can execute a part assigned thereto. In the case where the plurality of information processing devices execute the information processes, the processes to be executed by these information processing devices are synchronized, which complicates the processes. By contrast, in the case where, as in the above-described example embodiment, the information processes are executed by one game device 3 and the terminal device 7 receives and displays an image (namely, in the case where the terminal device 7 is a thin client terminal), the processes do not need to be synchronized among the plurality of information processing devices, which can simplify the processes.

In the above-described embodiment, the game system 1 including the game device 3 capable of executing a game process is described as one example, but the processes described in the above embodiment can be each executed by any information processing system and any information processing device, as well as by a game system and a game device. Any information processing system which includes an information processing device and a plurality of display devices (a combination of at least one portable display device on which a user can make an input operation (for example, the terminal device 7) and a non-portable display device, or a plurality of portable display devices) is usable. Any information processing device which can output an image to each of the plurality of display devices. The above-described processes can be executed by one processor or a cooperation of a plurality of processors included in an information processing system including at least one information processing device.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, (a) non-volatile memory, including by way of example, semiconductor memory devices, such as Erasable Programmable Read-Only Memory (EPROM), Electrically Erasable Programmable Read-Only Memory (EEPROM), and flash memory devices; (b) magnetic disks such as internal hard disks and removable disks; (c) magneto-optical disks; and (d) Compact Disc Read-Only Memory (CD-ROM). Any of the foregoing may be supplemented by, or incorporated in, specially-designed ASICs (Application Specific Integrated Circuits).

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

While some system examples, method examples, device examples, and apparatus examples have been described in detail, the foregoing description is in all aspects illustrative and not restrictive. It is to be understood that numerous other modifications and variations can be devised without departing from the spirit and scope of the appended claims. It is also to be understood that the scope of the example embodiment is indicated by the appended claims rather than by the foregoing description. It is also to be understood that the detailed description herein enables one skilled in the art to make changes coming within the meaning and equivalency range of the example embodiment. It is to be understood that as used herein, the singular forms used for elements and the like with "a" or "an" are not intended to exclude the plural forms thereof. It should be also understood that the terms as used herein have definitions typically used in the art unless otherwise mentioned. Thus, unless otherwise defined, all scientific and technical terms used herein have the same meanings as those generally used by those skilled in the art to which the example embodiment pertains. If there is contradiction, the present specification (including the definitions) precedes.

As described above, the example embodiment is usable for, for example, a game system, a game device and the like for the purpose of, for example, allowing a user to experience a high sense of reality.

What is claimed is:

1. A non-transitory computer-readable storage medium having an information processing program stored thereon, the information processing program being executable by a computer for displaying a plurality of images on at least one display device that includes a first portable display device with a first display area and a second display device with a second display area, the second display device different from the first portable display device, wherein the information processing comprises instructions that cause the computer to execute:

reading and sequentially acquiring panorama images from a stored panorama moving image every predetermined time for reproduction on the display device, each of the panorama images being a frame of the panorama moving image;

obtaining data that is generated based on use of the first portable display device;

adjusting, based on the obtained data generated from use of the first portable display device, a range to be displayed in the first display area in each of the acquired panorama images;

as the range to be displayed in the first display area is adjusted, tracking an amount of change, wherein the amount of change corresponds to the amount by which the range to be displayed on the first display area is adjusted from a prior range of the first display area;

based on determination that the tracked amount is greater than a threshold amount of change, adjusting a range to be displayed in the second display area so that the range for the second display area matches the range of the first display area;

based on determination that the tracked amount of change is less than the threshold amount of change, maintain the range to be displayed in the second display area so that the range for the second display area is different from the adjusted range of the first display area;

automatically displaying a first movie, in the first display area, that is comprised of images from the respective ranges of the acquired panorama images which are set to be displayed in the first display area; and automatically displaying a second movie, in the second display area, that is comprised of images from the respective ranges of the acquired panorama images which are set to be displayed in the second display area, wherein each of plural frames of the first movie are, respectively, concurrently displayed with each of plural frames of the second movie and each respectively concurrently displayed ones of the plural frames of the first and second movies are based on a corresponding one of the frames of the panorama moving image.

2. The non-transitory computer-readable storage medium having the information processing program according to claim 1 stored thereon, wherein:

the first display area is provided in a first display device;

the second display area is provided in a second display device which is different from the first display device; and the range of each of the acquired panorama images which is to be displayed on the first display device is set in accordance with a user operation.

3. The non-transitory computer-readable storage medium having the information processing program according to claim 2 stored thereon, wherein:

in each same panorama image as the panorama image in which the range to be displayed in the first display area has been set, the range to be displayed in the second display area is set; and the ranges to be displayed in the second display area which are respectively set in the same panorama images as the panorama images, the ranges of which are displayed in the first display area, are displayed in the second display area.

4. The non-transitory computer-readable storage medium having the information processing program according to claim 2 stored thereon, wherein the range to be displayed on the first device and the range to be displayed on the second device are set in accordance with the positional relationship between the first display device and the second display device in a real space.

5. The non-transitory computer-readable storage medium having the information processing program according to claim 4 stored thereon, wherein the information processing program allows the computer to further execute determining whether or not the positional relationship between the first display device and the second display device in the real space becomes a predetermined positional relationship;

wherein the range to be displayed on the first display device and the range to be displayed on the second display device are set based on an attitude of the first display device and/or an attitude of the second display device at the time when it is determined that the positional relationship between first display device and the second display device becomes the predetermined positional relationship, in accordance with a change of the attitude.

6. The non-transitory computer-readable storage medium having the information processing program according to claim 2 stored thereon, wherein:

the first display device is a portable display device and is capable of outputting data in accordance with a user operation; and the range to be displayed on the first display device is set based on the data output from the first display device.

7. The non-transitory computer-readable storage medium having the information processing program according to claim 6 stored thereon, wherein the second display device is a non-portable display device.

8. The non-transitory computer-readable storage medium having the information processing program according to claim 6 stored thereon, wherein:

the first display device includes a sensor for outputting data in accordance with a movement or an attitude of the first display device; and the range to be displayed on the first display device is set in accordance with the attitude of the first display device which is calculated based on the data output from the sensor.

9. The non-transitory computer-readable storage medium having the information processing program according to claim 8 stored thereon, wherein:

the sensor is at least one of a gyrosensor and an acceleration sensor for outputting the data in accordance with a movement or an attitude of the first display device; and the range to be displayed on the first display device is set in accordance with the attitude of the first display device which is calculated based on the data output from at least one of the gyrosensor and the acceleration sensor.

10. The non-transitory computer-readable storage medium having the information processing program according to claim 6 stored thereon, wherein:

the second display device is a portable display device and is capable of outputting data in accordance with a user operation; and the range to be displayed on the second display device is set based on the data output from the second display device.

11. The non-transitory computer-readable storage medium having the information processing program according to claim 10 stored thereon, wherein:

the second display device includes a sensor for outputting data in accordance with a movement or an attitude of the second display device; and the range to be displayed on the second display device is set in accordance with the attitude of the second display device which is calculated based on the data output from the sensor.

12. The non-transitory computer-readable storage medium having the information processing program according to claim 2 stored thereon, wherein a predetermined range of the panorama image is set as the range to be displayed on the second display device.

13. The non-transitory computer-readable storage medium having the information processing program according to claim 12 stored thereon, wherein:

a panorama moving image captured at a point of view moving in a real world or a virtual world is stored; and the predetermined range is a range of the panorama image captured at the moving point of view as viewed in a direction of moving.

14. The non-transitory computer-readable storage medium having the information processing program according to claim 2 stored thereon, wherein a range larger than the range of the panorama image to be displayed on the first display device is set as the range to be displayed on the second display device.

15. The non-transitory computer-readable storage medium having the information processing program according to claim 2 stored thereon, wherein:
the first display device is a portable display device and is capable of outputting data in accordance with a user operation;
the second display device is a non-portable display device;
the range to be displayed on the first display device is set based on the data output from the first display device; and
the range which has been set as the range to be displayed on the first display device is set as the range to be displayed on the second display device.

16. The non-transitory computer-readable storage medium having the information processing program according to claim 2 stored thereon, wherein:
the first display device is a portable display device and is capable of outputting data in accordance with a user operation;
the second display device is a non-portable display device;
the range to be displayed on the first display device is set based on the data output from the first display device; and
the range to be displayed on the second display device is set based on the range set to be displayed on the first display device, and a range in which a change amount, by which the range to be displayed on the first display device is changed in accordance with a user operation, is suppressed is set as the range to be displayed on the second display device.

17. The non-transitory computer-readable storage medium having the information processing program according to claim 2 stored thereon, wherein:
panorama images read from the stored panorama moving image by decoding are sequentially acquired;
the range to be displayed on the first display device is set in each of the panorama images acquired by decoding;
the range to be displayed on the second display device is set in each of the panorama images acquired by decoding;
the respective ranges, of the panorama images acquired by decoding, which are set to be displayed on the first display device are displayed on the first display device; and
the respective ranges, of the panorama images acquired by decoding, which are set to be displayed on the second display device are displayed on the second display device.

18. The non-transitory computer-readable storage medium having the information processing program according to claim 17 stored thereon, wherein:
data representing an image to be displayed on the first display device is output to the first display device;
the first display device includes a camera configured to acquire the output data; and
a display screen of the first display device displays an image represented by the acquired image data.

19. The non-transitory computer-readable storage medium having the information processing program according to claim 2 stored thereon, wherein the information processing program allows the computer to further execute accepting an input from each of input devices associated with the plurality of display devices; wherein:
the range to be displayed on the first display device is set in the acquired panorama image based on the input accepted by a first input device associated with the first display device; and
the range to be displayed on the second display device is set in the acquired panorama image based on the input accepted by a second input device associated with the second display device.

20. The non-transitory computer-readable storage medium having the information processing program according to claim 1 stored thereon, wherein the concurrently displayed ones of the plural frames of the first and second movies have substantially the same time axis.

21. An information processing device for displaying a plurality of images on at least one display device that includes a first portable display device with a first display area and a second display device with a second display area, the second display device different from the first portable display device, the information processing device comprising:
an electronic memory storage device configured to store a panorama moving image;
a processing system that includes at least one hardware processor coupled to the electronic memory storage device, the processing system configured to:
obtain a plurality of panorama images from the stored panorama moving image, each one of the plurality of panorama images being one frame of the panorama moving image;
obtain data generated based on use of the first portable display device;
adjust, based on the obtained data, a first image range for each one of the obtained plurality of panorama images that is to be displayed in a first display area of the at least one display device, the first image range being less than all of a corresponding one of the plurality of panorama images;
as the range to be displayed in the first display area is adjusted, track an amount of change, wherein the amount of change corresponds to the amount by which the range to be displayed on the first display area is adjusted from a prior range of the first display area;
based on determination that the tracked amount is greater than a threshold amount of change, adjusting a range to be displayed in the second display area so that the range for the second display area matches the range of the first display area;
based on determination that the tracked amount of change is less than the threshold amount of change, keep the range to be displayed in the second display area so that the range for the second display area is different from the adjusted range of the first display area
automatically display, in the first display area, a first movie that is comprised of sequential images from each set first image range of the obtained plurality of panorama images; and
automatically display, in the second display area, a second movie that is comprised of sequential images from each set second image range of the obtained plurality of panorama images,
wherein each of plural frames of the first movie are, respectively, concurrently displayed with each of plural frames of the second movie and each respectively concurrently displayed ones of the plural frames of the first and second movies are based on a corresponding one of the frames of the panorama moving image.

22. An information processing system for displaying a plurality of images, the information processing system comprising:
  a first portable display device that includes a first display area; and
  a second display device that includes a second display area, the second display device different from the first portable display device,
  an electronic memory storage device configured to store a plurality of panorama images that makeup a panorama movie;
  a plurality of computing devices that electronically communicate with each other; and
  a processing system that is distributed across the plurality of computing devices and including at least one hardware processor in each of the plurality of computing devices, the processing system configured to:
    read each one of the plurality of panorama images;
    for each corresponding one of the plurality of panorama images that is read:
      (a) adjust, from a prior first image range and based on data from the first portable display device, a first image range for the corresponding panorama image, where the first image range corresponds to a first partial portion of the corresponding panorama image,
      (b) as the range to be displayed in the first display area is adjusted, tracking an amount of change, wherein the amount of change corresponds to the amount by which the range to be displayed on the first display area is adjusted from a prior range of the first display area,
      (c) based on determination that the tracked amount is greater than a threshold amount of change, adjusting a range to be displayed in the second display area so that the range for the second display area matches the range of the first display area, and
      (d) based on determination that the tracked amount of change is less than the threshold amount of change, maintain the range to be displayed in the second display area so that the range for the second display area is different from the adjusted range of the first display area;
    generate, based on the first image range for each corresponding panorama image, a first movie that includes image frames that each correspond to a respectively set first image range;
    generate, based on the second image range for each corresponding panorama image, a second movie that includes image frames that each correspond to a respectively set second image range;
    output, to the first display area, the first movie that automatically sequentially displays each one of the included image frames; and
    output, to the second display area, the second movie that automatically sequentially displays each one of the included image frames,
  wherein image frames of the first and second movies that are based on the same corresponding panorama image are concurrently displayed in the first display area and the second display.

23. The information processing system of claim 22, wherein the first portable display includes a sensor configured to detect at least one physical quantity and the obtained data is based on the detected at least one physical quantity.

24. The information processing system of claim 22, wherein each of the stored plurality of panorama images are stored as a hexahedral image,
  wherein the processing system is further configured to:
    map the hexahedral image of each corresponding panorama image onto a hexahedron virtual model,
  wherein the first image range and second image range are set using a virtual camera that is positioned on the inside of the hexahedron virtual model.

25. An information processing method executable by one processor or by a cooperation of a plurality of processors included in an information processing system for displaying a plurality of images on a first portable display device that includes a first display area and a second display device that includes a second display area, the second display device different from the first portable display device, the information processing method comprising:
  reading and sequentially acquiring panorama images from a stored panorama moving image every predetermined time for reproduction on the display device, each of the panorama images being a frame of the panorama moving image;
  obtaining data generated based on use of the first portable display device;
  adjusting, based on the obtained data, a range to be displayed in a first display area in each of the acquired panorama images;
  as the range to be displayed in the first display area is adjusted, tracking an amount of change that corresponds to the amount by which the range to be displayed on the first display area is adjusted from a prior range of the first display area;
  based on determination that the tracked amount is greater than a threshold amount of change, adjusting a range to be displayed in the second display area so that the range for the second display area matches the range of the first display area;
  based on determination that the tracked amount of change is less than the threshold amount of change, maintaining the range to be displayed in the second display area so that the range for the second display area is different from the adjusted range of the first display area;
  automatically displaying a first movie, in the first display area, that is comprised of images of the respective ranges of the acquired panorama images which are set to be displayed in the first display area; and
  automatically displaying a second movie, in the second display area, that is comprised of images of the respective ranges of the acquired panorama images which are set to be displayed in the second display area,
  wherein each of plural frames of the first movie are, respectively, concurrently displayed with each of plural frames of the second movie and each respectively concurrently displayed ones of the plural frames of the first and second movies are based on a corresponding one of the frames of the panorama moving image.

* * * * *